United States Patent
Musgrave et al.

(10) Patent No.: US 11,396,888 B1
(45) Date of Patent: Jul. 26, 2022

(54) SYSTEM AND METHOD FOR GUIDING COMPRESSIBLE GAS FLOWING THROUGH A DUCT

(71) Applicant: WILLIAMS INTERNATIONAL CO., L.L.C., Pontiac, MI (US)

(72) Inventors: Dean S. Musgrave, Dearborn, MI (US); Nicklos J. Plehn, II, South Lyon, MI (US)

(73) Assignee: WILLIAMS INTERNATIONAL CO., L.L.C., Pontiac, MI (US)

(*) Notice: Subject to any disclaimer, the term of this patent is extended or adjusted under 35 U.S.C. 154(b) by 294 days.

(21) Appl. No.: 16/186,467

(22) Filed: Nov. 9, 2018

Related U.S. Application Data

(60) Provisional application No. 62/583,651, filed on Nov. 9, 2017.

(51) Int. Cl.
| | |
|---|---|
| F04D 29/46 | (2006.01) |
| F04D 27/00 | (2006.01) |
| F01D 9/04 | (2006.01) |
| F02C 7/04 | (2006.01) |
| F04D 29/54 | (2006.01) |
| F04D 27/02 | (2006.01) |

(52) U.S. Cl.
CPC .......... *F04D 29/464* (2013.01); *F01D 9/041* (2013.01); *F01D 9/048* (2013.01); *F02C 7/04* (2013.01); *F04D 27/002* (2013.01); *F04D 29/542* (2013.01); *F04D 29/547* (2013.01); *F04D 27/0246* (2013.01); *F04D 27/0261* (2013.01); *F05D 2250/51* (2013.01); *F05D 2250/52* (2013.01)

(58) Field of Classification Search
CPC .... F04D 29/542; F04D 29/544; F04D 29/545; F04D 29/547; F01D 9/041; F01D 9/045; F01D 9/048; F02C 7/04
See application file for complete search history.

(56) References Cited

U.S. PATENT DOCUMENTS

| | | |
|---|---|---|
| 2,029,813 A | 2/1936 | De Mey |
| 2,914,241 A | 11/1959 | Novak |
| 3,309,867 A | 3/1967 | Ehrich |
| 3,362,155 A | 1/1968 | Driscol |

(Continued)

FOREIGN PATENT DOCUMENTS

| | | |
|---|---|---|
| CN | 104110699 A | 10/2014 |
| CN | 204084467 U | 1/2015 |

(Continued)

OTHER PUBLICATIONS

Walker et al., "Integrated OGV Design for An Aggressive S-Shaped Compressor Transition Duct", Proceedings of ASME Turbo Expo, June 6-10, Vancouver, British Columbia, Canada, 11 pp.*

(Continued)

*Primary Examiner* — Christopher Verdier
(74) *Attorney, Agent, or Firm* — Raggio & Dinnin, P.C.; Kurt L. VanVoorhies

(57) ABSTRACT

A guide vane within an annular inlet duct of a gas-turbine engine provides for generating swirl within an annular inlet duct so as to provide for reducing the rate of deceleration of the inlet air flow within the annular inlet duct while providing for diffusion of the meridional component of velocity thereof.

21 Claims, 40 Drawing Sheets

(56) References Cited

U.S. PATENT DOCUMENTS

| | | | |
|---|---|---|---|
| 3,378,229 | A | 4/1968 | Erwin |
| 3,444,672 | A | 5/1969 | Alsobrooks |
| 3,723,021 | A | 3/1973 | Bartholomew |
| 3,832,086 | A | 8/1974 | Hull, Jr. et al. |
| 3,893,787 | A | 7/1975 | Jones |
| 4,129,985 | A | 12/1978 | Kajita et al. |
| 4,271,675 | A | 6/1981 | Jones et al. |
| 4,678,398 | A | 7/1987 | Dodge et al. |
| RE32,756 | E | 9/1988 | Mowill |
| 5,249,922 | A | 10/1993 | Sato et al. |
| 5,394,688 | A | 3/1995 | Amos |
| 5,479,782 | A | 1/1996 | Parker et al. |
| 5,730,580 | A | 3/1998 | Japikse |
| 6,152,724 | A | 11/2000 | Becker |
| 6,179,559 | B1 | 6/2001 | Weaver |
| 6,311,496 | B1 | 11/2001 | Alkabie |
| 6,438,961 | B2 | 8/2002 | Tuthill et al. |
| 6,662,546 | B1 | 12/2003 | Giffin, III |
| 7,195,456 | B2 | 3/2007 | Aggarwala et al. |
| 7,293,955 | B2 | 11/2007 | Lawlor et al. |
| 7,412,830 | B2 | 8/2008 | Sumser |
| 7,547,186 | B2 | 6/2009 | Schuster et al. |
| 7,553,129 | B2 * | 6/2009 | Hoeger ................ F01D 5/143 |
| | | | 415/193 |
| 7,794,201 | B2 | 9/2010 | Burton et al. |
| 7,806,653 | B2 | 10/2010 | Burton et al. |
| 8,075,259 | B2 | 12/2011 | Praisner et al. |
| 8,087,884 | B2 | 1/2012 | Wood et al. |
| 8,292,574 | B2 | 10/2012 | Wood et al. |
| 8,424,313 | B1 | 4/2013 | Praisner et al. |
| 8,517,677 | B2 | 8/2013 | Wood et al. |
| 9,004,850 | B2 | 4/2015 | Nichols et al. |
| 9,151,501 | B2 | 10/2015 | Negulescu |
| 9,347,663 | B2 | 5/2016 | Poyyapakkam et al. |
| 9,732,756 | B2 | 8/2017 | An et al. |
| 9,885,291 | B2 | 2/2018 | Lecordix et al. |
| 10,106,254 | B2 | 10/2018 | Vedamanikam |
| 10,883,515 | B2 * | 1/2021 | Lurie ................ F01D 9/041 |
| 2009/0263238 | A1 | 10/2009 | Jarrah |
| 2010/0209238 | A1 | 8/2010 | Praisner et al. |
| 2013/0167546 | A1 | 7/2013 | Chin |
| 2014/0290254 | A1 | 10/2014 | Manning et al. |
| 2016/0069275 | A1 | 3/2016 | Lecordix et al. |
| 2016/0076380 | A1 | 3/2016 | Van Ness et al. |
| 2017/0292393 | A1 * | 10/2017 | Anastas ................ F01D 5/082 |
| 2018/0202391 | A1 | 7/2018 | Wilson et al. |

FOREIGN PATENT DOCUMENTS

| | | |
|---|---|---|
| CN | 104373962 A | 2/2015 |
| CN | 204227465 U | 3/2015 |
| CN | 104566459 A | 4/2015 |
| CN | 204513457 U | 7/2015 |
| GB | 696817 A | 9/1953 |
| GB | 885908 A | 1/1962 |
| GB | 1454748 A | 11/1976 |
| GB | 2100361 A | 12/1982 |
| GB | 2405184 A | 2/2005 |
| JP | 2014211150 A | 11/2014 |
| WO | 9506822 A1 | 3/1995 |
| WO | 2011078740 A1 | 6/2011 |
| WO | 2014126994 A1 | 8/2014 |
| WO | 2016118133 A1 | 7/2016 |

OTHER PUBLICATIONS

Wallin et al., "Design of Integrated Turning Vanes for a Compressor Transition Duct", ISABE-2011-1213, Copyright 2011 by the American Institute of Aeronautics and Astronautics Inc., pp. 379-386.*

Bailey et al., "Performance Assessment of an Annular S-Shaped Duct", ASME-95-GT-242, ASME Journal of Turbomachinery, vol. 119, No. 1, Jan. 1997, 9 pp.

Yurko et al., "A New Approach to Designing the S-Shaped Annular Duct for Industrial Centrifugal Compressor", International Journal of Rotating Machinery, Hindawi Publishing Corp, vol. 2014, Article ID 925368, Oct. 16, 2014, 10 pp.

Morris et al., "Strut Influences within a Diffusing Annular S-Shaped Duct", ASME-98-GT-425, Jun. 1998, 8 pp.

Bu et al., "Investigation on Secondary Flow Characteristics in a Curved Annular Duct with Struts", Flow Turbulence and Combustion, vol. 97, Oct. 2015, 19 pp.

Bergstedt, R., "Aero-Design of Aerodynamically Lifting Struts for Intermediate Compressor Ducts", Royal Institute of Technology (KTH), Stockholm, Sweden, MSc Thesis, Jun. 2014, 11 pp.

Wallin et al.; "Aerodesign and Validation of Turning Struts for an Intermediate Compressor Duct", ISABE-2015-22143, The 22nd International Symposium on Air Breathing Engines (ISABE), Phoenix, AZ, Oct. 25-30, 2015, 10 pp.

Norris, G., "Flows Through S-Shaped Annular, Inter-Turbine Diffusers", School of Engineering, University of Durham; PhD Thesis, 1997, 186 pp.

Oates, Gordon C., "Inlet guide vane (IGV)", in Aerothermodynamics of Gas Turbine and Rocket Propulsion, Third Edition, American Institute of Aeronautics and Astronautics, Inc., Reston, VA, AIAA Education Series, J.S. Przemienieck, Series Editor-in-Chief, p. 335, copyright 1997.

Axelsson et al., "Design, Performance Evaluation and Endwall Flow Structure Investigation of an S-Shaped Intermediate Turbine Duct," ASME, GT2007-27650, Proceedings of GT2007, ASME Turbo Expo 2007; Montreal Canada, May 1-17, 2007, 9 pp.

Johansson, Martin, Aerothermal Study of Intermediate Turbine Ducts, Thesis for the Degree of Doctor of Philosophy in Thermo and Fluid Dynamics, Department of Applied Mechanics, Chalmers University of Technology, Gothenburg, Sweden, 2016, 79 pp.

* cited by examiner

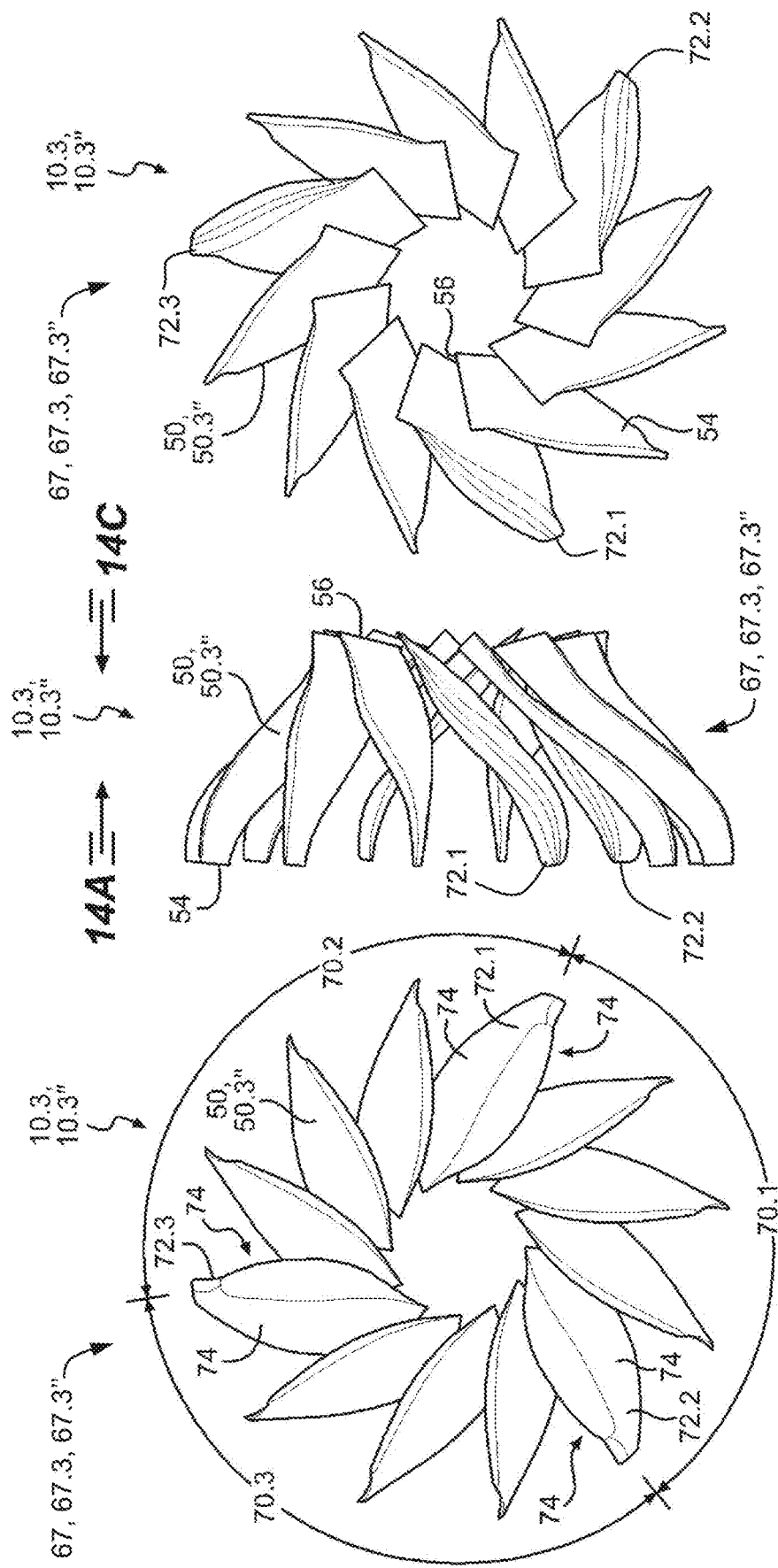

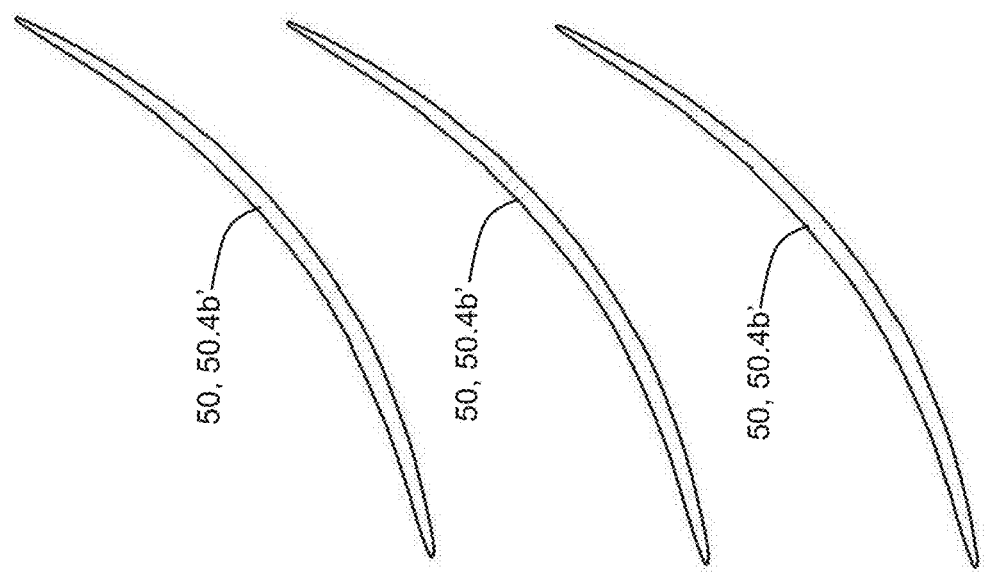
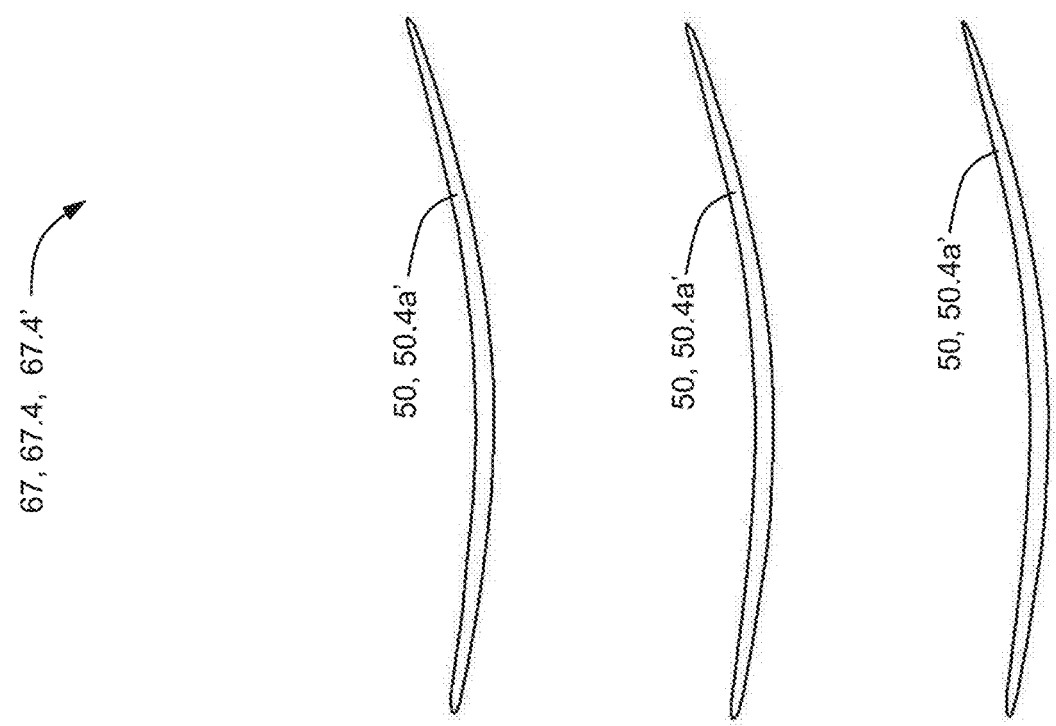
FIG. 21A

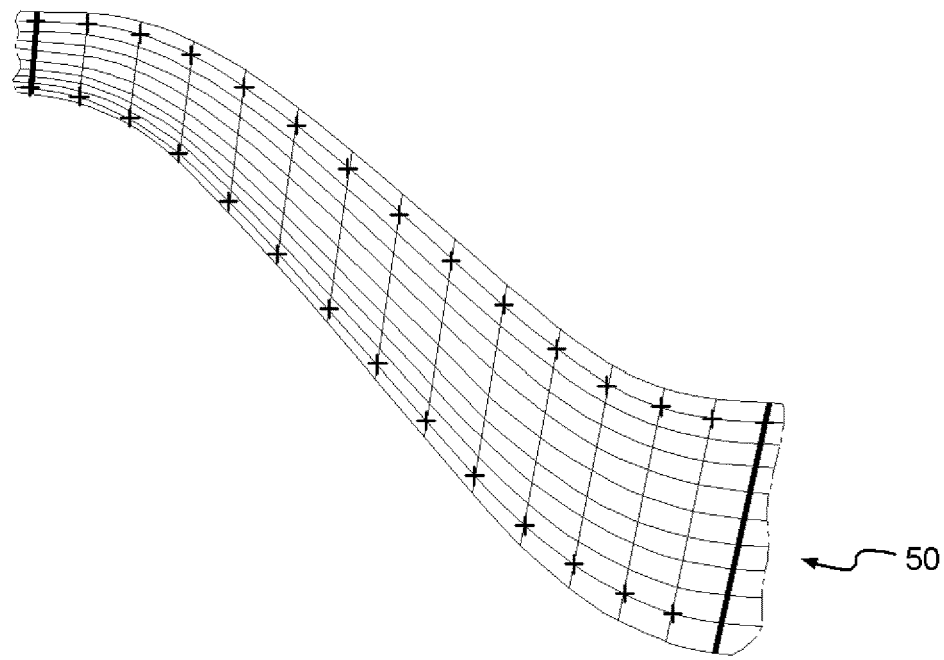
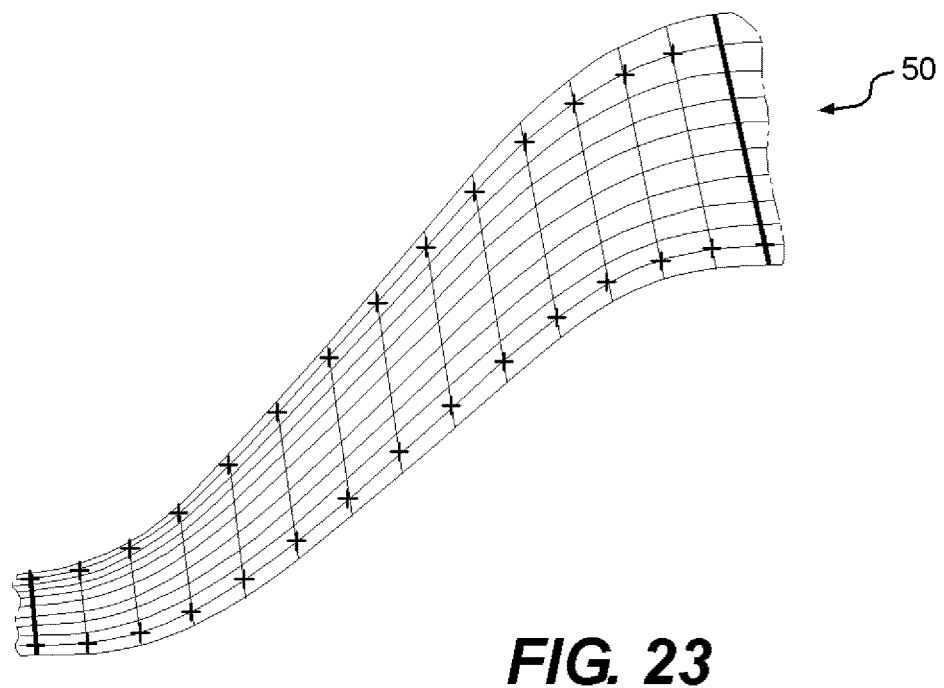
FIG. 23

US 11,396,888 B1

SYSTEM AND METHOD FOR GUIDING COMPRESSIBLE GAS FLOWING THROUGH A DUCT

CROSS-REFERENCE TO RELATED APPLICATIONS

The instant application claims the benefit of prior U.S. Provisional Application Ser. No. 62/583,651 filed on 9 Nov. 2017, which is incorporated herein by reference in its entirety.

BRIEF DESCRIPTION OF THE DRAWINGS

In the accompanying drawings:

FIG. 20A illustrates a first plan view of an inlet-guide-vane assembly in accordance with a second embodiment of the third aspect thereof, with the inlet-guide-vane assembly viewed from the inlet thereof, looking towards the outlet, and with the inlet-guide-vane assembly isolated from the associated inlet duct of an associated third aspect of an associated gas-turbine-engine inlet system, wherein the second embodiment of the third aspect inlet-guide-vane assembly is trifurcated, and provides for generating a co-swirl flow, with circulation in the same direction of rotation as the rotor of the gas-turbine engine;

FIG. 20B illustrates a side view an inlet-guide-vane assembly in accordance with the second embodiment of the third aspect thereof, plan views of which are illustrated in FIGS. 20A and 20C, with the inlet-guide-vane assembly isolated from the associated inlet duct of the third aspect of the associated gas-turbine-engine inlet system;

FIG. 20C illustrates a second plan view of the inlet-guide-vane assembly in accordance with the second embodiment of the third aspect thereof, a side view of which is illustrated in FIG. 20B, with the inlet-guide-vane assembly viewed from the outlet thereof, looking towards the inlet, with the inlet-guide-vane assembly isolated from the associated inlet duct of the third aspect of the associated gas-turbine-engine inlet system;

FIG. 21A illustrates a first embodiment of a fourth aspect of an inlet-guide-vane assembly incorporating a cascade tandem set of associated guide vanes;

FIG. 23 illustrates a core transition duct incorporating a guide-vane assembly, wherein the guide-vane assembly is configured in accordance with any of the first through fifth aspects of the inlet-guide-vane assembly illustrated in FIGS. 2A-2B, 3, 13A-13B, 14, 19, 20A, 20B, 20C, 21A, 21B or 22;

DESCRIPTION OF EMBODIMENT(S)

Figure 1:
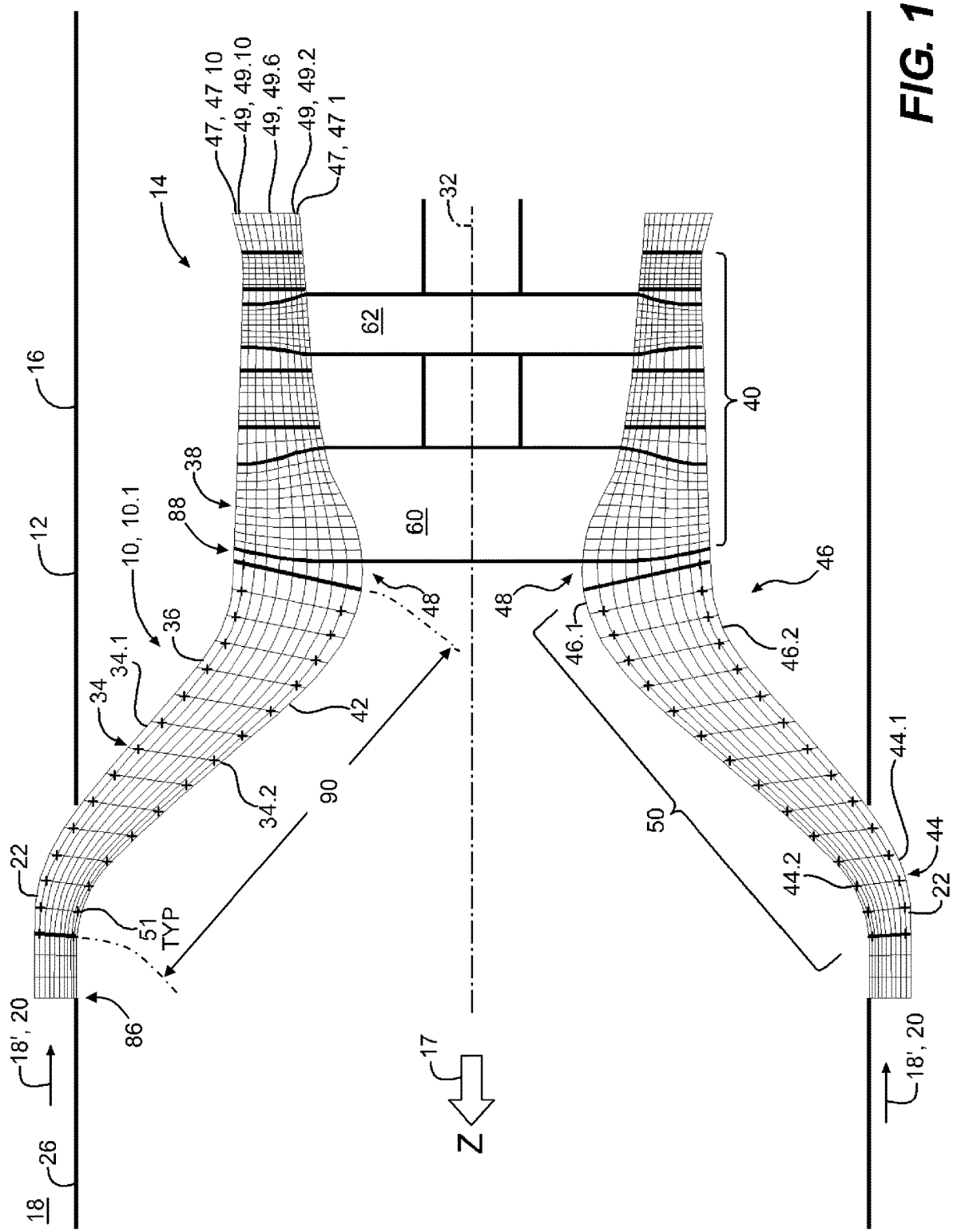
FIG. 1 illustrates a longitudinal cross-sectional view of a portion of a fuselage of a gas-turbine-engine powered aircraft or missile, through a first aspect of an associated gas-turbine-engine inlet system that provides for generating a co-swirl flow, with circulation in the same direction of rotation as the rotor of the gas-turbine engine, and further illustrating a portion of the compressor of the associated gas turbine engine, with the gas-turbine-engine powered aircraft or missile traveling through the atmosphere during normal operation thereof, further illustrating a plurality of stream-tubes of an associated flow simulation.
Figures 2A, 2B:
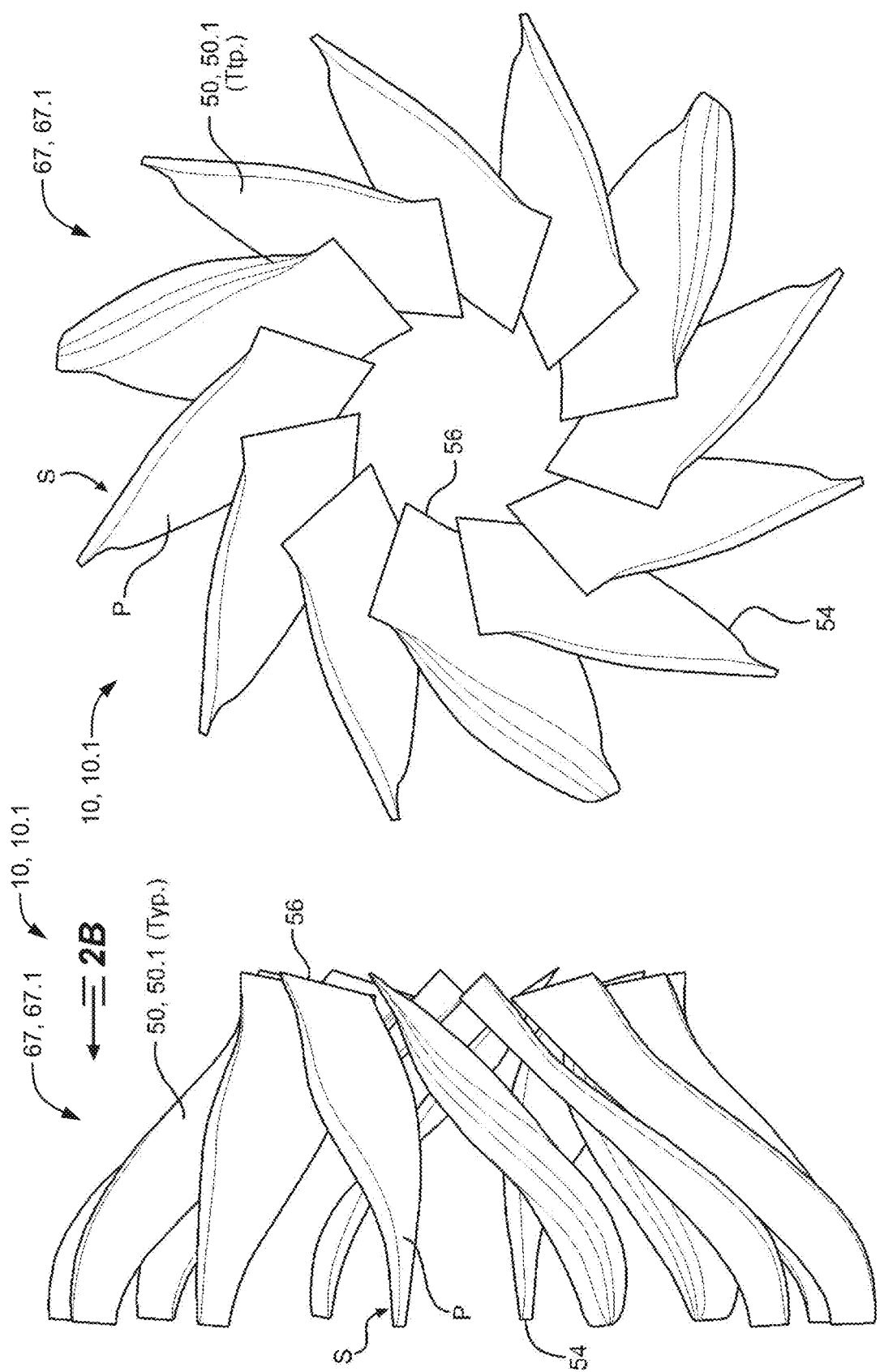
FIG. 2A illustrates a side view of an inlet-guide-vane assembly in accordance with the first aspect thereof, with the inlet-guide-vane assembly isolated from the associated inlet duct.
FIG. 2B illustrates a plan view of the inlet-guide-vane assembly illustrated in FIG. 2A, viewing the inlet-guide-vane assembly from the outlet thereof, looking towards the inlet, with the inlet-guide-vane assembly isolated from the associated inlet duct.

Referring to FIGS. 1-12, a first aspect 10.1 of a gas-turbine-engine inlet system 10, 10.1 is incorporated in an aircraft or missile 12 powered by a gas-turbine engine 14 that is located within the interior of the fuselage 16 of the aircraft or missile 12. The aircraft or missile 12 is illustrated traveling in a forward direction 17 through the atmosphere 18 at a relatively-high speed, resulting in a flow of inlet air 18' at a relatively-high axial velocity 20 relative to the aircraft or missile 12. The gas-turbine-engine inlet system 10, 10.1 may either incorporate a scoop inlet 22, or alternatively, a conformal inlet 24 that is flush with the outer surface 26 of the fuselage 16, consistent with inlets—also known as "submerged" or "scoop" or "flush" type inlets, or NACA inlets—that are integral with the fuselage for engines mounted internal to the fuselage, such as those found on missile and other combat aircraft installations.

The associated velocity vector of the flow of inlet air 18' within the gas-turbine-engine inlet system 10, 10.1 may be decomposed into corresponding orthogonal components of meridional velocity 28 and circumferential velocity 30, relative to a rotational-axis-centered coordinate system of the gas-turbine engine 14, wherein the meridional velocity 28 is co-planar the Z-axis thereof, the latter of which is colinear with the rotational axis 32 of the gas-turbine engine 14, and the circumferential velocity 30 is along a direction of rotation about the Z-axis.

In accordance with the first aspect 10.1, the gas-turbine-engine inlet system 10, 10.1 incorporates an annular inlet duct 34, wherein an outer surface 34.1 of the annular inlet duct 34 is bounded by a shroud surface 36 extending forward of the shroud 38 of the compressor portion 40 of the gas-turbine engine 14, and an inner surface 34.2 is bounded by a hub surface 42 that terminates forward of the compressor portion 40 of the gas-turbine engine 14. With the gas-turbine engine 14 located within the interior of the fuselage 16 of the aircraft or missile 12, the annular inlet duct 34 incorporates first 44 and second 46 curved portions that provide for guiding the flow of inlet air 18' from the scoop inlet 22 of the annular inlet duct 34 to the relatively-central inlet 48 of the compressor portion 40 of the gas-turbine engine 14, wherein the first curved portion 44 is relatively-upstream, and relatively-outboard, of the second curved portion 46. The first curved portion 44 comprises a region of concave curvature 44.1 along the outer surface 34.1 of the annular inlet duct 34, which causes a corresponding deceleration of flow therealong; and further comprises a region of convex curvature 44.2 along the inner surface 34.2 of the annular inlet duct 34, which causes a corresponding acceleration of flow therealong. Similarly, but for juxtaposed surfaces 34.2, 34.1 of the annular inlet duct 34, the second curved portion 46 comprises a region of concave curvature 46.1 along the inner surface 34.2 of the annular inlet duct 34, which causes a corresponding deceleration of flow therealong; and further comprises a region of convex curvature 46.2 along the outer surface 34.1 of the annular inlet duct 34, which causes a corresponding acceleration of flow therealong.

Referring to FIG. 1, the annular inlet duct 34 is illustrated in cooperation with ten stream tubes 47 that are annularly bounded by eleven corresponding stream lines 49, which are used together with computational fluid dynamics (CFD) analysis to characterize the associated air flow through the annular inlet duct 34, wherein the results below are provided for inboard 49.2 and outboard 49.10 streamlines within the annular inlet duct 34 associated with the inboard-most 47.1 and outboard-most 47.10 stream tubes that are respectively adjacent to the inner 34.2 and outer 34.1 surfaces of the annular inlet duct 34, and further results are provided along a mid-span streamline 49, 49.6. Each stream tube 47 defines a corresponding meridional path through the annular inlet duct 34, the distance along which is referred to as a corresponding meridional distance. The annular inlet duct 34 is further illustrated in cooperation with a plurality of numbered stations 51 that correspond to locations along each stream line 49, wherein like-numbered stations define a locus of points along a line or curve that extends transversely with respect to the streamlines 49. The associated stations 51 are counted from left to right in FIG. 1 beginning with 1, and the corresponding station numbers 51' are explicitly indicated in FIG. 4, wherein the inlet guide vanes 50 in FIGS. 1 and 4 extend from station No. 4 to station No. 18. During the CFD simulation, the apportionment of mass flow amongst the stream tubes 47, in order of stream tube No. 1 through stream tube No. 10, i.e. from innermost to outermost stream tube, is as follows: 1: 6.0%; 2: 7.0%; 3: 8.0%; 4: 8.5%; 5: 10.5%; 6: 12.0%; 7: 12.0%; 8: 12.0%; 9: 12.0%; 10: 12.0%.

The annular inlet duct 34 incorporates a plurality of full-span inlet guide vanes 50 (IGV), each of which extends across the annular inlet duct 34 between the shroud 36 and hub 42 surfaces and provides for guiding the incoming flow of inlet air 18' through the annular inlet duct 34 in such a way as to convert a portion of the component of meridional velocity 28 to a corresponding component of circumferential velocity 30, thereby inducing swirl in the flow of inlet air 18' within the annular inlet duct 34, which provides for an effective path length thereof that is longer than the axial length of the annular inlet duct, which provides for reducing the deceleration of the flow of inlet air 18' within the annular inlet duct 34, thereby providing for minimizing or eliminating pressure loss and distortion due to growth and separation of the associated boundary-layer that would otherwise be caused by rapid deceleration of the resultant flow velocity vector absent the inlet-guide-vane induced swirl. The reduction in deceleration of the resultant velocity vector enables an inlet system with a substantially shorter axial length than otherwise possible without the inlet guide vanes 50, so as to provide for reducing the volume within the fuselage 16 of the aircraft or missile 12 that is occupied by the gas-turbine-engine inlet system 10, 10.1, and so as to provide for relatively-higher pressure recovery and relatively-lower velocity and pressure field distortion at the engine face, compared with what would otherwise be possible for an annular inlet duct 34 of similar length, but without the inlet guide vanes 50. When used with a gas-turbine engine 14 internally-mounted in the fuselage 16 of the aircraft or missile 12, the relatively-shortened intake duct provides a relatively-increased volume available for additional fuel (or other items) within a given fuselage. When used with a gas-turbine engine 14 mounted in a nacelle external to the fuselage 16 of the aircraft or missile 12, the relatively-reduced length and volume occupied by the relatively-shortened intake duct and engine installation provide similar benefits within the nacelle.

More particularly, referring also to FIGS. 5A-12—with FIGS. 5A-9 illustrating the components of meridional velocity 28 and circumferential velocity 30, and the total velocity magnitude, respectively, as a function of station number 51' along streamlines 49 between an associated adjacent pair of inlet guide vanes 50, 50.1—the inlet guide vanes 50, 50.1 provides for transforming a portion of the component of meridional velocity 28 of the flow of inlet air 18' in the annular inlet duct 34 to circumferential velocity 30 at a controlled rate while substantially decreasing the mean radius of the associated flow field and decreasing the associated meridional velocity 28 thereof, at the inlet 48 of the compressor portion 40 of the gas-turbine engine 14. Furthermore, referring to FIG. 9, the particular inlet guide vanes 50, 50.1 and annular inlet duct 34 illustrated in FIGS. 1-4 for the first aspect 10.1 of the gas-turbine-engine inlet system 10, 10.1 provides for increasing the magnitude of the total velocity of the flow of inlet air 18' through the annular inlet duct 34. Alternatively, the inlet guide vanes 50, 50.1 could be configured to provide for a substantially level (i.e. constant) total velocity through the annular inlet duct 34. Referring to FIGS. 1-4, the circumferential velocity 30 at the face of the fan or compressor portion 40 of the gas-turbine engine 14 may be imparted by the inlet guide vanes 50, 50.1 so as to co-swirl in a direction that is the same as the direction of rotation of the gas-turbine engine 14.

Due to the curvature of the inner 34.2 and outer 34.1 surfaces, the required distribution of imparted tangential velocity from entry to exit for optimum aerodynamics is very different along the inner surface 34.2 than it is along the outer surface 34.1. Near the inner surface 34.2, no tangential velocity acceleration is needed in the entry region, because there the convex curvature 44.2 of the hub has a tendency to over-accelerate the flow as it is. Nearer to the exit, the concave curvature 46.1 along the inner surface 34.2 dramatically reduces the meridional velocity, so tangential velocity acceleration is concentrated there to speed up the overall flow velocity and keep it from separating. For example, as a result, referring to FIG. 5A, the tangential velocity increases substantially faster for station Nos. 9-18 than for station Nos. 4-8.

The opposite occurs along streamlines near the outer surface 34.1. Concave curvature 44.1 along the outer surface 34.1 near the entrance dramatically reduces the meridional velocity, so tangential velocity acceleration needs to be added there to reduce the overall deceleration rate. Closer to the exit, the outer surface 34.1 curvature 46.2 is convex, tending to accelerate the flow. Not much (if any) tangential velocity needs to be added in the exit region. In fact, it might be advantageous to shape the vanes so they remove some tangential velocity there, depending upon what would help make the fan blade design more optimum in the outboard region.

The area distribution itself is much less a factor than local wall curvature in determining the velocity distribution through areas of the intake duct that this concept is intended to address. FIGS. 5A-5C respectively illustrates plots of the following family of velocity measures for a relatively-inboard streamline 49.2 (FIG. 5A), a mid-span streamline 49.6 (FIG. 5B), and a relatively-outboard streamline 49.10 (FIG. 5C), for each of the associated streamlines 49 illustrated in FIG. 1 at station numbers 4 through 18 (illustrated in FIG. 4 for the relatively-inboard 49.2 and relatively-outboard 49.10 streamlines): a) a meridional velocity component for the annular inlet duct 34 but without the inlet guide vane 50, 50.1, b) a circumferential velocity component 30 for the annular inlet duct 34 with the inlet guide vane 50, 50.1, c) meridional velocity component for the annular inlet duct 34 with the inlet guide vane 50, 50.1 and d) the total velocity for the annular inlet duct 34 with the inlet guide vane 50, 50.1, each as a function of station number 51', for a particular operating condition of the gas-turbine-engine powered missile 12;

FIGS. 5A-5C illustrates how the addition of a circumferential flow velocity component 30 to an annular intake air flow that is meridionally decelerating can be an effective way to reduce diffusion, and thereby avoid boundary layer momentum losses and flow separation.

The lines labeled "Vmerid, no Vircumf" with diamond symbols illustrates the air flow velocity distribution in an example annular inlet duct 34 without any circumferential velocity components 30 in the flow, i.e. without the presence of the associated inlet guide vanes 50, 50.1, so that the flow has only a meridional velocity. Without any circumferential velocity component 30, the meridional velocity decelerates from over 856 ft/sec at the entrance to 372 ft/sec at the exit, which is well over 55% diffusion, which indicates that the pressure gradient driving the boundary layer is strongly adverse, with a high level of momentum loss and high likelihood of flow separation.

The lines labeled "Imparted Vcircumf" with square symbols illustrates the component of circumferential velocity 30 imparted by the associated inlet guide vanes 50, 50.1 within the annular inlet duct 34, which causes a reduction in air density, wherein the associated component of meridional velocity 28 is increased substantially relative to what would occur without inlet guide vanes 50, 50.1, as illustrated by the line labeled "Vmerid w/ Vcircumf" with "X" symbols.

The lines labeled "Vtotal w/ Vcircumf" with triangular symbols illustrates the resultant total velocity, i.e. the vector sum of the associated meridional 28 and circumferential 30 components of velocity, which shows that the velocity decelerates from 856 ft/sec at the entrance of the inlet guide vanes 50, 50.1 of the annular inlet duct 34 to 715 ft/s at the corresponding exit, which corresponds to an overall diffusion of less than 17%. For this case, the lowest velocity in the annular inlet duct 34 is 630 ft/s, corresponding to a peak diffusion level of less than 27%, which provides for a substantially-less adverse pressure gradient that can act to drive development of the associated boundary layer, which results in a relatively-lower level of momentum loss, and a relatively-reduced likelihood of flow separation than would otherwise occur without the presence of the inlet guide vanes 50, 50.1 in the annular inlet duct 34.

Figure 4:
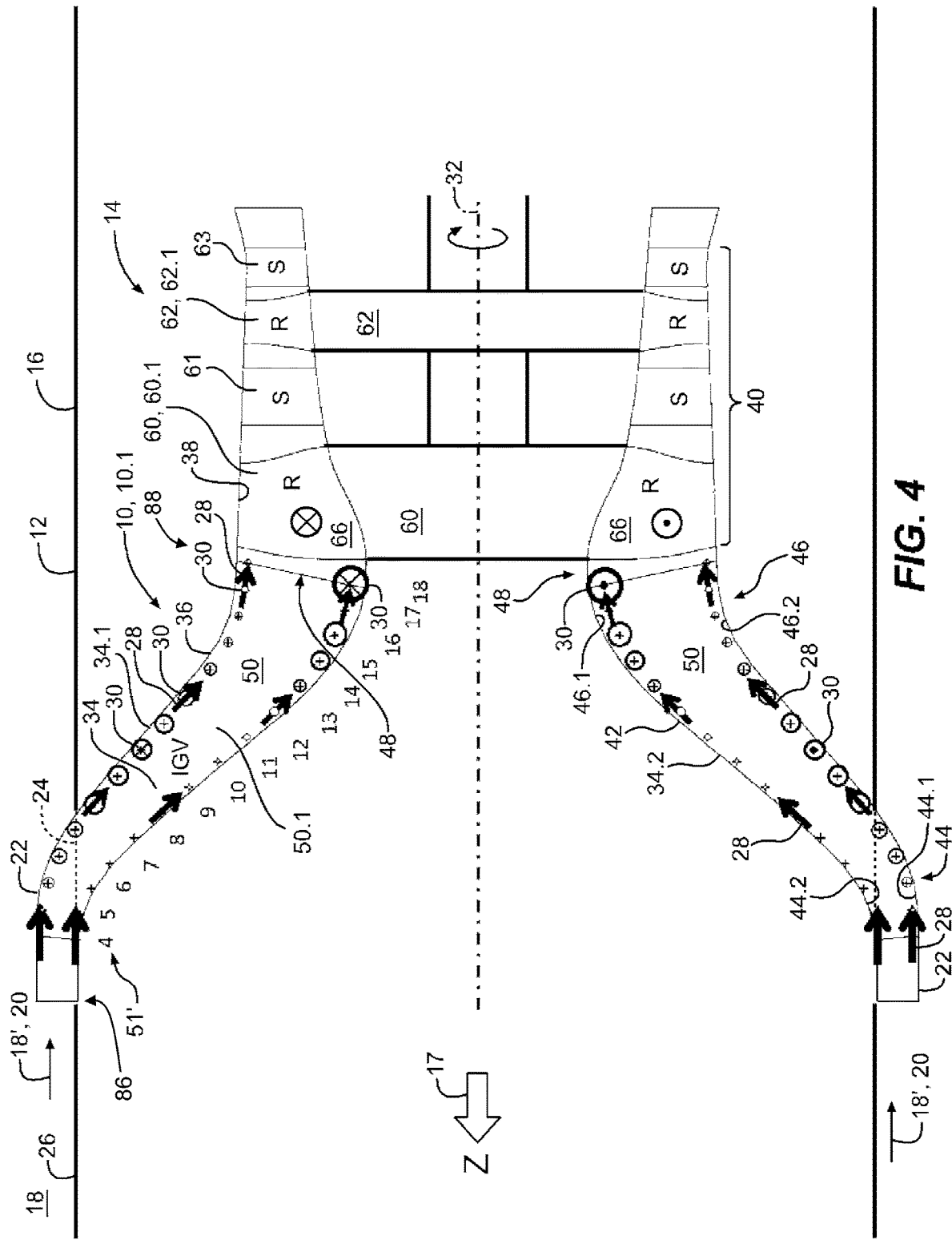
FIG. 4 illustrates a counterpart of the longitudinal cross-sectional view illustrated in FIG. 1, but without the associated stream-tubes, but with locations of station points 4 through 18 within the region of the inlet guide vanes along the inboard-most and outboard-most streamlines illustrated in FIG. 1, together with an illustration of the relative magnitudes of the associated meridional and circumferential velocity components at selected station points.
Figure 5A:
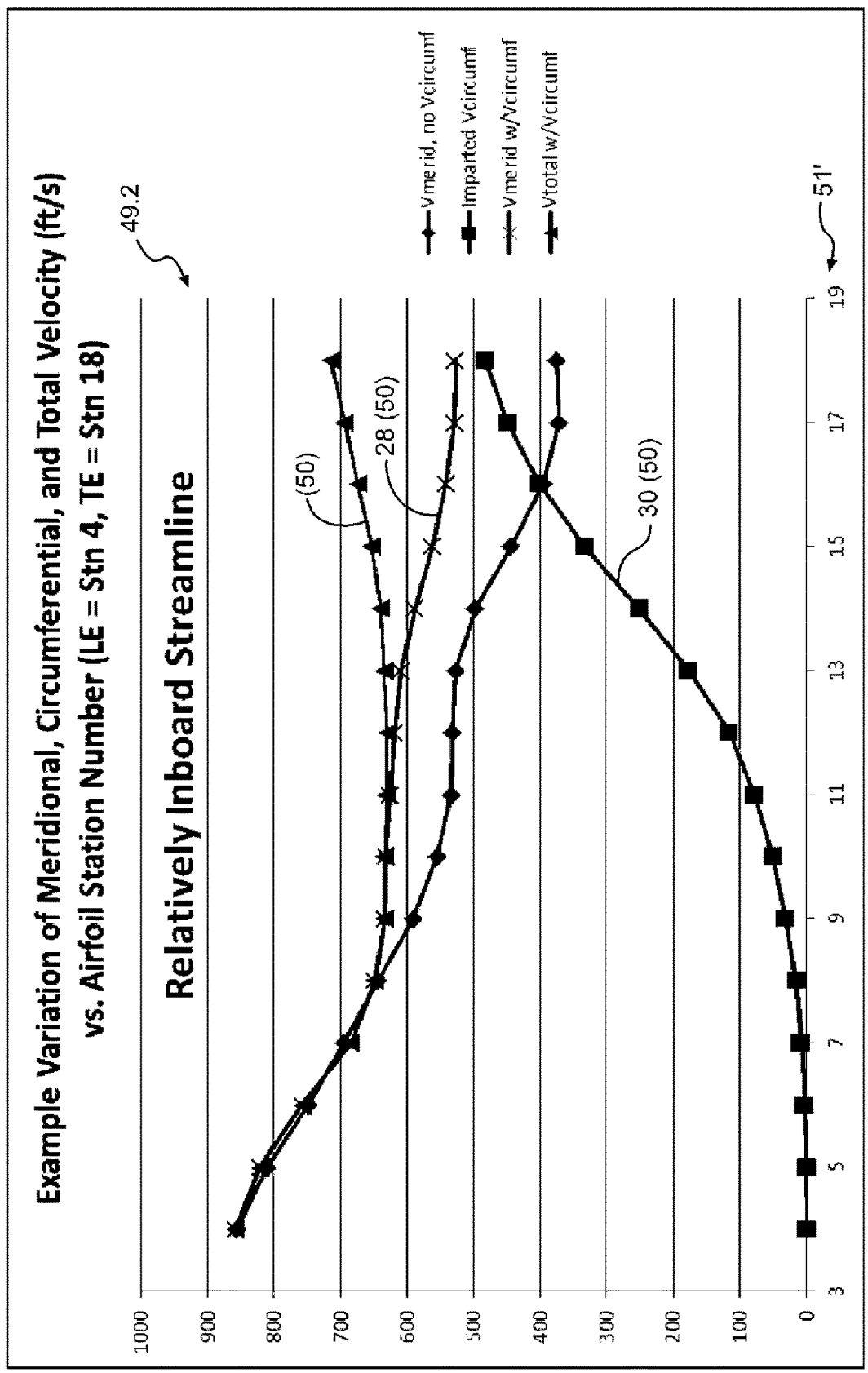
FIG. 5A illustrates plots of the following family of velocity measures of a relatively-inboard streamline illustrated in FIG. 1 at station numbers 4 through 18 illustrated in FIG. 4: a) meridional velocity component for the inlet duct but without the inlet guide vane, b) circumferential velocity component for the inlet duct with the inlet guide vane, c) meridional velocity component for the inlet duct with the inlet guide vane and d) the total velocity for the inlet duct with the inlet guide vane, each as a function of station number, for a particular operating condition of the gas-turbine-engine powered aircraft or missile.
Figure 5B:
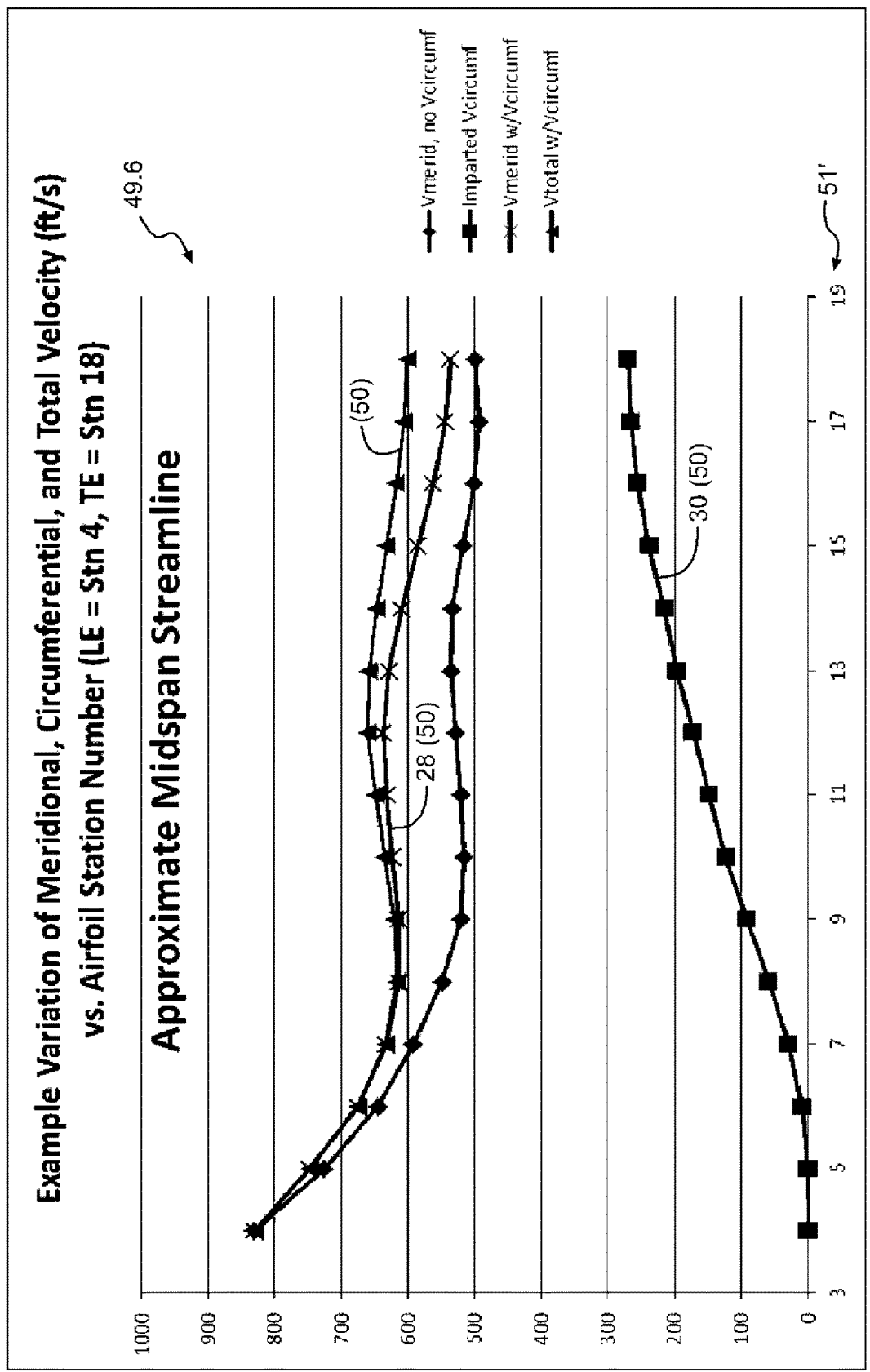
FIG. 5B illustrates plots of the following family of velocity measures of an approximate mid-span streamline illustrated in FIG. 1 at station numbers 4 through 18 illustrated in FIG. 4: a) meridional velocity component for the inlet duct but without the inlet guide vane, b) circumferential velocity component for the inlet duct with the inlet guide vane, c) meridional velocity component for the inlet duct with the inlet guide vane and d) the total velocity for the inlet duct with the inlet guide vane, each as a function of station number, for the particular operating condition of the gas-turbine-engine powered aircraft or missile associated with FIG. 5A.
Figure 5C:
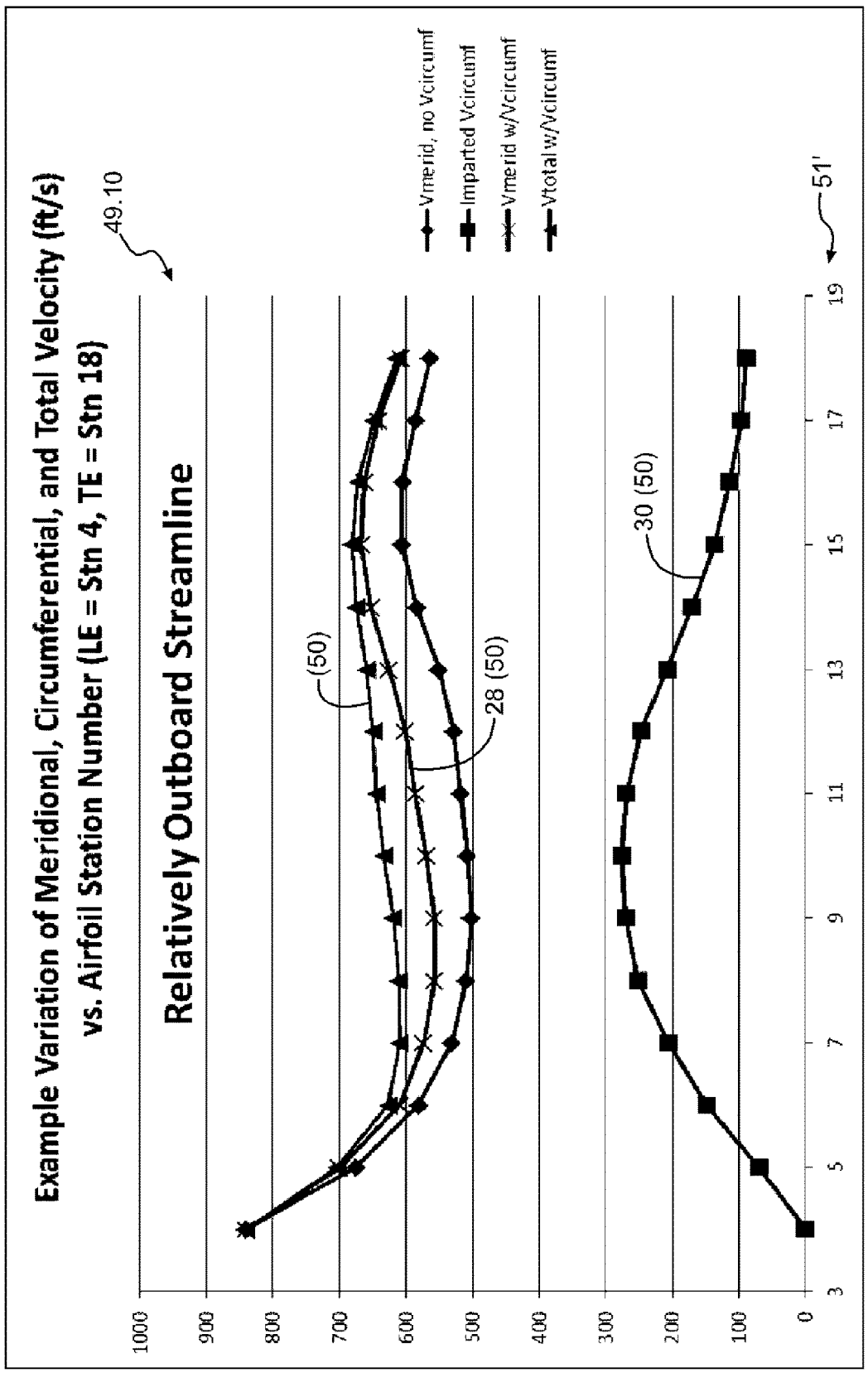
FIG. 5C illustrates plots of the following family of velocity measures of a relatively-outboard streamline illustrated in FIG. 1 at station numbers 4 through 18 illustrated in FIG. 4: a) meridional velocity component for the inlet duct but without the inlet guide vane, b) circumferential velocity component for the inlet duct with the inlet guide vane, c) meridional velocity component for the inlet duct with the inlet guide vane and d) the total velocity for the inlet duct with the inlet guide vane, each as a function of station number, for the particular operating condition of the gas-turbine-engine powered aircraft or missile associated with FIGS. 5A and 5B.
Figure 6:
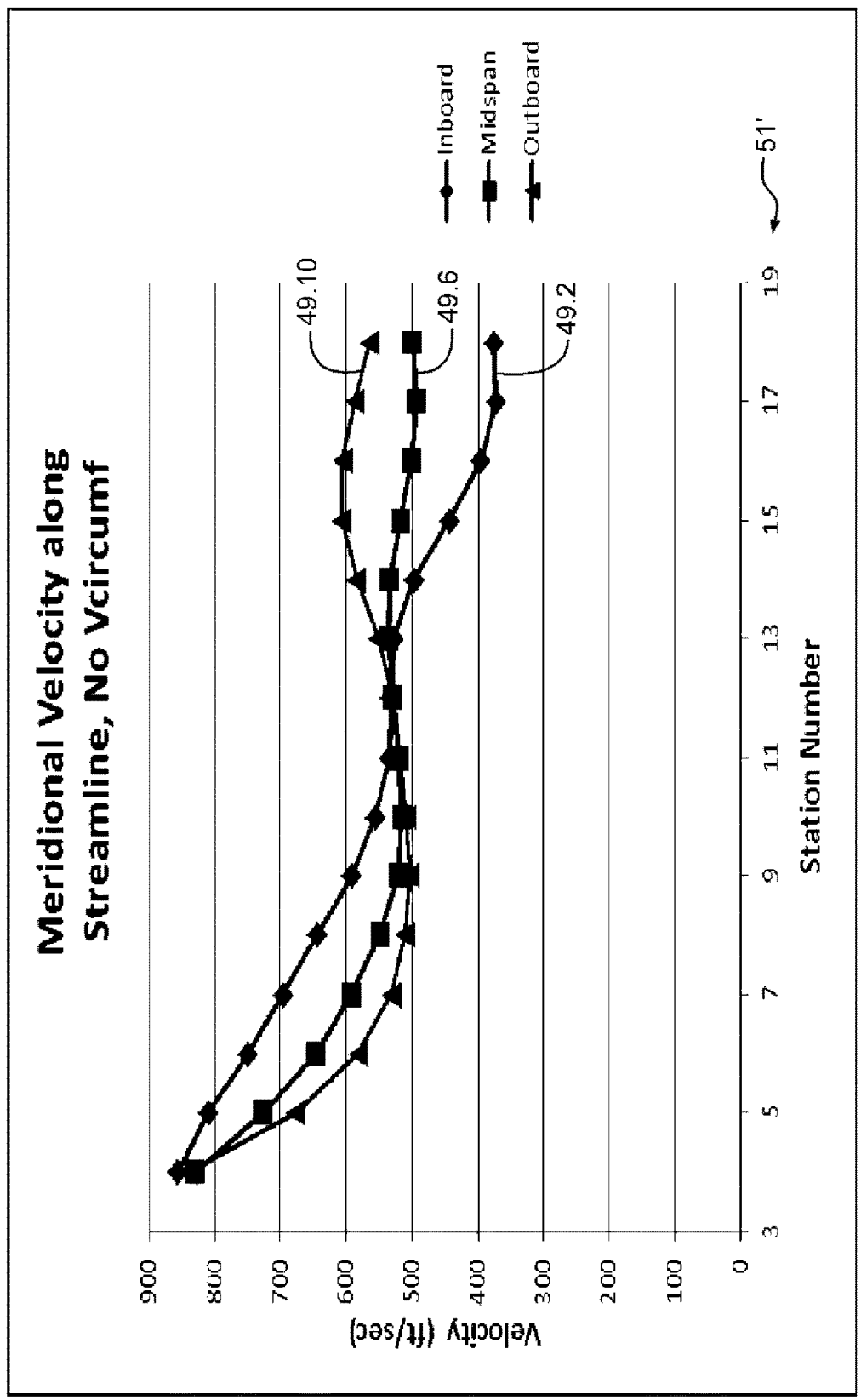
FIG. 6 illustrates a plot of the meridional velocity component for the inlet duct but without the inlet guide vane, at station numbers 4 through 18 illustrated in FIG. 4, each as a function of station number, for a family of three different streamlines illustrated in FIGS. 5A, 5B and 5C, respectively associated with a relatively-inboard streamline, an approximate mid-span streamline, and a relatively-outboard streamline, respectively, for the particular operating condition of the gas-turbine-engine powered aircraft or missile associated with FIGS. 5A through 5C.

FIGS. 6, 7, 8 and 9 respectively illustrate a plots of a) the meridional velocity component 28 for the annular inlet duct 34 but without the inlet guide vanes 50, 50.1 (FIG. 6), b) the meridional velocity component for the annular inlet duct 34 with the inlet guide vanes 50, 50.1 (FIG. 7), c) the circumferential velocity component 30 for the annular inlet duct 34 with the inlet guide vanes 50, 50.1 (FIG. 8), and d) the total velocity for the annular inlet duct 34 with the inlet guide vanes 50, 50.1 (FIG. 9), at station numbers 4 through 18 illustrated in FIG. 4, each as a function of station number 51', for the family of three different streamlines illustrated in FIGS. 5A, 5B and 5C, respectively associated with a relatively-inboard streamline 49.2, an approximate mid-span streamline 49.6, and a relatively-outboard streamline 49.10, respectively, for a particular operating condition of the gas-turbine-engine powered aircraft or missile 12.

Figure 7:
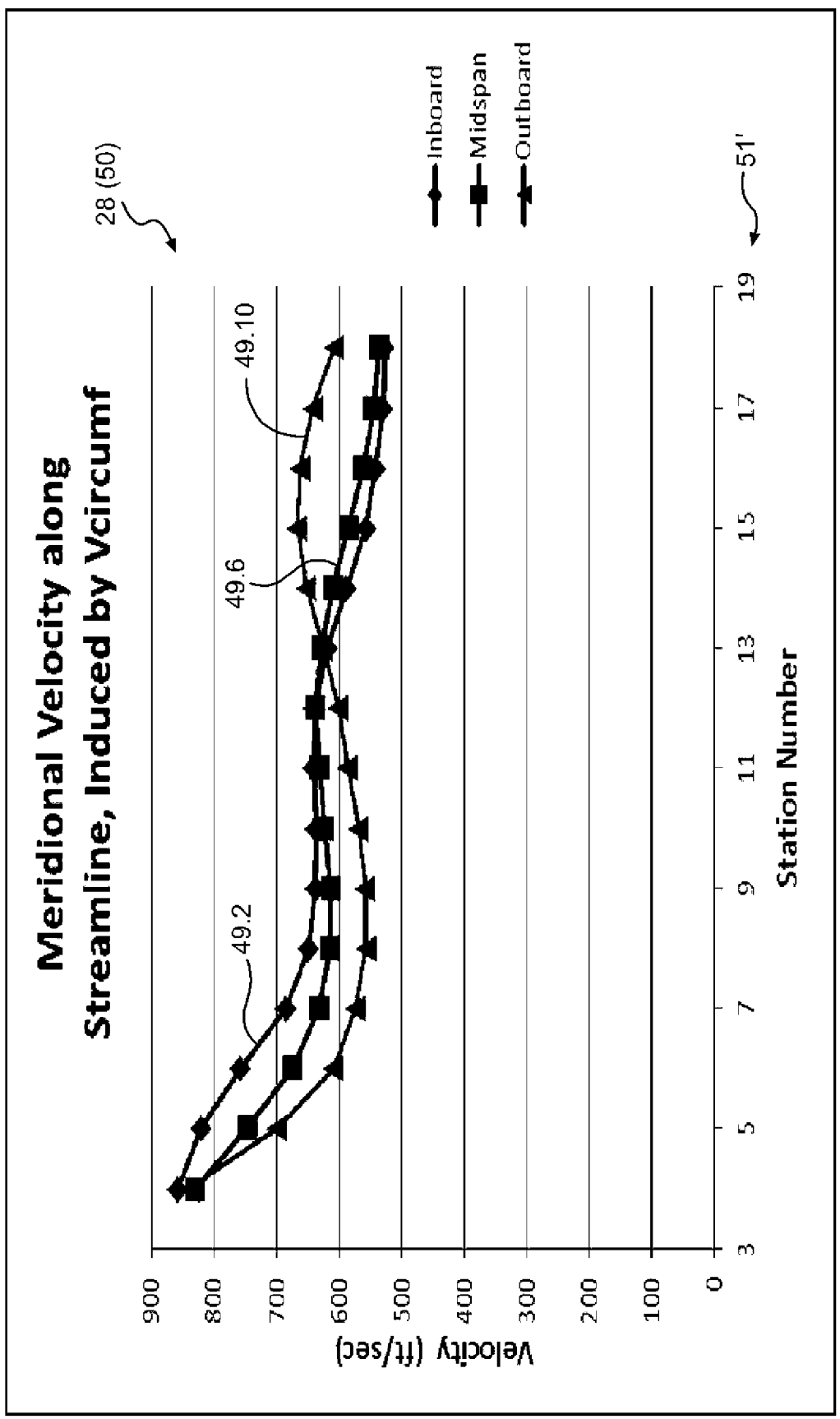
FIG. 7 illustrates a plot of the meridional velocity component for the inlet duct with the inlet guide vane, at station numbers 4 through 18 illustrated in FIG. 4, each as a function of station number, for a family of three different streamlines illustrated in FIGS. 5A, 5B and 5C, respectively associated with a relatively-inboard streamline, an approximate mid-span streamline, and a relatively-outboard streamline, respectively, for the particular operating condition of the gas-turbine-engine powered aircraft or missile associated with FIGS. 5A through 6.
Figure 8:
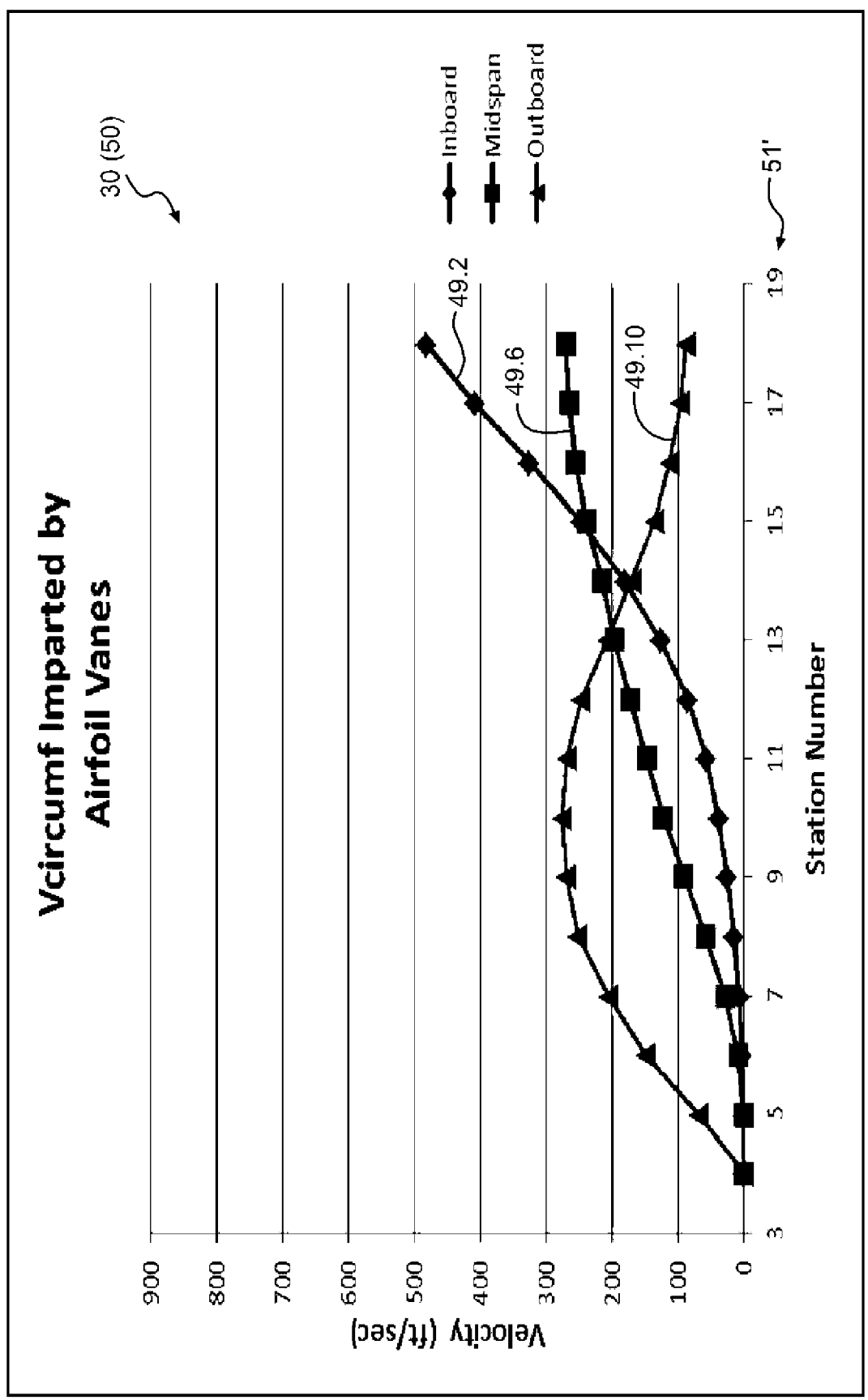
FIG. 8 illustrates a plot of the circumferential velocity component for the inlet duct with the inlet guide vane, at station numbers 4 through 18 illustrated in FIG. 4, each as a function of station number, for a family of three different streamlines illustrated in FIGS. 5A, 5B and 5C, respectively associated with a relatively-inboard streamline, an approximate mid-span streamline, and a relatively-outboard streamline, respectively, for the particular operating condition of the gas-turbine-engine powered aircraft or missile associated with FIGS. 5A through 7.
Figure 9:
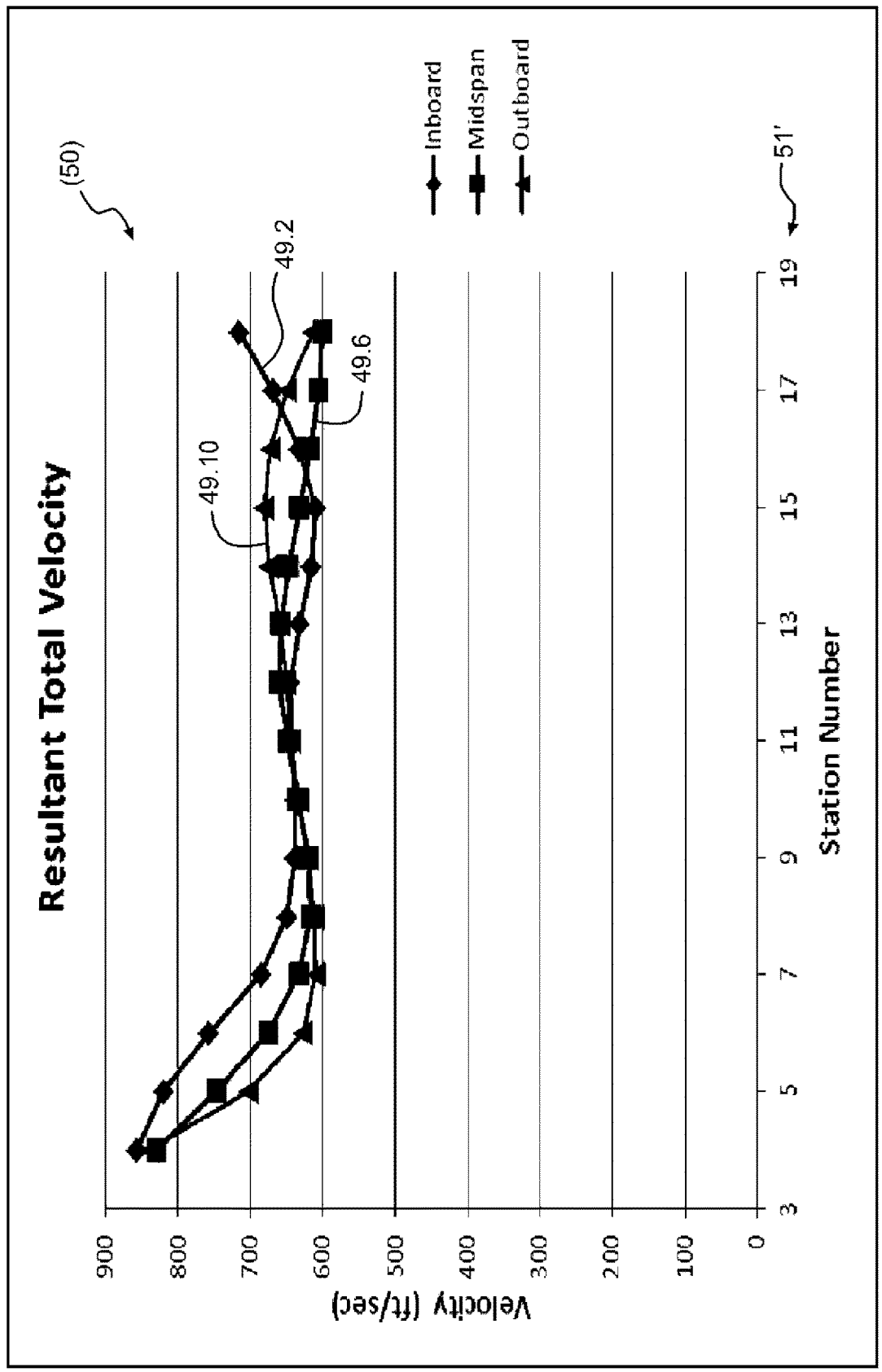
FIG. 9 illustrates a plot of the total velocity for the inlet duct with the inlet guide vane, at station numbers 4 through 18 illustrated in FIG. 4, each as a function of station number, for a family of three different streamlines illustrated in FIGS. 5A, 5B and 5C, respectively associated with a relatively-inboard streamline, an approximate mid-span streamline, and a relatively-outboard streamline, respectively, for the particular operating condition of the gas-turbine-engine powered aircraft or missile associated with FIGS. 5A through 8.
Figure 10:
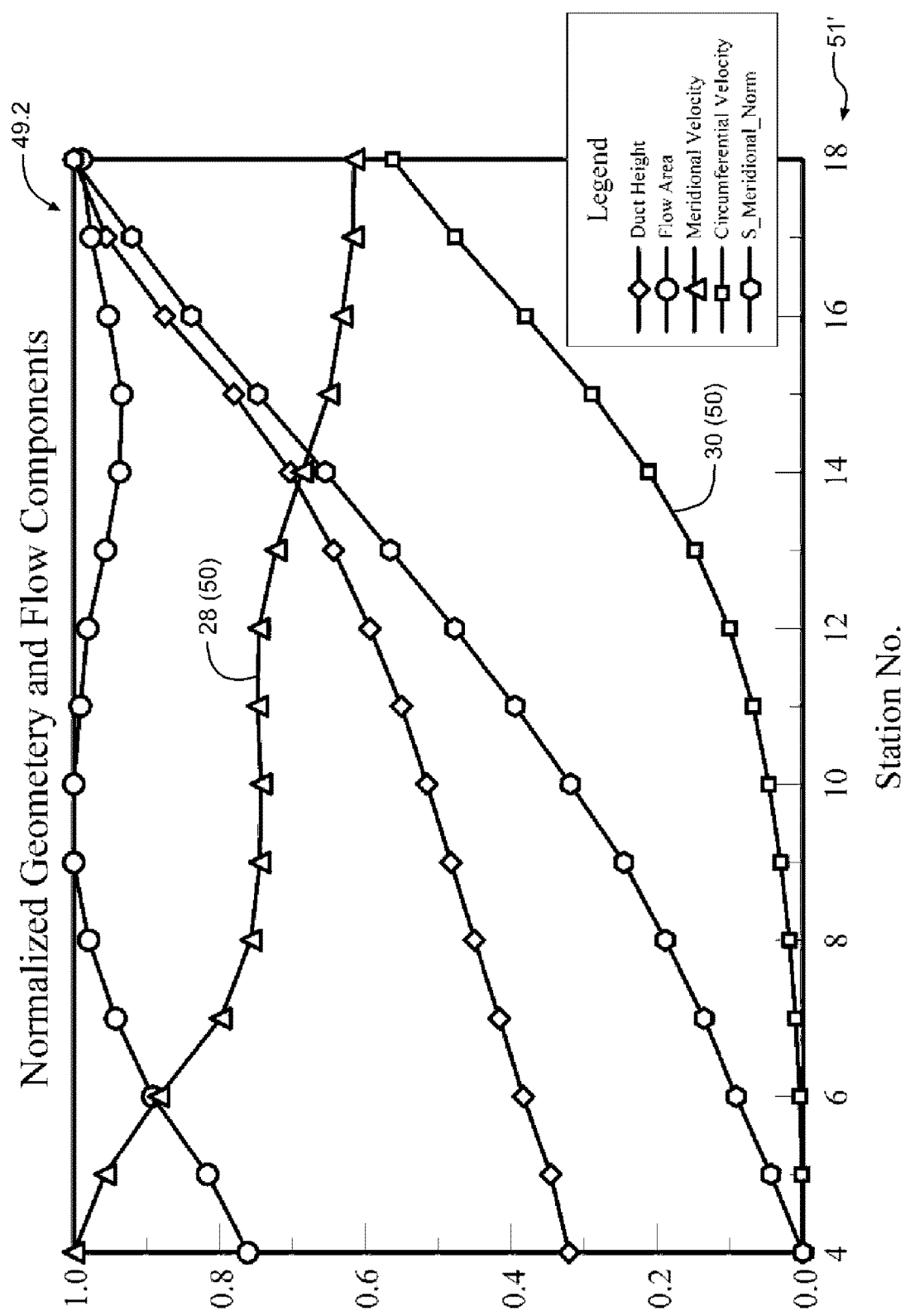
FIG. 10 illustrates plots of normalized duct height, normalized flow area, normalized meridional velocity, normalized circumferential velocity and normalized meridional distance along the streamline, each as a function of station number, for the relatively-inboard streamline illustrated in FIGS. 1 and 4, associated with data illustrated in FIGS. 5A, 7 and 8.
Figure 11:
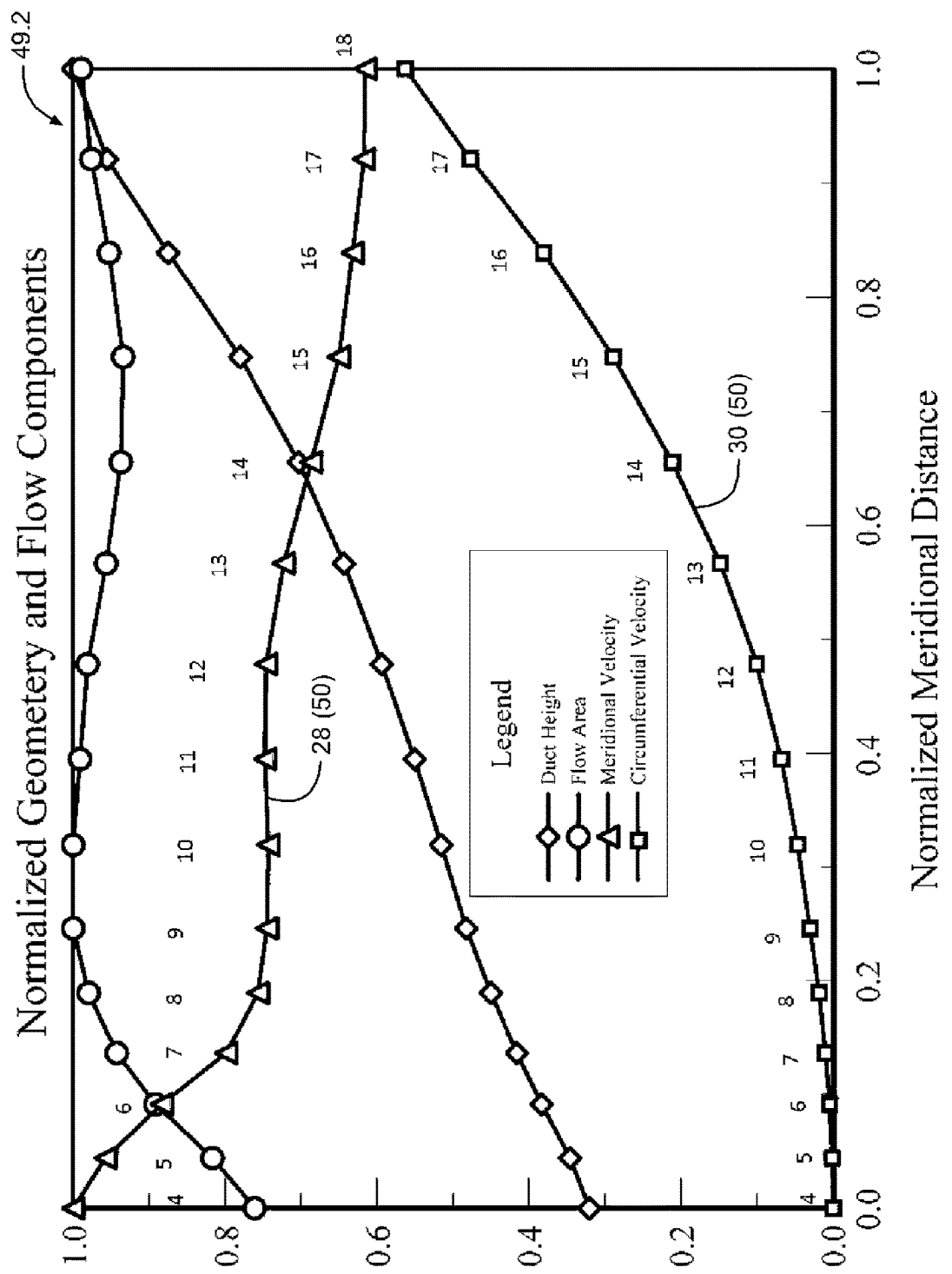
FIG. 11 illustrates plots of normalized duct height, normalized flow area, normalized meridional velocity, and normalized circumferential velocity, each as a function of normalized meridional distance along the streamline, for the relatively-inboard streamline illustrated in FIGS. 1 and 4, associated with data illustrated in FIGS. 5A, 7 and 8.
Figure 12:
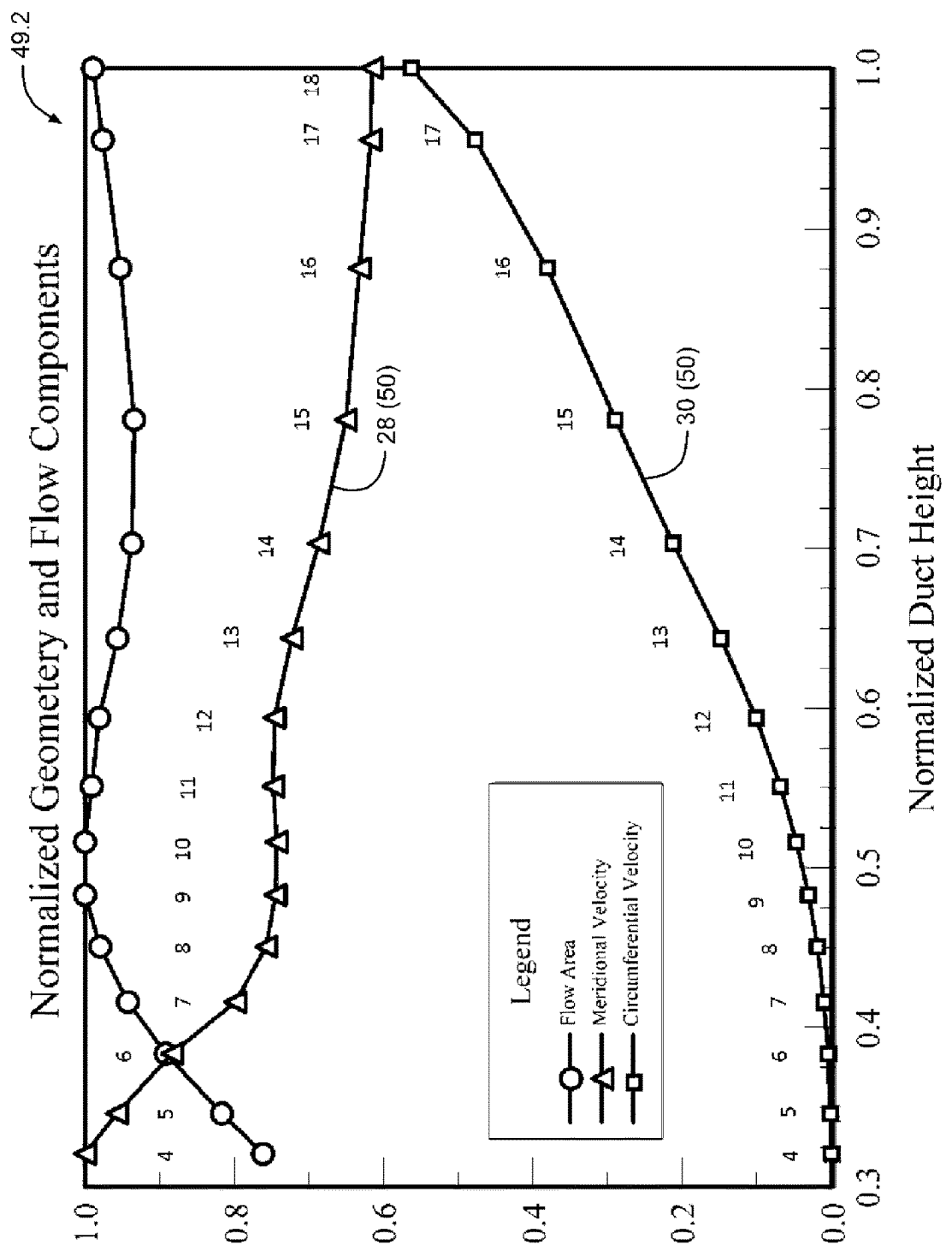
FIG. 12 illustrates plots of normalized flow area, normalized meridional velocity, and normalized circumferential velocity, each as a function of normalized duct height, for the relatively-inboard streamline illustrated in FIGS. 1 and 4, associated with data illustrated in FIGS. 5A, 7 and 8.
Figures 13A, 13B:
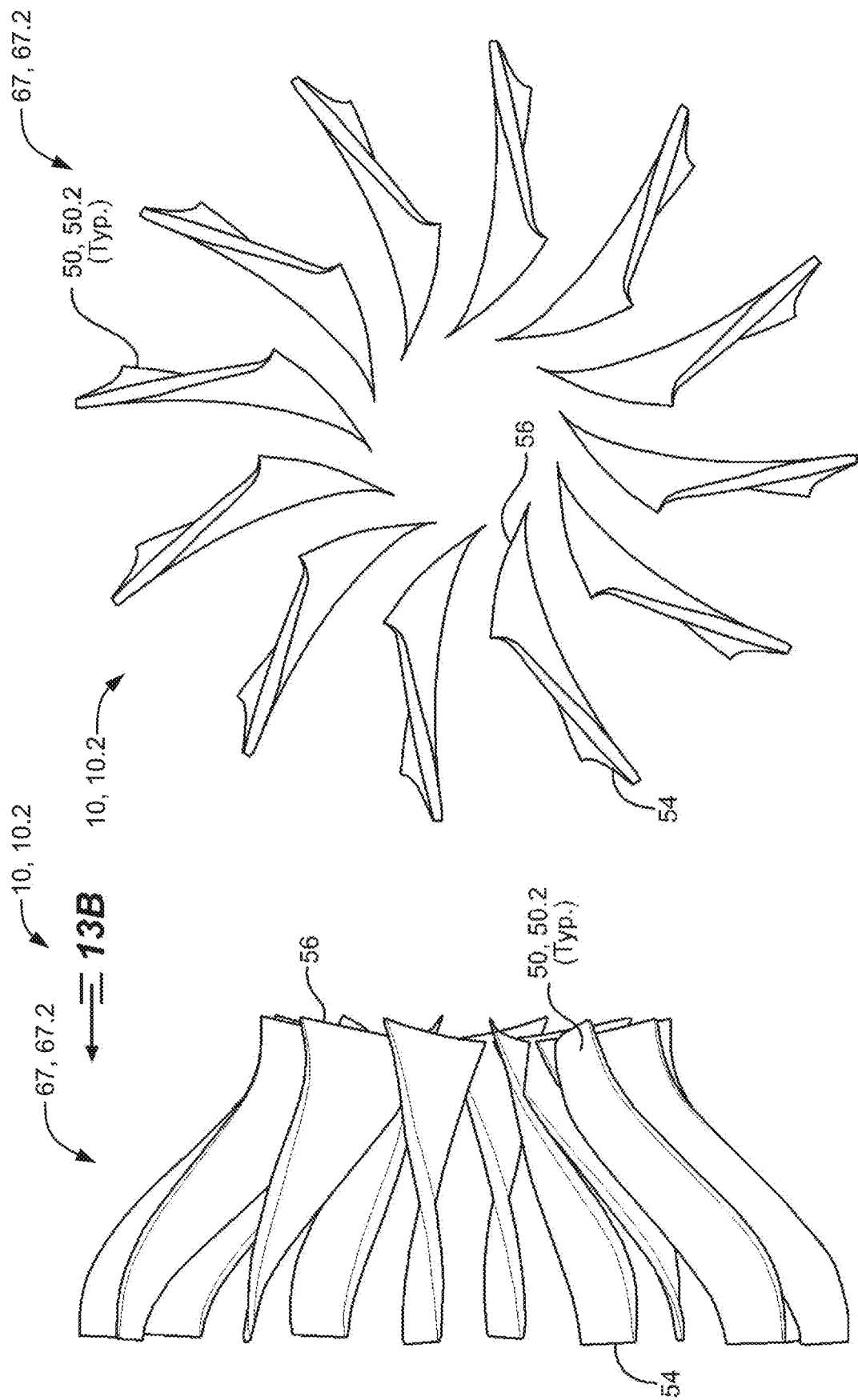
FIG. 13A illustrates a side view an inlet-guide-vane assembly in accordance with the second aspect thereof, with the inlet-guide-vane assembly isolated from the associated inlet duct.
FIG. 13B illustrates a plan view of the inlet-guide-vane assembly illustrated in FIG. 13A, viewing the inlet-guide-vane assembly from the outlet thereof, looking towards the inlet, with the inlet-guide-vane assembly isolated from the associated inlet duct.

FIGS. 10, 11 and 12 respectively illustrate plots of normalized duct height (FIGS. 10 and 11 only), normalized flow area, normalized meridional velocity 28, normalized circumferential velocity 30 and normalized meridional distance along the streamline ("S_Meridional_Norm", FIG. 10 only), each respectively as a function of station number 51' (FIG. 10), normalized meridional distance ("S_Meridional_Norm") along the streamline (FIG. 11) and normalized duct height (FIG. 12), for the relatively-inboard streamline 49.2 illustrated in FIGS. 1 and 4, associated with data illustrated in FIGS. 5A, 7 and 8. For example, FIGS. 10 and 11 illustrate that the flow area at the exit 88 of the duct 34 (associated with the station number 51' designated as "18" at a normalized meridional distance of 1.0), is greater than the flow area at the entrance 86 of the duct 34 (associated with the station number 51' designated as "4" at a normalized meridional distance of 0.0).

Figure 3:
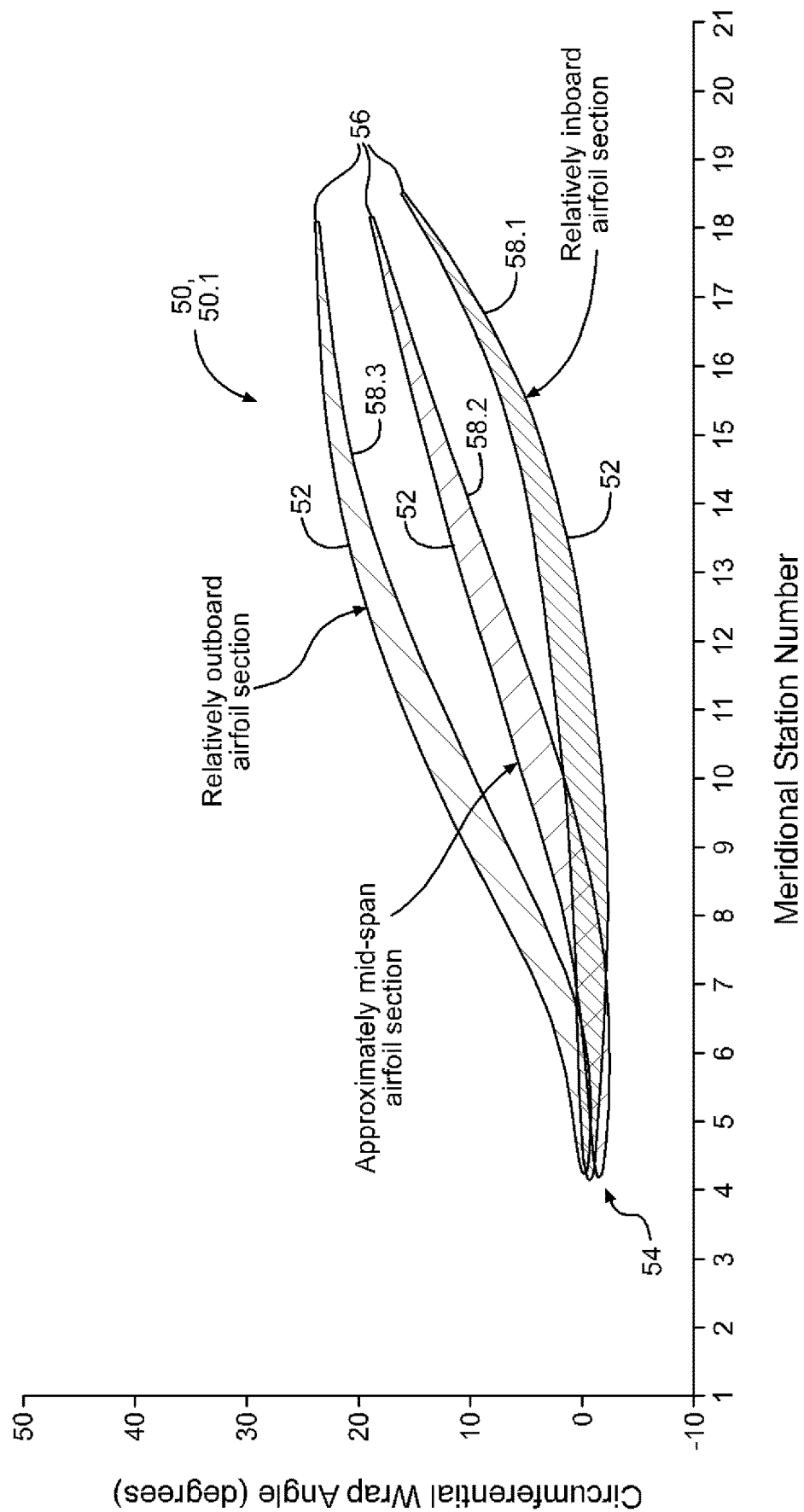
FIG. 3 illustrates three meridionally-transverse cross-sectional views of one of the inlet guide vanes of the inlet-guide-vane assembly illustrated in FIGS. 2A and 2B at the following three locations along the height of the inlet guide vane: a relatively-inboard location, an approximately mid-span location, and a relatively-outboard location.
Figure 14:
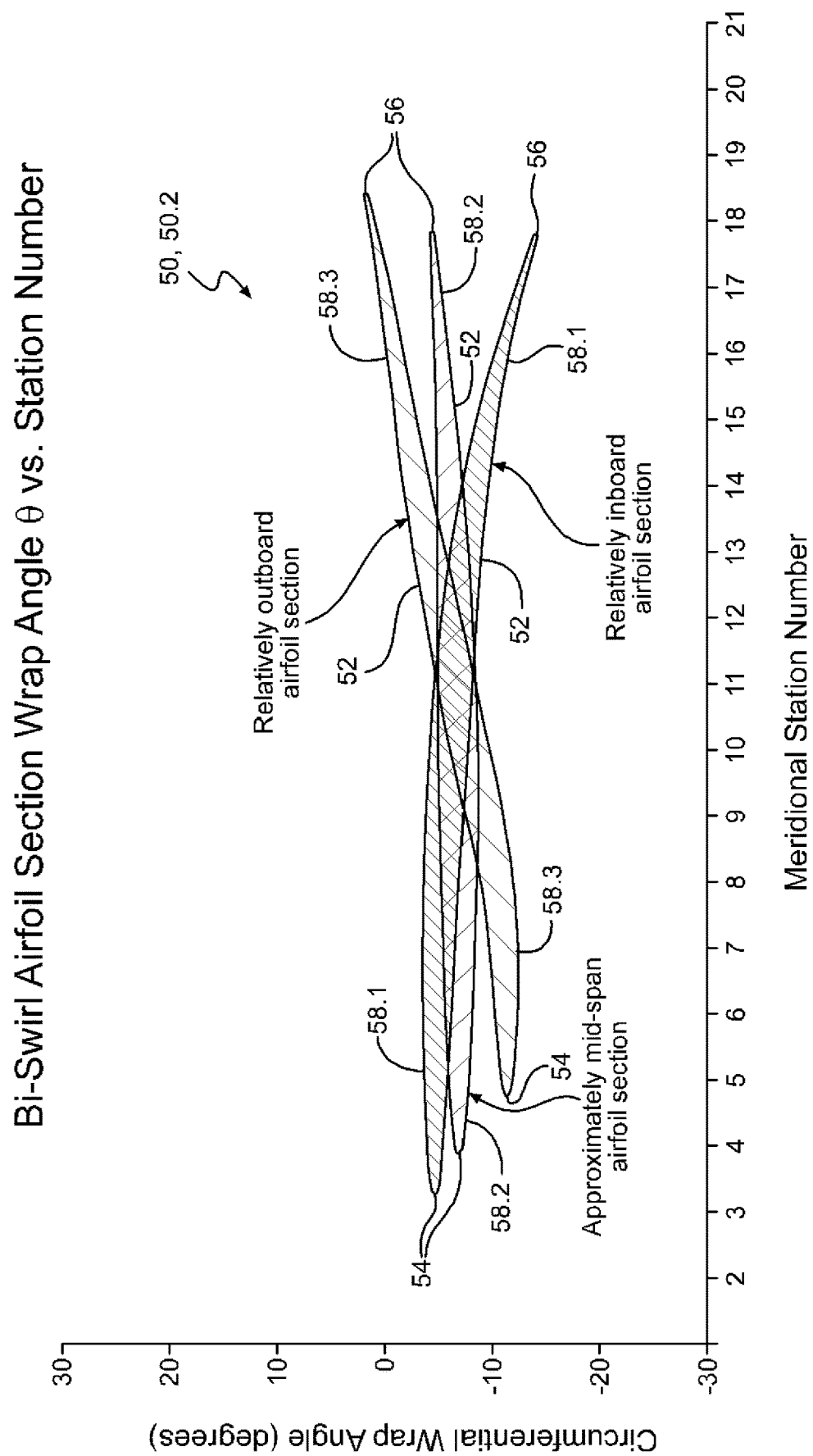
FIG. 14 illustrates three meridionally-transverse cross-sectional views of one of the inlet guide vanes of the inlet-guide-vane assembly illustrated in FIGS. 13A and 13B at the following three locations along the height of the inlet guide vane: a relatively-inboard location, an approximately mid-span location, and a relatively-outboard location.
Figure 15:
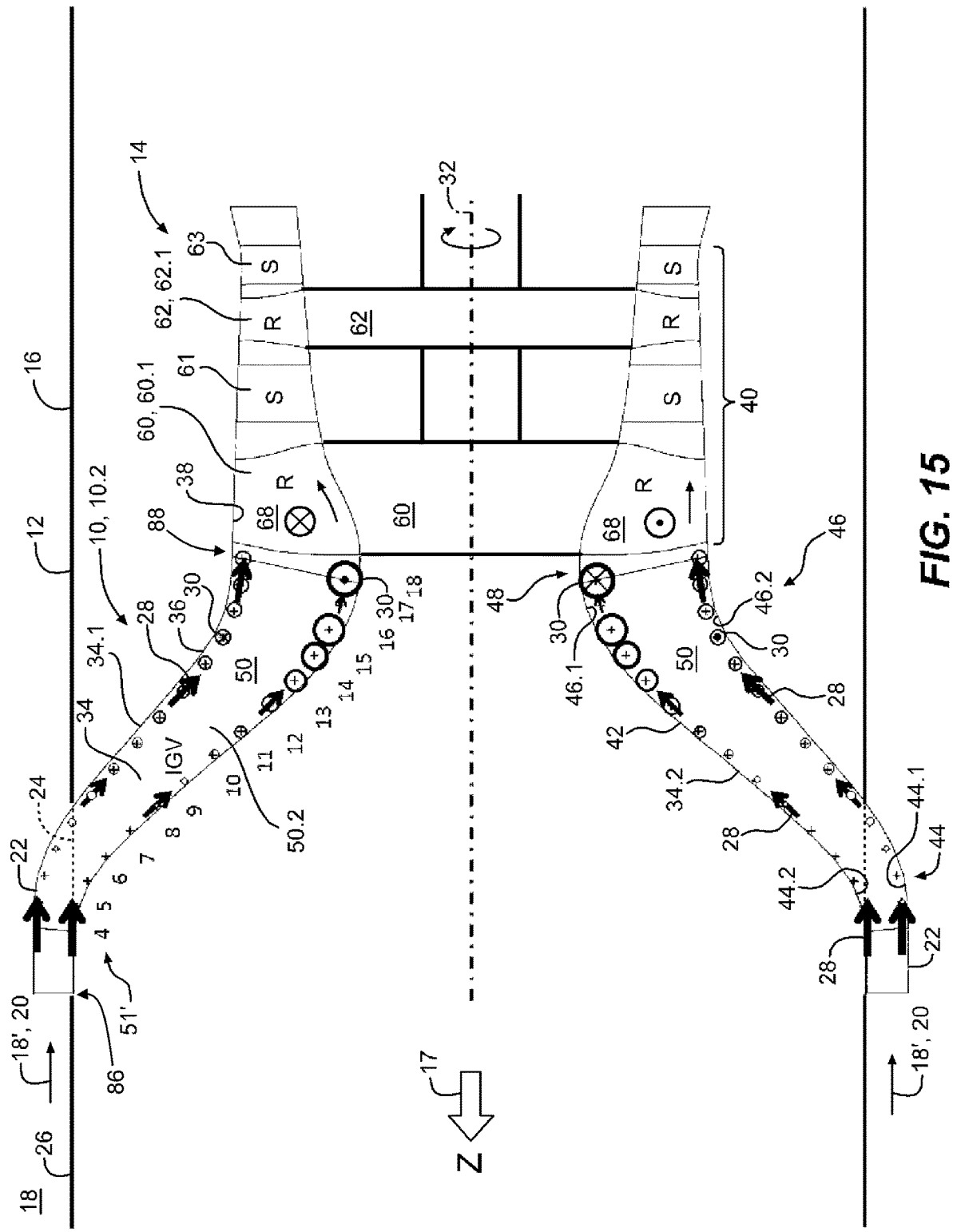
FIG. 15 illustrates a longitudinal cross-sectional view of a portion of a fuselage of a gas-turbine-engine powered aircraft or missile, through a second aspect of an associated gas-turbine-engine inlet system that provides for generating a co-swirl flow in an outer span of the associated inlet duct, and counter-swirl flow within an inner span of the inlet duct, with respective circulations in the same and opposite directions of rotation as the rotor of the gas-turbine engine, respectively, and further illustrating a portion of the compressor of the associated gas turbine engine, with the gas-turbine-engine powered aircraft or missile traveling through the atmosphere during normal operation thereof, together with an illustration of the relative magnitudes of the associated meridional and circumferential velocity components at selected station points.

Alternatively, the inlet guide vanes 50 may be configured to impart a counter-swirl circumferential velocity 30 in a direction opposite to the direction of rotation of the gas-turbine engine 14. Yet further alternatively, referring to FIGS. 13A-15, in accordance with a second aspect 10.2 of a gas-turbine-engine inlet system 10, 10.2, the circumferential velocity 30 at the face of the fan or compressor portion 40 of the gas-turbine engine 14 may be imparted by the inlet guide vanes 50, 50.2 in the same circumferential direction as the direction of rotation of the gas-turbine engine 14 along one duct surface 34.1 or 34.2, and in an opposite circumferential direction on the other duct surface 34.2 or 34.1. More particularly, in accordance with the second aspect 10.2 of the gas-turbine-engine inlet system 10, 10.2, the component of circumferential velocity 30 of the relatively-outer span of the flow of inlet air 18' in the annular inlet duct 34 co-swirls in the same circumferential direction as the direction of rotation of the gas-turbine engine 14, and the component of circumferential velocity 30 of the relatively-inner span of the flow of inlet air 18' in the annular inlet duct 34 counter-swirls in a circumferential direction that is opposite to the direction of rotation of the gas-turbine engine 14. In any case, the effect is to reduce or eliminate deceleration of the resultant velocity vector as the flow navigates into the gas-turbine engine 14 from a relatively-higher flight velocity to a relatively-lower engine-face meridional velocity 28. The choice of co-rotating, counter-rotating, or mixed co- and counter-rotating circumferential velocities depends on what is most favorable for the design characteristics of the particular fan or compressor downstream of the annular inlet duct 34. In FIGS. 4 and 15, the line weight and length of the arrows are scaled in accordance with the magnitude of the component of meridional velocity 28, the line weight and diameters of the circles are scaled in accordance with the magnitude of the component of circumferential velocity 30, a direction of the component of circumferential velocity 30 away from the viewer is indicated by a circle with a central "X", and a direction of the component of circumferential velocity 30 towards the viewer is indicated by a circle with a central "•". FIGS. 3 and 14, respectively illustrate the profile of a typical inlet guide vane 50 for the illustrated embodiments of the first 10.1 and second 10.2 aspects of the gas-turbine-engine inlet system 10, 10.1, 10.2, respectively, wherein the cross-hatched portions illustrate the profile 52 of the inlet guide vane 50, from the leading edge 54 to the trailing edge 56 of the inlet guide vane 50, at the following three locations along the height of the inlet guide vane between the inner 34.2 and outer 34.1 surfaces of the annular inlet duct 34: a relatively-inboard location 58.1, an approximately-mid-span location 58.2, and a relatively-outboard location 58.3.

Furthermore, in regions 44, 46 of the annular inlet duct 34 where relatively-high meridional curvature of the duct geometry can—absent the inlet guide vanes 50—otherwise induce rapid local diffusion or disadvantageous acceleration of the flow velocity, the inlet guide vanes 50 cause the resultant flow vector to proceed along such meridionally-curved hub or shroud surfaces in a modified direction having associated bounding-wall curvature that is relatively-lower than in a purely meridional direction. Accordingly, the relative increase in the magnitude of the component of circumferential velocity 30, and the relative decrease in the magnitude of the component of meridional velocity 28, at an appropriate rate as the flow of inlet air 18' progresses through the annular inlet duct 34, can provide for substantially eliminating locally rapid diffusion in regions of high flow path curvature. This, in turn, causes the resultant flow vector either to be increased (accelerated), to remain steady, or to be reduced (diffused) at a relatively-lower rate, which is advantageous in delaying or eliminating boundary-layer momentum loss, energy dissipation, or flow separation that can otherwise increase pressure loss and pressure field distortion.

The complex shapes of the inlet guide vanes 50 that provide for the above-described transformation of meridional 28 to circumferential 30 velocity, and the associated controlled diffusion of the component of meridional velocity 28—without substantial boundary-layer separation—is provided for by analytical and computational aerodynamic design and optimization of the inlet meridional flow path, vane geometry, and one or more fan and/or compressor stages operating in cooperation with one another as an integrated system. The optimization task is typically cast in the form of an objective function to be minimized (such as the overall length of the system), subject to constraints (such as the pressure delivered to the engine face and the distortion level presented), all evaluated repeatedly until a combination of inputs (or "design variables") is reached that produces an optimum result. Other combinations of objectives, constraints, and design variables beyond those listed as examples herein are possible, and will depend upon the most important aspects of the propulsion system being optimized for a given mission. The associated analytical and computational aerodynamic design and optimization process is possible with present high-speed digital computing speed using analysis software of sufficient accuracy to perform the computations needed to efficiently evaluate numerous configurations. Cross-sectional area variation, rate of turning of the air flow vector circumferentially by the vanes, and ramifications upon the ability of the fan and/or compression stage(s) to cooperate with each inlet and vane configuration are but a few of the factors that are be evaluated repeatedly and systematically to arrive at an optimum overall system. The particular configuration—i.e. co-swirl, counter-swirl or bi-swirl—may lead to a simplified rotor design, enabling more advantageous structural design, material options, and manufacturing methods to be selected.

For example, referring to FIGS. 1, 4 and 15, the compressor portion 40 of the gas-turbine engine 14 is illustrated with first 60 and second 62 compressor rotors (R) in cooperation with corresponding first 61 and second 63 stators (S), with corresponding associated compressor blades 60.1, 62.1, the shapes of which are tuned to the corresponding gas-turbine-engine inlet system 10, 10.1, 10.2 using the above-described analytical and computational aerodynamic design and optimization process, wherein, in the illustrated embodiments, the first 60 and second 62 compressor rotors (R) each rotate in a clockwise direction looking upstream.

Figure 16:
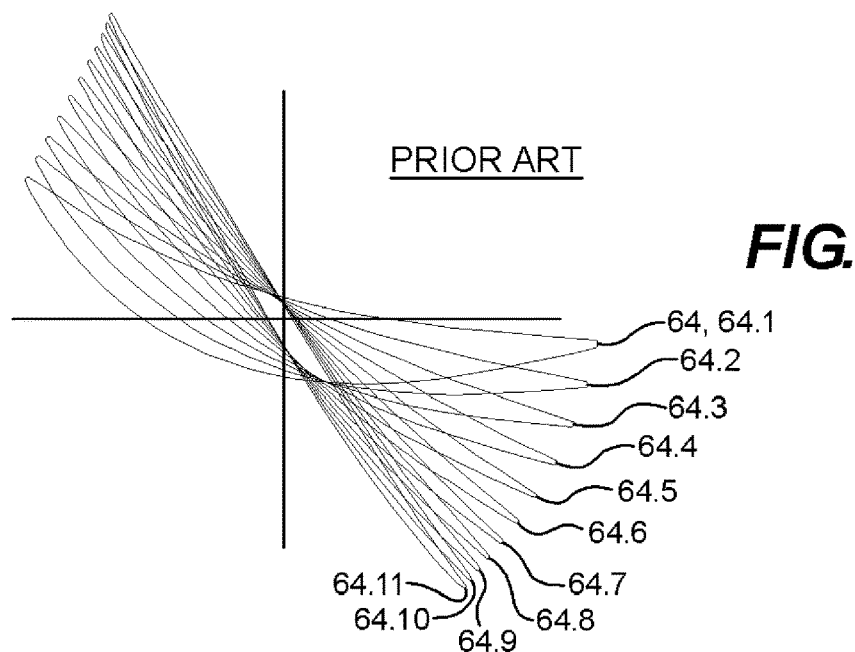
FIG. 16 illustrates a family of profiles of a prior-art blade of a first compressor rotor of a gas turbine engine that would cooperate with an associated inlet duct that does not induce swirl in the associated flow of air flowing therethrough, at a plurality of radial distances between the root and tip of the blade.

For example, for purposes of comparison, FIG. 16 illustrates a series of profiles 64—including a root profile 64.1, a tip profile 64.11, and nine profiles 64.2-64.10 at a corresponding plurality of radial locations therebetween—of a typical compressor blade 60.1 of the first compressor rotor 60 for a conventional gas-turbine-engine inlet system that does not incorporate inlet guide vanes 50.

Figure 17:
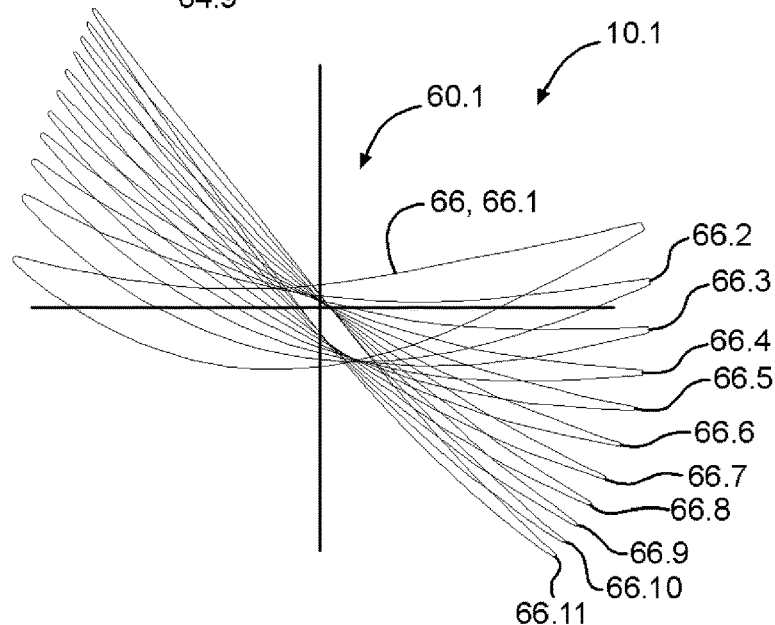
FIG. 17 illustrates a family of profiles of a blade of a first compressor rotor of a gas turbine engine configured to cooperate with the first aspect of the gas-turbine-engine inlet system illustrated in FIGS. 2A, 2B and 3, at a plurality of radial distances between the root and tip of the blade.
Figure 18:
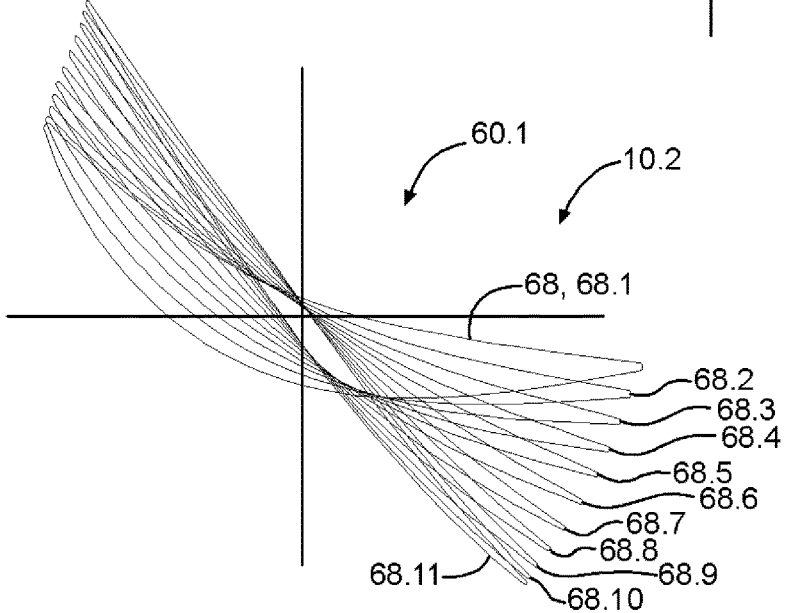
FIG. 18 illustrates a family of profiles of a blade of a first compressor rotor of a gas turbine engine configured to cooperate with the second aspect of the gas-turbine-engine inlet system illustrated in FIGS. 13A, 13B and 14, at a plurality of radial distances between the root and tip of the blade.

The particular shape of the compressor blade 60.1 is configured to accept the spanwise distribution of resultant flow velocity vector magnitude and direction imparted by the inlet guide vanes 50, 50.1, 50.2. For example, FIG. 17 illustrates a series of profiles 66—including a root profile 66.1, a tip profile 66.11, and nine profiles 66.2-66.10 at a corresponding plurality of radial locations therebetween—of a typical compressor blade 60.1 of the first compressor rotor 60 for the compressor portion 40 of the gas-turbine engine 14 in cooperation with the inlet guide vanes 50, 50.1 illustrated in FIGS. 2A, 2B and 3 of an associated first aspect 67.1 of an inlet-guide-vane assembly 67, 67.1 illustrated in FIGS. 2A and 2B for the corresponding embodiment of the first aspect 10.1 of the gas-turbine-engine inlet system 10, 10.1, derived together with the inlet guide vanes 50, 50.1, using the above-described analytical and computational aerodynamic design and optimization process. As another example, FIG. 18 illustrates a series of profiles 68—including a root profile 68.1, a tip profile 68.11, and nine profiles 68.2-68.10 at a corresponding plurality of radial locations therebetween—of a typical compressor blade 60.1 of the first compressor rotor 60 for the compressor portion 40 of the gas-turbine engine 14 in cooperation with the inlet guide vanes 50, 50.2 illustrated in FIGS. 13A, 13B and 14 of an associated second aspect 67.2 of an inlet-guide-vane assembly 67, 67.2 illustrated in FIGS. 13A and 13B for the corresponding embodiment of the second aspect 10.2 of the gas-turbine-engine inlet system 10, 10.2, derived together with the inlet guide vanes 50, 50.2, using the above-described analytical and computational aerodynamic design and optimization process.

Figure 19:
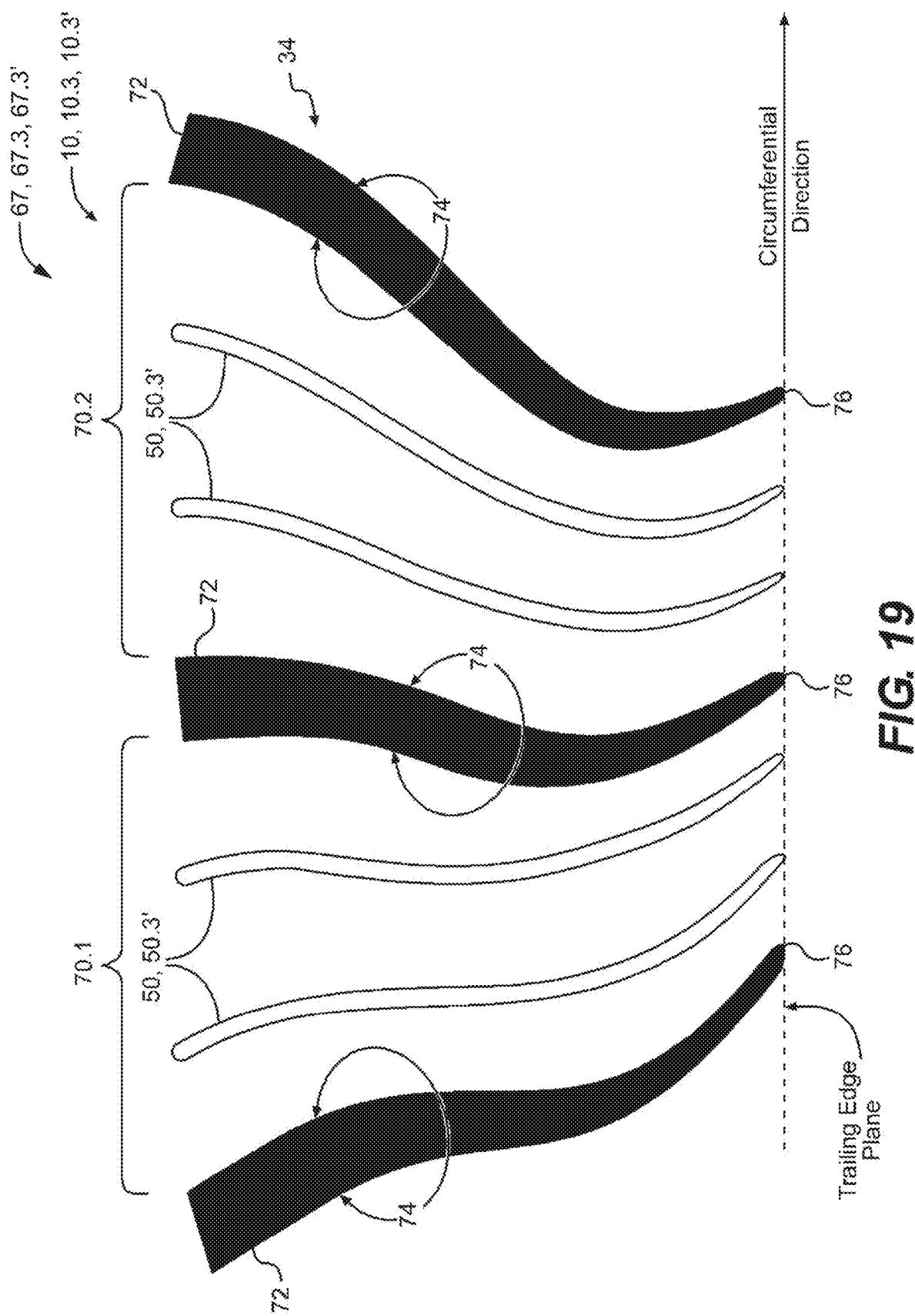
FIG. 19 illustrates a developed cross-sectional view of a set of furcated inlet guide vanes in accordance with a first embodiment of a third aspect of an inlet-guide-vane assembly used with a third aspect of an associated gas-turbine-engine inlet system, that can be incorporated in the gas-turbine-engine inlet system illustrated in FIG. 1, 4 or 15, with the cross sections taken through a surface somewhere between the shroud and hub surfaces of the associated duct.

Referring to FIG. 19, in accordance with a first embodiment of a third aspect 10.3 of a gas-turbine-engine inlet system 10, 10.3', the inlet guide vanes 50, 50.3' of an associated first embodiment 67.3' of a third aspect 67.3 of an inlet-guide-vane assembly 67, 67.3, 67.3' may be organized in a plurality of inlet ducts 70.1, 70.2 that are separated by relatively-wider furcations 72, wherein the lateral walls 74 of the furcations 72 are shaped so as to follow a path through the annular inlet duct 34 that is similar to the path of the inlet guide vanes 50, 50.3'. The trailing edges 56 of the inlet guide vanes 50, 50.3', and the trailing edges 76 of the furcations 72, may be either uniformly or non-uniformly circumferentially spaced along the annular inlet duct 34.

Referring to FIGS. 20A-20C, in accordance with a second embodiment of the third aspect 10.3 of a gas-turbine-engine inlet system 10, 10.3", the inlet guide vanes 50, 50.3" of an associated second embodiment 67.3" of the third aspect 67.3 of an inlet-guide-vane assembly 67, 67.3, 67.3" may be organized in three inlet ducts 70.1, 70.2, 70.3 that are separated by relatively-wider furcations 72.1, 72.2, 72.3, wherein the lateral walls 74 of the furcations 72.1, 72.2, 72.3 are shaped so as to follow a path through the annular inlet duct 34 that is similar to the path of the inlet guide vanes 50, 50.3", which simulates an effectively "Interrupted Annulus," or Tri-furcated Inlet. The N-furcated case is a natural extension. The inlet guide vanes 50, 50.3" are shaped—similar to the first aspect 10.1 of the gas-turbine-engine inlet system 10, 10.1—so that the circumferential velocity 30 at the face of the fan or compressor portion 40 of the gas-turbine engine 14 is imparted by the inlet guide vanes 50, 50.3" so as to co-swirl in a circumferential direction that is the same as the direction of rotation of the gas-turbine engine 14.

It will be recognized that the applicability of the invention is not limited to inlets of the annular, bifurcated, trifurcated, etc. types. Using the fundamental principle of generating circumferential velocity components 30 to reduce or eliminate diffusion, airfoil geometry that accomplishes the same objective in a single-entry inlet such as an "S-type," or "submerged," or "scoop," or "flush" type of inlet is also possible. Though geometrically somewhat more complex in these cases, these configurations can also benefit from the incorporation of inlet guide vanes 50, the latter of which can provide for partially, or completely, eliminating problems otherwise associated with these configurations.

FIG. 21A illustrates a first embodiment 67.4' of a fourth aspect 67.4 of an inlet-guide-vane assembly 67, 67.4, 67.4' incorporating a cascade tandem set of associated guide vanes 50, 50.4a', 50.4b', wherein relatively proximate portions of at least two of the plurality of guide vanes 50, 50.4a', 50.4b' that are in cascade tandem along a length of the annular inlet duct 34 relative to one another are substantially azimuthally aligned with one another relative to an associated flow stream therealong.

Figure 21B:
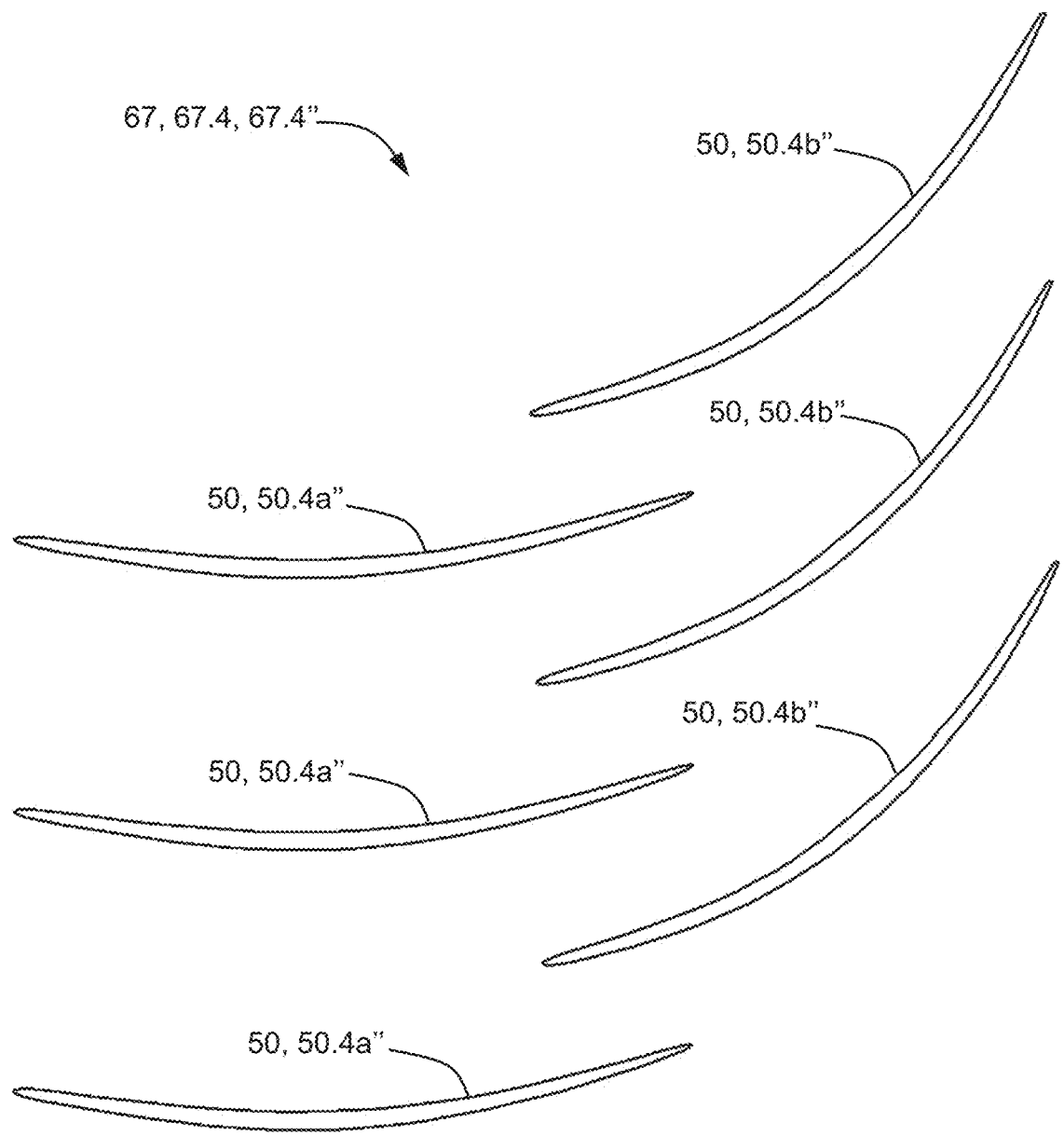
FIG. 21B illustrates a second embodiment of a fourth aspect of an inlet-guide-vane assembly incorporating a nested cascade tandem set of associated guide vanes.

FIG. 21B illustrates a second embodiment 67.4" of the fourth aspect 67.4 of an inlet-guide-vane assembly 67, 67.4, 67.4" incorporating a nested cascade tandem set of associated guide vanes 50, 50.4a", 50.4b".

Figure 22:
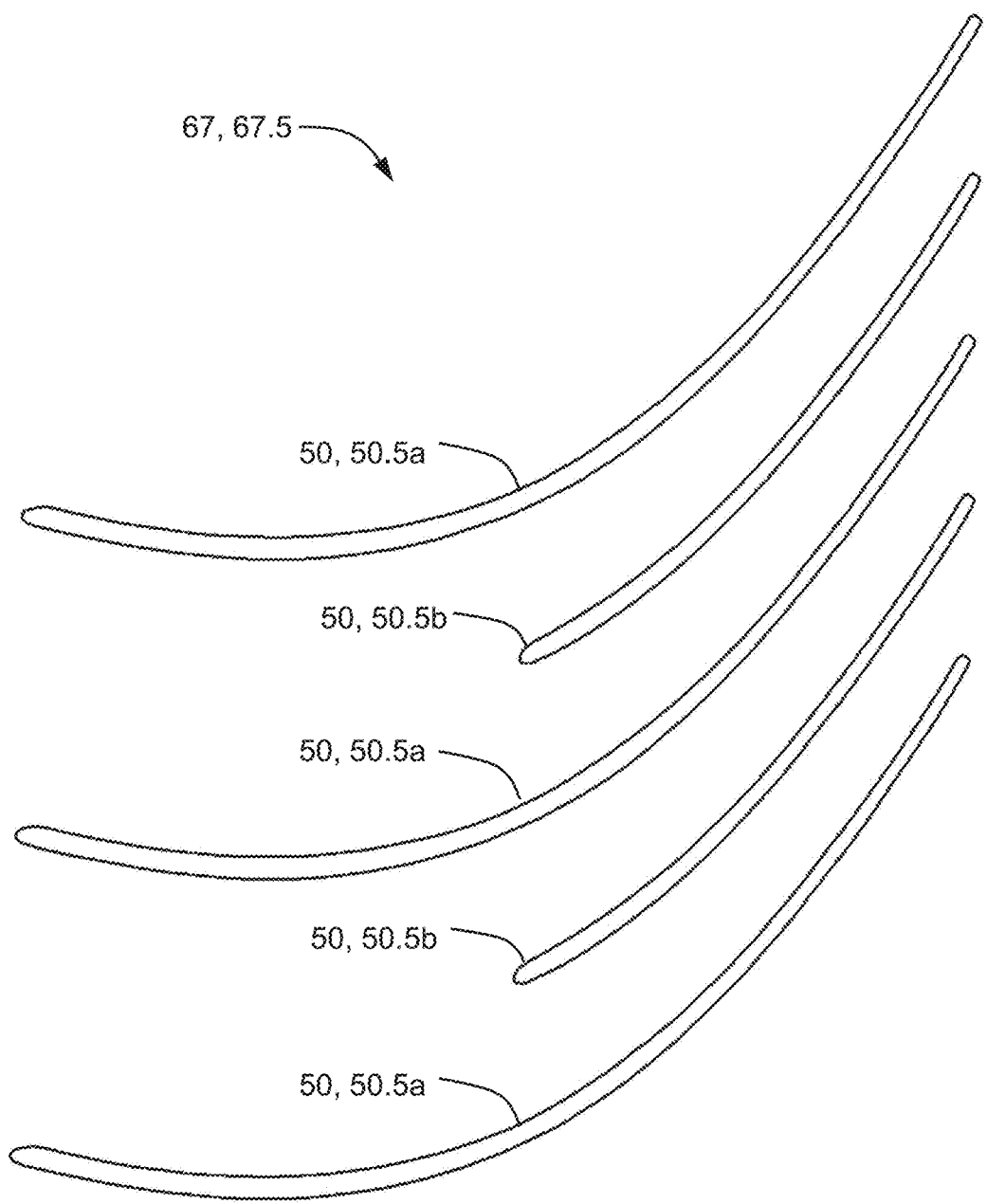
FIG. 22 illustrates a fifth aspect of an inlet-guide-vane assembly incorporating a plurality of splitter vanes interleaved with the associated guide vanes.

FIG. 22 illustrates a fifth aspect 67.5 of an inlet-guide-vane assembly 67, 67.5 incorporating a plurality of splitter vanes 50, 50.5b interleaved with the associated guide vanes 50, 50.5a.

Referring to FIG. 22, for some configurations, partial-length vanes 50, 50.5b—also referred as "splitter" vanes 50, 50.5b, that can be used to optimize the intake aerodynamics—may be incorporated to facilitate the efficient generation of circumferential flow components within either the annular, the N-furcated, or the side-entry inlet ducts. Furthermore, the associated inlet duct may incorporate an annulus splitter to enhance diffusion.

FIG. 23 illustrates a core transition duct incorporating a guide-vane assembly, wherein the guide-vane assembly is configured in accordance with any of the first through fifth aspects of the inlet-guide-vane assembly 67, 67.1, 67.2, 67.3', 67.3", 67.4', 67.4", 67.5 illustrated in FIGS. 2A-2B, 3, 13A-13B, 14, 19, 20A, 20B, 20C, 21A, 21B or 22. In additions to use in inlets capturing free-stream air and ducting it into the gas-turbine engine 14, the same methodology of the above-described inlet guide vanes 50, 50.1, 50.2, 50.3', 50.3" can be applied to ducting within the gas-turbine engine 14 itself, or to other ducting; most generally; to ducting through which a compressible gas is to flow, wherein, most generally, the inlet guide vanes 50, 50.1, 50.2, 50.3', 50.3" would then be referred to as guide vanes 50, 50.1, 50.2, 50.3', 50.3", i.e. so as to not be limited to an inlet duct, for example, not limited to an inlet duct of a gas-turbine engine 14. An example is a "core transition duct" between booster stages and a core compressor, or between a fan and a core compressor if no booster stages are present.

Figure 24:
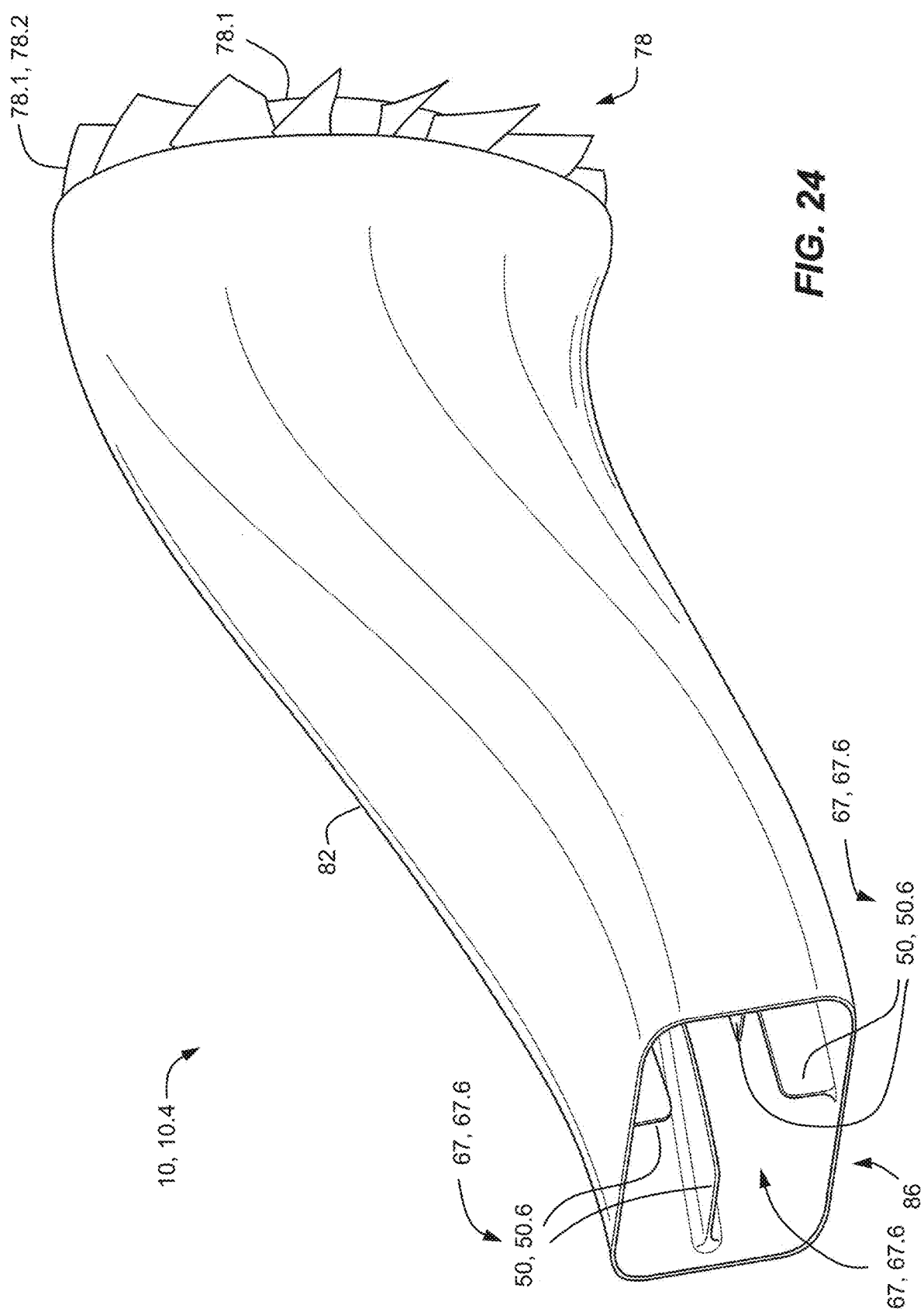
FIG. 24 illustrates a first side-oblique-isometric view of a fourth aspect of an associated gas-turbine-engine inlet system incorporating a sixth aspect, single-entry embodiment of an inlet-guide-vane assembly, in cooperation with an associated gas-turbine-engine fan.

FIG. 24 illustrates a first side-oblique-isometric view of a fourth aspect 10.4 of an associated gas-turbine-engine inlet system 10, 10.4 incorporating a sixth aspect 67.6, single-entry embodiment of an inlet-guide-vane assembly 67, 67.6, in cooperation with an associated gas-turbine-engine fan 78.

Figure 25:
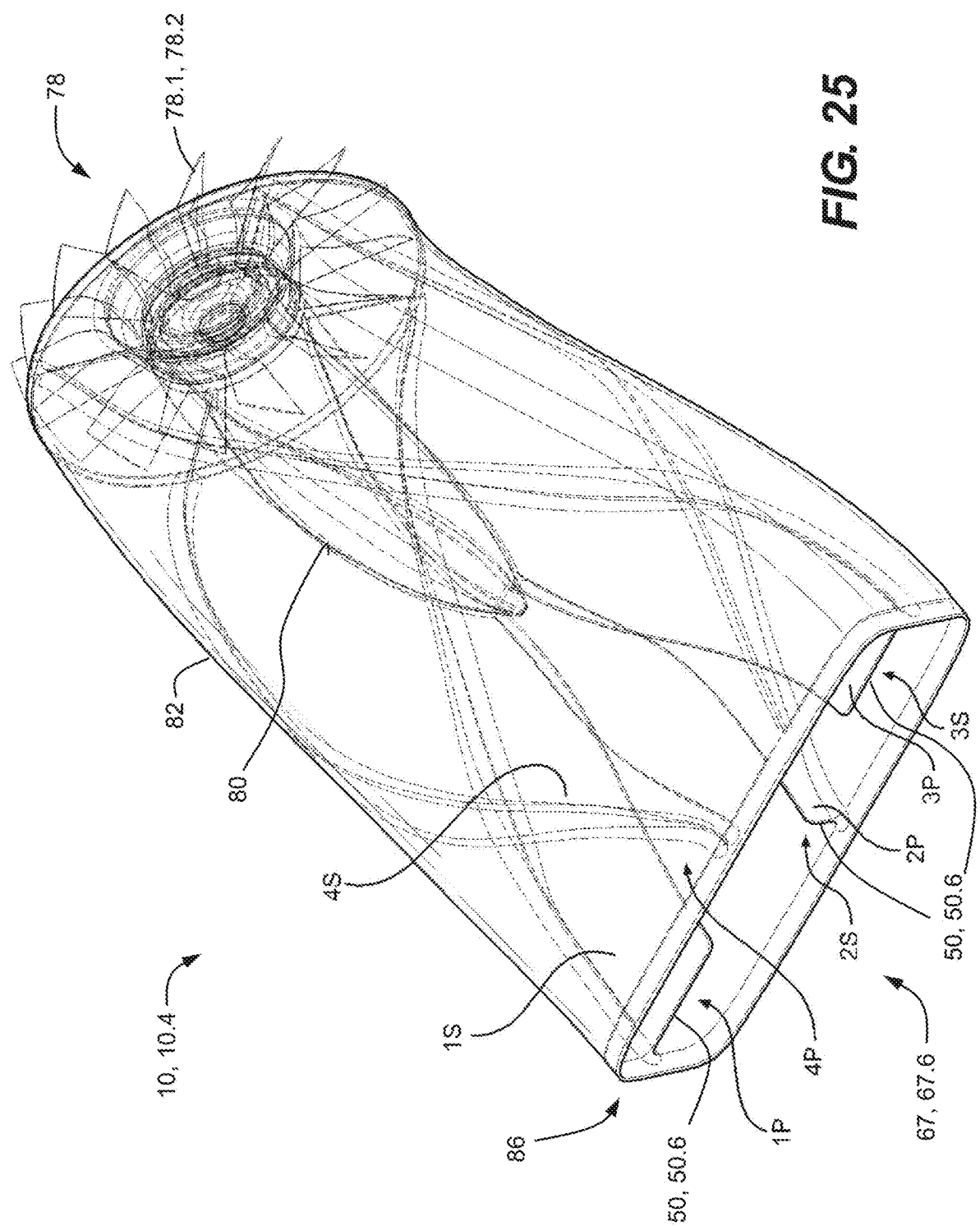
FIG. 25 illustrates a wireframe isometric view of the fourth aspect of the associated gas-turbine-engine inlet system incorporating the sixth aspect, single-entry embodiment of the inlet-guide-vane assembly, illustrated in FIG. 24, in cooperation with the associated gas turbine engine fan.

FIG. 25 illustrates a wireframe isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIG. 24, in cooperation with the associated gas-turbine-engine fan 78.

For example, FIGS. 24 and 25 illustrate a single-entry embodiment of the shortened intake system. The embodiment depicted features four airfoil vanes 50, 50.6 (1, 2, 3, 4) (though a greater number could be utilized) which are equally spaced, running the entire length of the duct shroud and meeting the "nosecone" part way through the duct. To obtain an optimal system design, the novel short inlet airfoil vanes 50, 50.6 (1, 2, 3, 4) must operate in concert with the downstream turbomachinery, designed in a manner similar to that described previously for the annular embodiment. In this and subsequent FIGS., the pressure side of each airfoil vane 50, 50.6 (1, 2, 3, 4) is indicated with the suffix "P" to the vane number, and corresponding suction side is indicated with the suffix "S" to the vane number.

Figure 26:
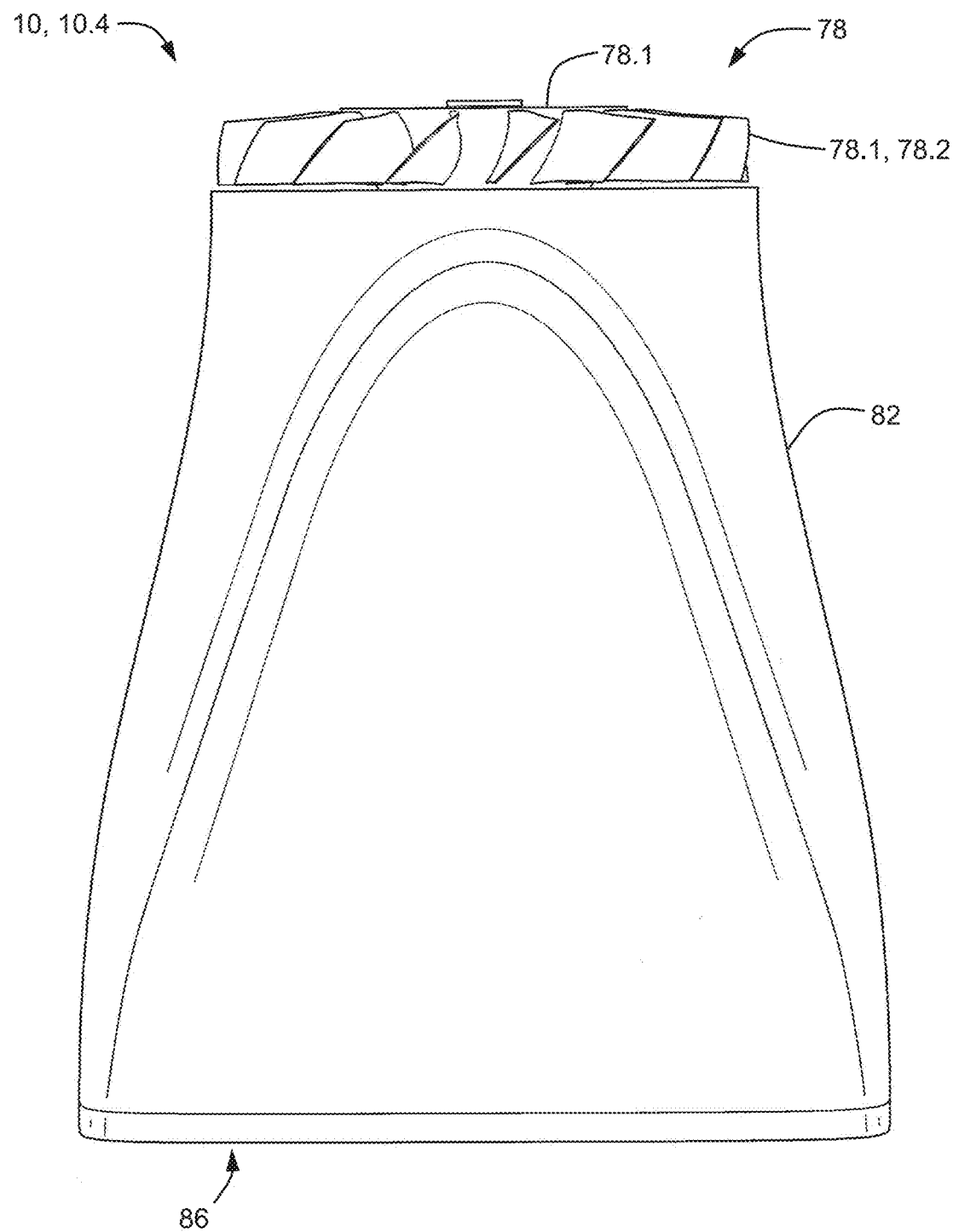
FIG. 26 illustrates a top view of the fourth aspect of the associated gas-turbine-engine inlet system incorporating the sixth aspect, single-entry embodiment of the inlet-guide-vane assembly, illustrated in FIGS. 24 and 25, in cooperation with the associated gas turbine engine fan.

FIG. 26 illustrates a top view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24 and 25, in cooperation with the associated gas-turbine-engine fan 78.

Figure 27:
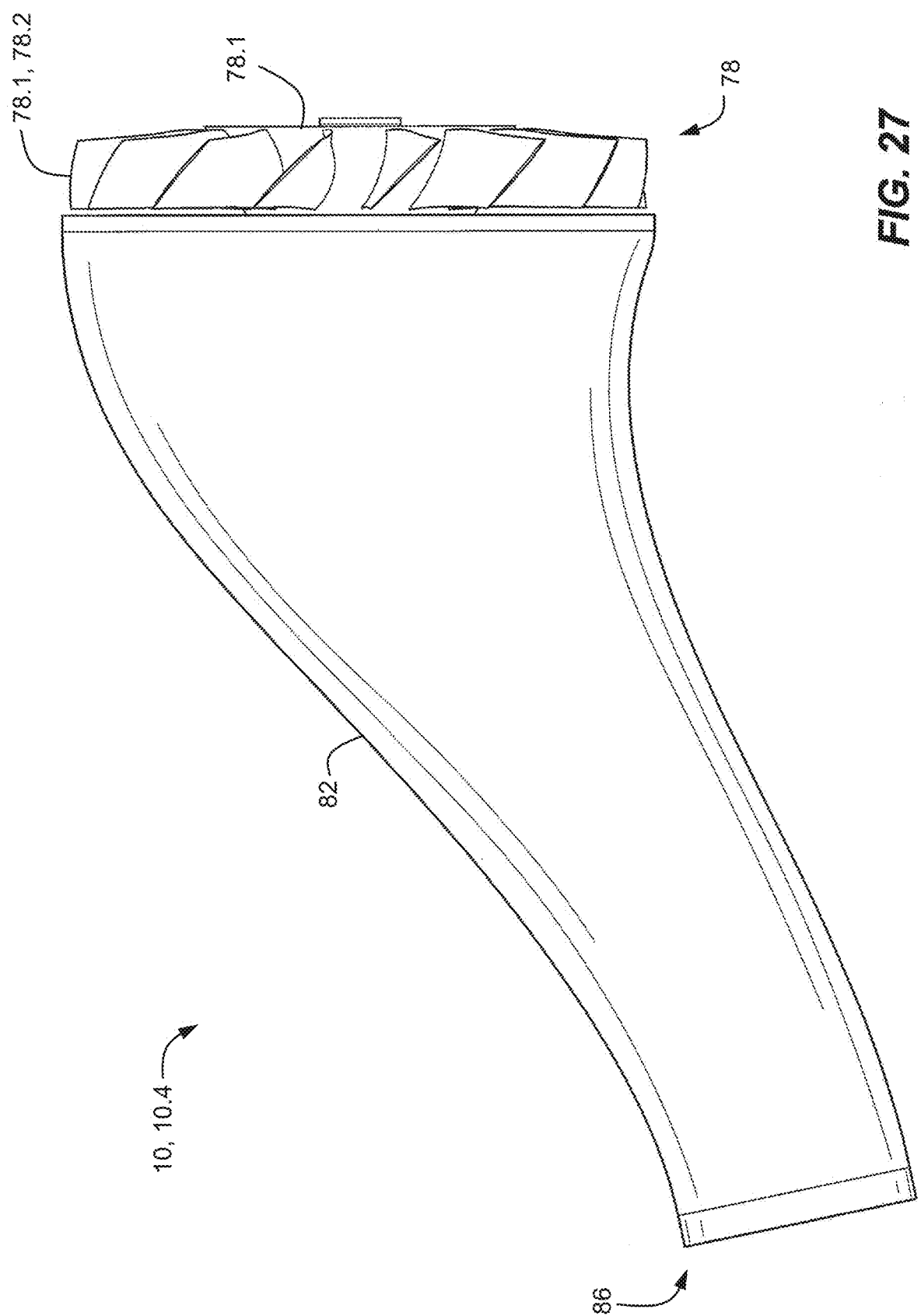
FIG. 27 illustrates a left-side view of the fourth aspect of the associated gas-turbine-engine inlet system incorporating the sixth aspect, single-entry embodiment of the inlet-guide-vane assembly, illustrated in FIGS. 24-26, in cooperation with the associated gas turbine engine fan.

FIG. 27 illustrates a left-side view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-26, in cooperation with the associated gas-turbine-engine fan 78.

Figure 28:
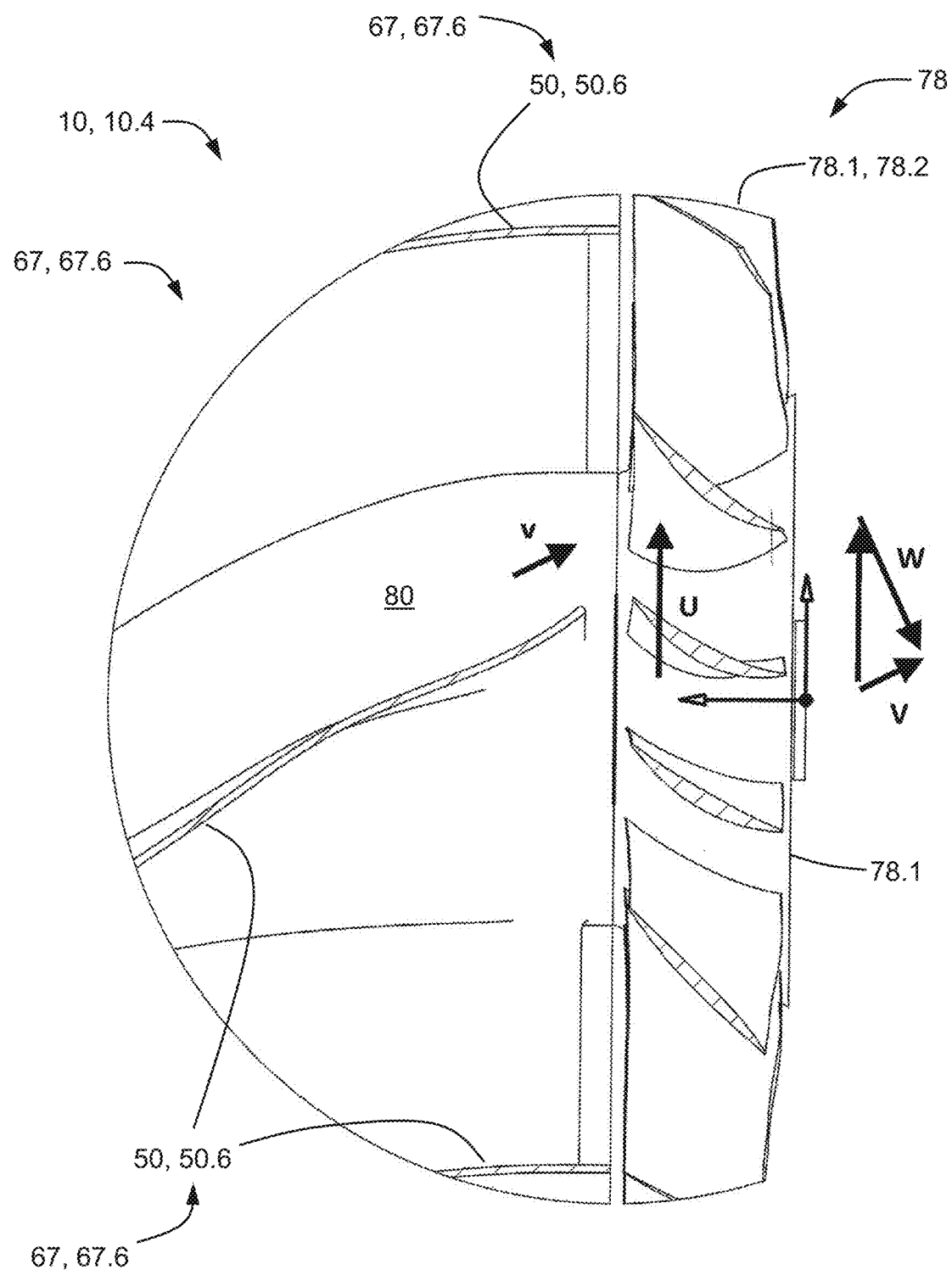
FIG. 28 illustrates a fragmentary left-side view of the fourth aspect of the associated gas-turbine-engine inlet system incorporating the sixth aspect, single-entry embodiment of the inlet-guide-vane assembly, illustrated in FIGS. 24-27, in cooperation with the associated gas turbine engine fan.

FIG. 28 illustrates a fragmentary left-side view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-27, in cooperation with the associated gas-turbine-engine fan 78.

FIG. 28 illustrates a fragmentary detail the airfoil vane 50, 50.6 (1, 2, 3, 4) and fan rotor 78.1 configuration with velocity vectors superimposed, wherein V is the absolute velocity vector provided by the air intake airfoil vanes 50, 50.6 (1, 2, 3, 4), U is the blade speed of the fan rotor 78.1, and W is the relative velocity vector as observed by the rotating fan blades 78.2.

Figure 29:
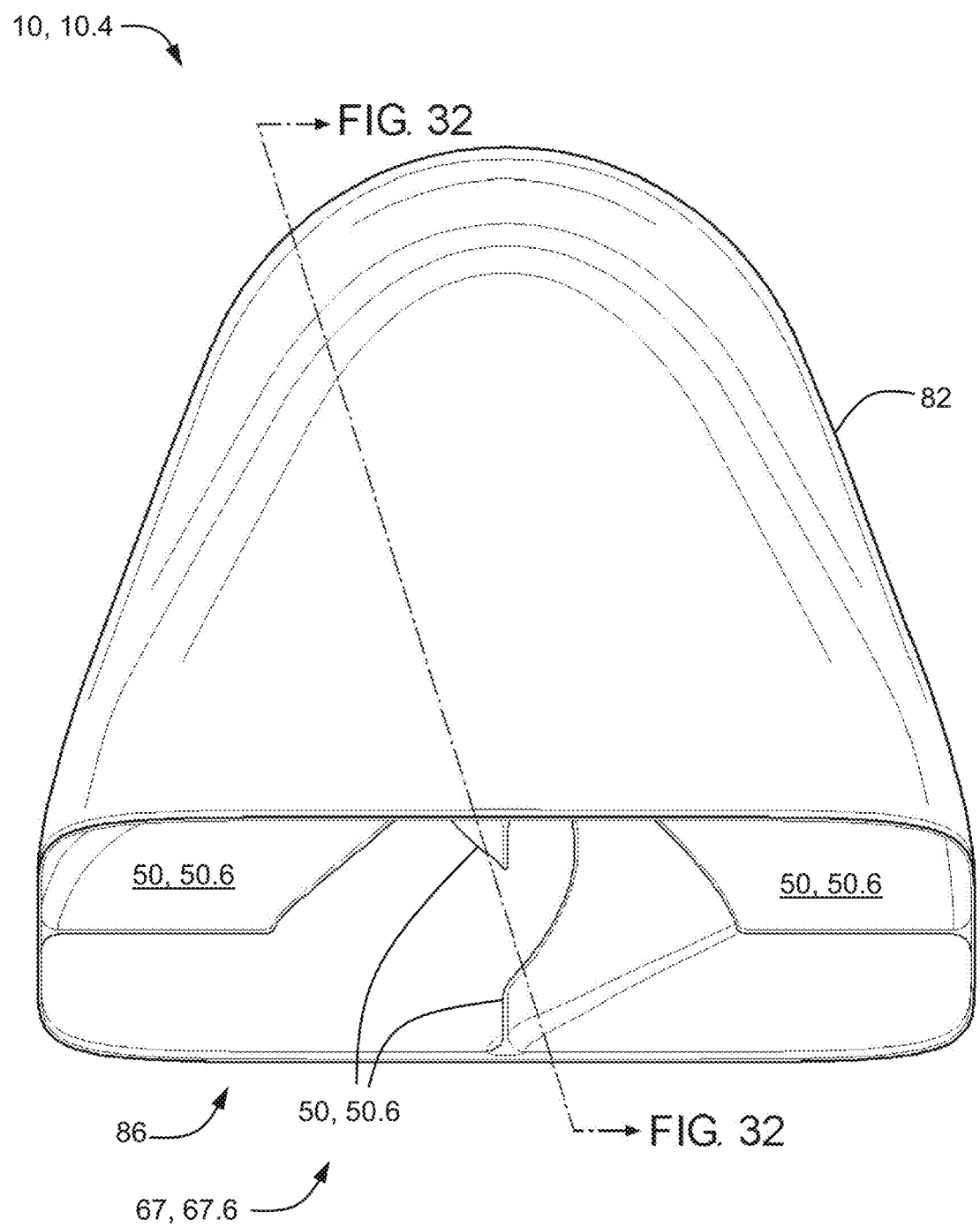
FIG. 29 illustrates a first front oblique isometric view of the fourth aspect of the associated gas-turbine-engine inlet system incorporating the sixth aspect, single-entry embodiment of the inlet-guide-vane assembly, illustrated in FIGS. 24-28.

FIG. 29 illustrates a first front oblique isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-28.

Figure 30:
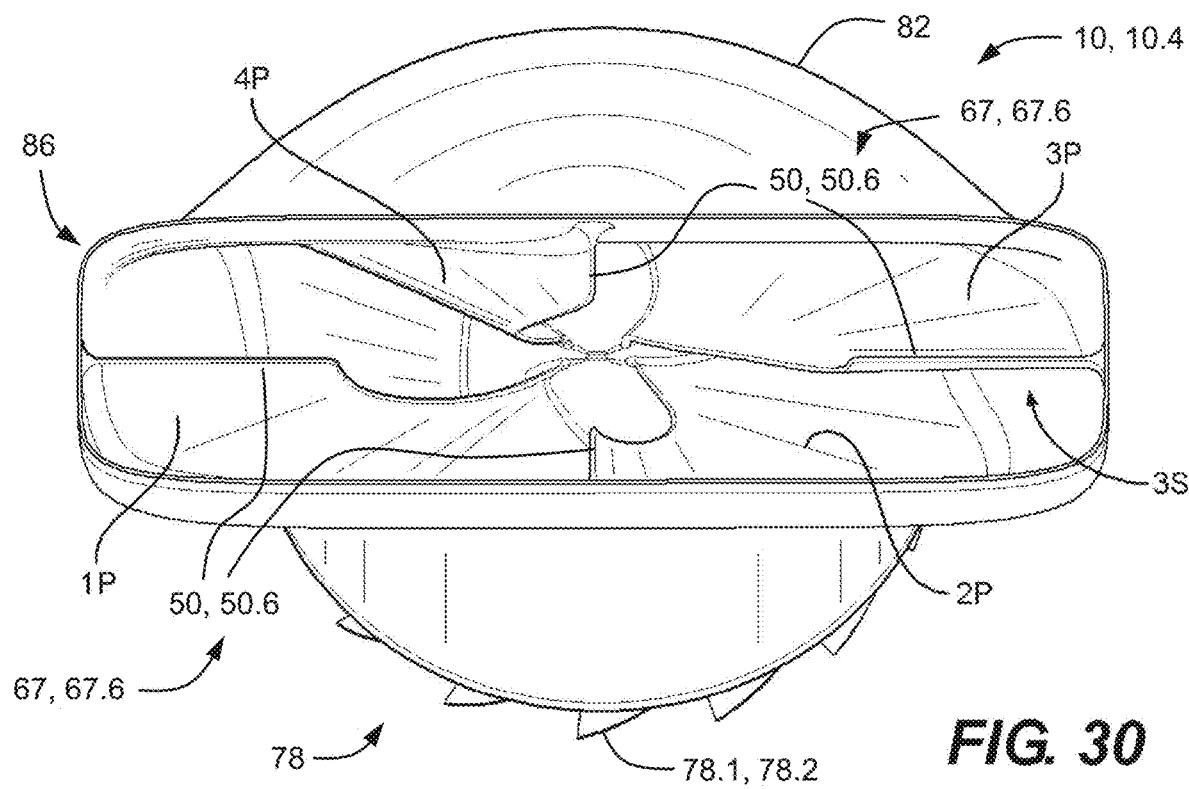
FIG. 30 illustrates a second front oblique isometric view of the fourth aspect of the associated gas-turbine-engine inlet system incorporating the sixth aspect, single-entry embodiment of the inlet-guide-vane assembly, illustrated in FIGS. 24-29, in cooperation with the associated gas turbine engine fan.

FIG. 30 illustrates a second front oblique isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-29, in cooperation with the associated gas-turbine-engine fan 78.

Figure 31:
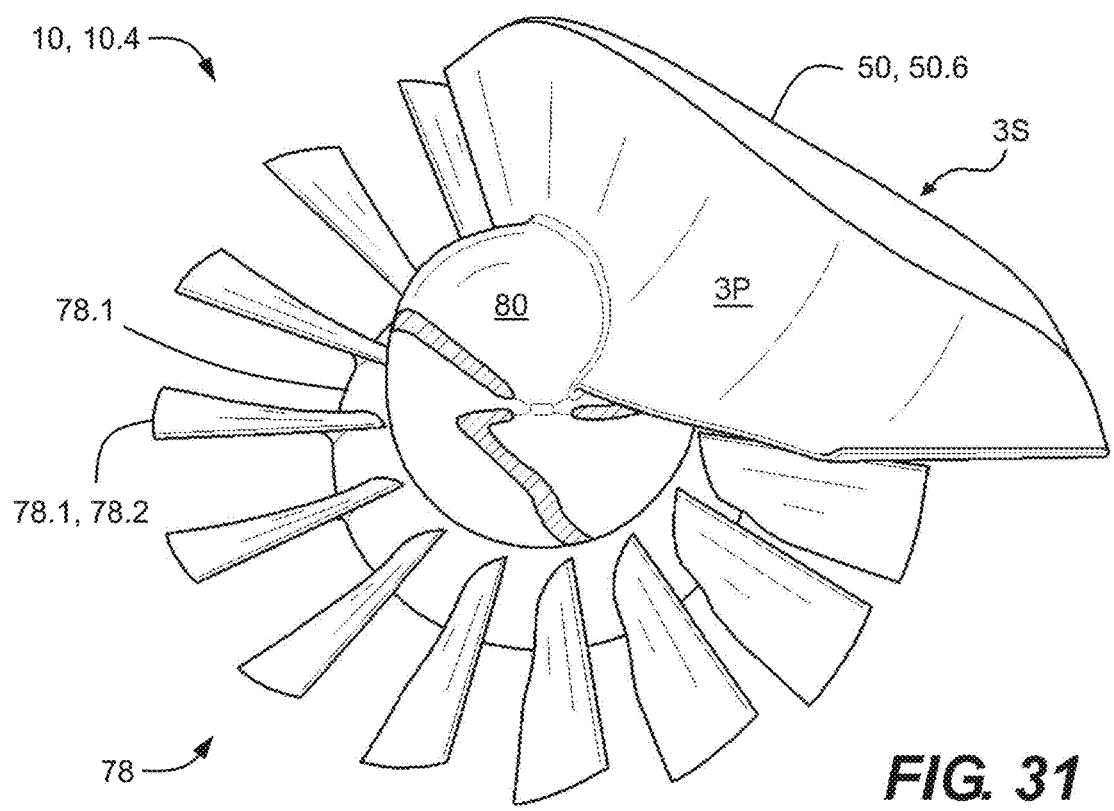
FIG. 31 illustrates a fragmentary isometric view of a single vane depending from an associated centerbody of the fourth aspect of the associated gas-turbine-engine inlet system incorporating the sixth aspect, single-entry embodiment of the inlet-guide-vane assembly, illustrated in FIGS. 24-30, in cooperation with the associated gas turbine engine fan.

FIG. 31 illustrates a fragmentary isometric view of a single airfoil vane 50, 50.6 (3) depending from an associated centerbody 80 of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-30, in cooperation with the associated gas-turbine-engine fan 78.

FIGS. 30 and 31 shows the front of the duct which would couple to a ramp or pitot-style inlet. FIG. 30 illustrates the entire inlet duct 82 whereas FIG. 31 illustrates a single airfoil vane 50, 50.6 (3), the centerbody 80, and the fan rotor 78.1. The airfoil vanes 50, 50.6 (1, 2, 3, 4) featured in the illustration reach greater than 90 degrees around in the circumferential direction. The single-entry embodiment is completely non-axisymmetric, except at or near the fan face.

Figure 32:
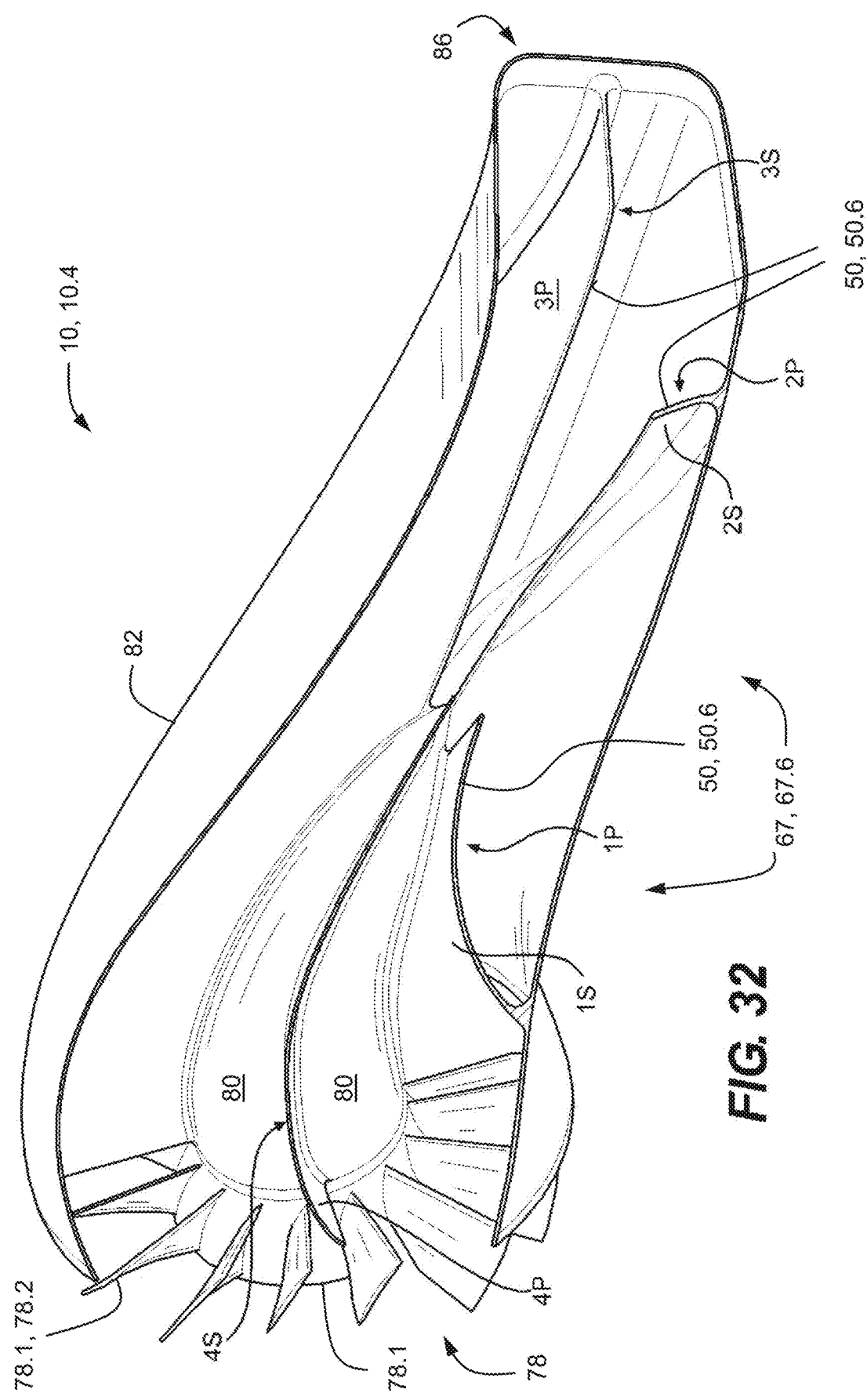
FIG. 32 illustrates a longitudinal cross-sectional isometric view of the fourth aspect of the associated gas-turbine-engine inlet system incorporating the sixth aspect, single-entry embodiment of the inlet-guide-vane assembly, illustrated in FIGS. 24-31, in cooperation with the associated gas turbine engine fan.
Figure 33:
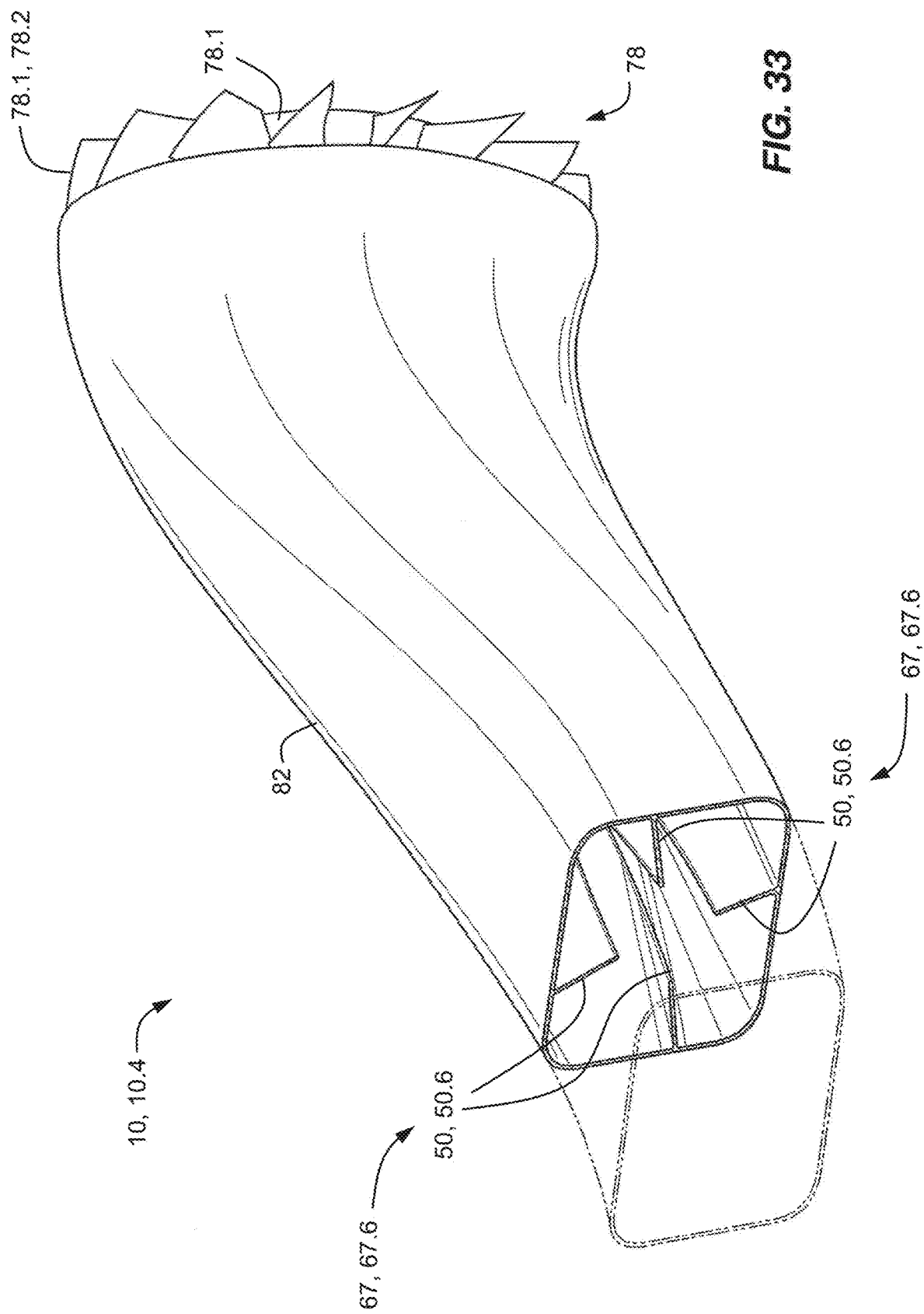
FIG. 33 illustrates a second side-oblique-isometric view of the fourth aspect of the associated gas-turbine-engine inlet system incorporating the sixth aspect, single-entry embodiment of the inlet-guide-vane assembly, illustrated in FIGS. 24-32, in cooperation with the associated gas turbine engine fan, including a first lateral cross-sectional view of the inlet duct and associated inlet guide vanes.
Figure 34:
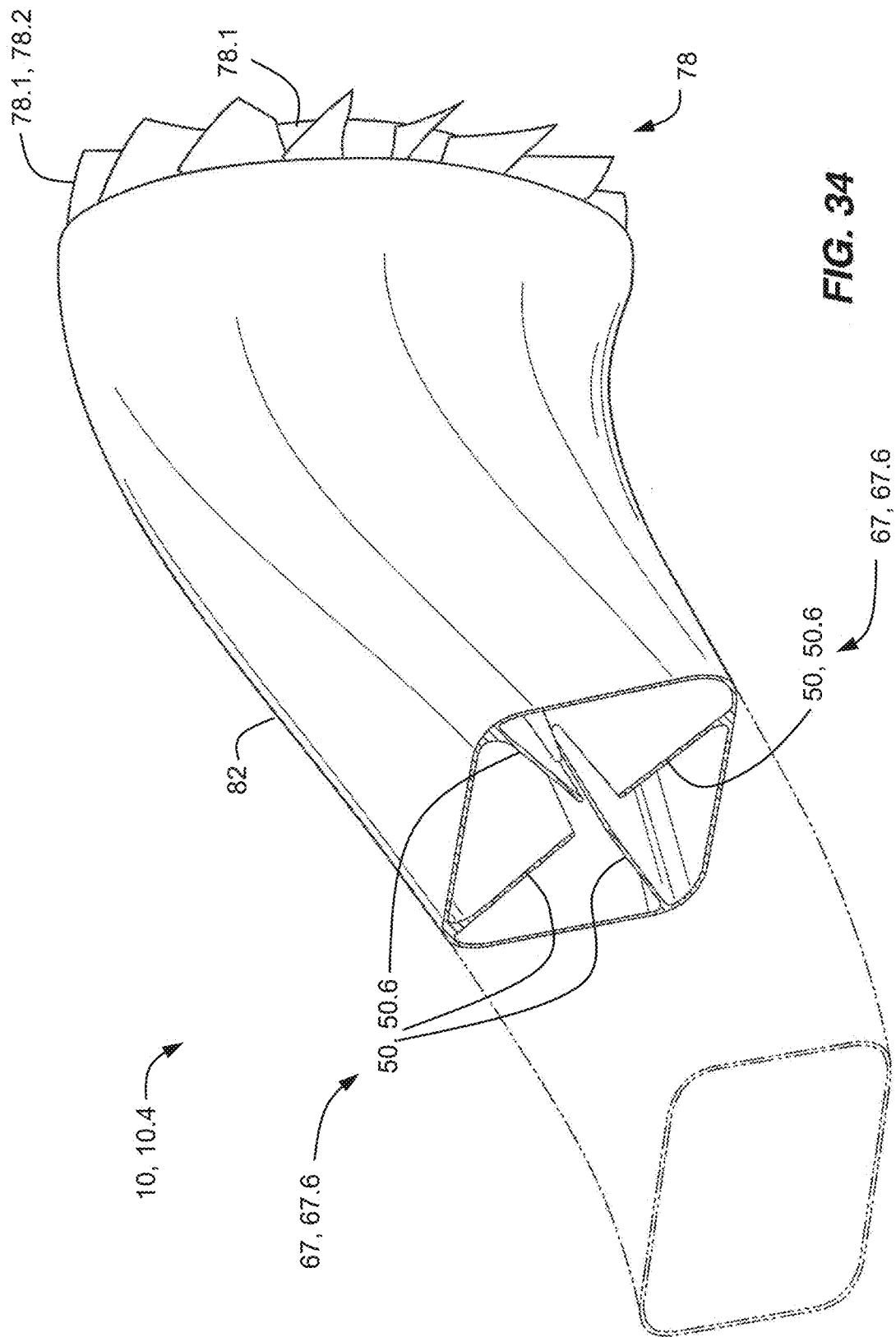
FIG. 34 illustrates a third side-oblique-isometric view of the fourth aspect of the associated gas-turbine-engine inlet system incorporating the sixth aspect, single-entry embodiment of the inlet-guide-vane assembly, illustrated in FIGS. 24-33, in cooperation with the associated gas turbine engine fan, including a second lateral cross-sectional view of the inlet duct and associated inlet guide vanes.
Figure 35:
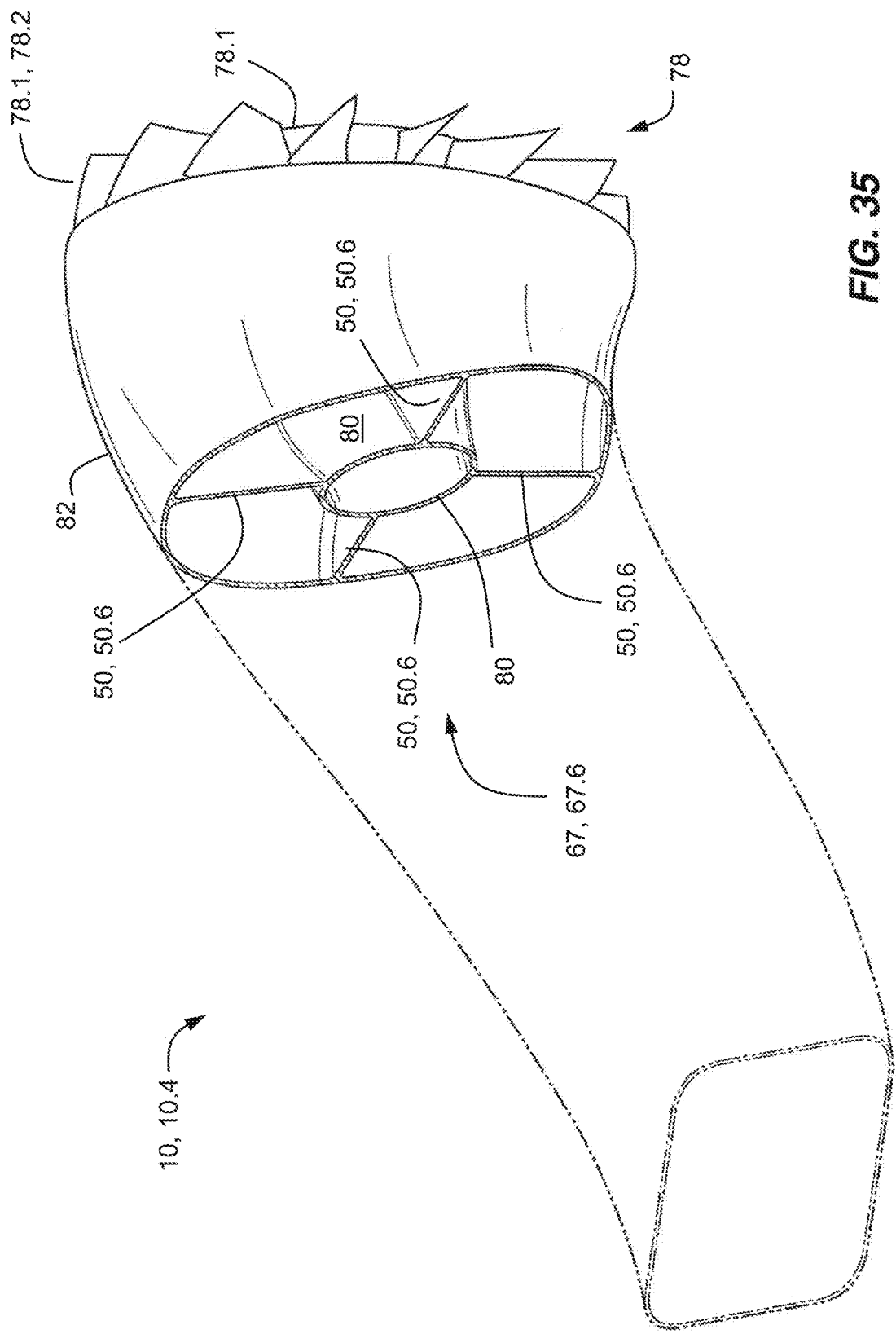
FIG. 35 illustrates a fourth side-oblique-isometric view of the fourth aspect of the associated gas-turbine-engine inlet system incorporating the sixth aspect, single-entry embodiment of the inlet-guide-vane assembly, illustrated in FIGS. 24-34, in cooperation with the associated gas turbine engine fan, including a third lateral cross-sectional view of the inlet duct and associated inlet guide vanes, and an associated centerbody.

FIG. 32 illustrates a longitudinal cross-sectional isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-31, in cooperation with the associated gas-turbine-engine fan 78. FIG. 32 illustrates a longitudinal cross-sectional view of the air intake system in which one airfoil vane 50, 50.6 (3) is shown in its entirety, extending from the entrance 86 of the inlet duct 82 very nearly to the fan rotor 78.1. In this view, flow direction is from right to left. FIGS. 33-35 illustrate transverse sections, which along with FIG. 32, illustrate the relative alignment of the duct airfoil vanes 50, 50.6 (1, 2, 3, 4) and fan rotor blades 78.2.

FIG. 33 illustrates a second side-oblique-isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-32, in cooperation with the associated gas-turbine-engine fan 78, including a first lateral cross-sectional view of the inlet duct 82 and associated inlet guide vanes 50, 50.6.

FIG. 34 illustrates a third side-oblique-isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-33, in cooperation with the associated gas-turbine-engine fan 78, including a second lateral cross-sectional view of the inlet duct 82 and associated inlet guide vanes 50, 50.6.

FIG. 35 illustrates a fourth side-oblique-isometric view of the fourth aspect 10.4 of the associated gas-turbine-engine inlet system 10, 10.4 incorporating the sixth aspect 67.6, single-entry embodiment of the inlet-guide-vane assembly 67, 67.6, illustrated in FIGS. 24-34, in cooperation with the associated gas-turbine-engine fan 78, including a third lateral cross-sectional view of the inlet duct 82 and associated inlet guide vanes 50, 50.6 and centerbody 80.

The same as for the annular intake embodiment of FIGS. 1, 4 and 15, the fan blades 78.2 for the side-entry embodiment must be designed to operate in concert with duct exit velocity vectors, similar to that illustrated in FIG. 28.

Figure 36:
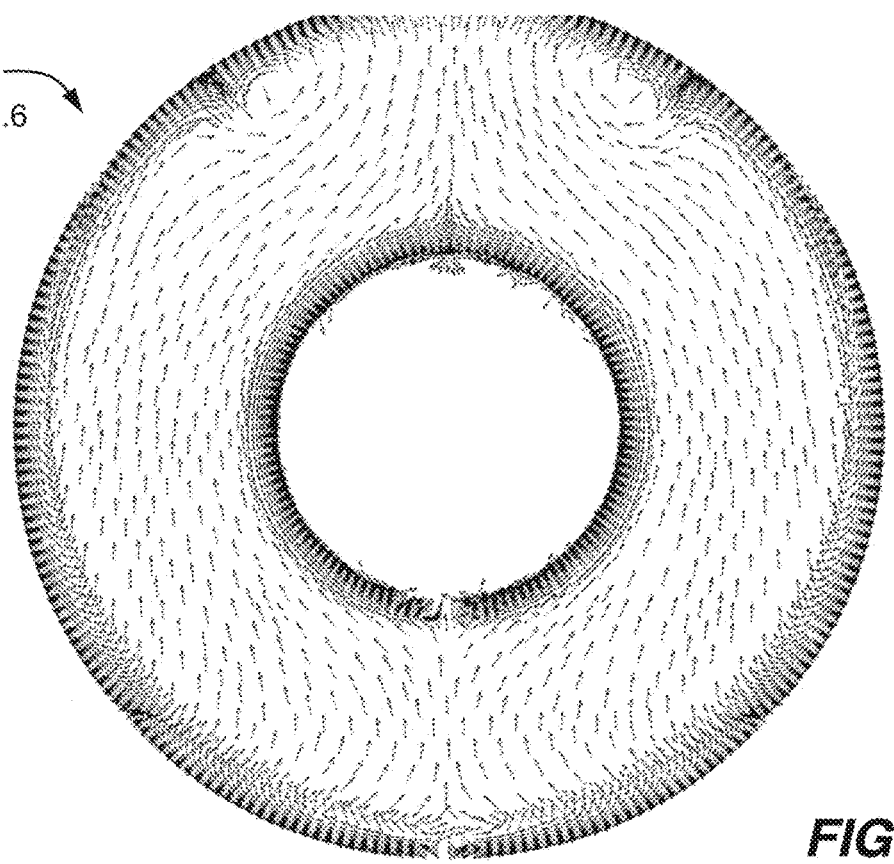
FIG. 36 illustrates a simulated transverse velocity field at the entrance of the associated gas turbine engine fan, resulting from the inlet duct of the fourth aspect of the associated gas-turbine-engine inlet system, but without the associated inlet guide vanes.

FIG. 36 illustrates a simulated transverse velocity field at the entrance of the associated gas-turbine-engine fan 78, resulting from the inlet duct 82 of the fourth aspect 10.4 of the associated gas-turbine-engine inlet system 10, 10.4, but without the associated inlet guide vanes 50, 50.6. The transverse velocity components are illustrated in the fan face plane, viewed from upstream looking downstream along the axial direction. The dense concentration of velocity vectors near the inner and outer peripheries is due to the close spacing of grid points near the walls in the numerical flow (CFD) model applied to compute these results. This flow pattern presents a strongly-varying tangential velocity component relative to the rotating fan blades, resulting from excessively non-uniform diffusion of the flow as it travels through the duct. Vortices appear at the outer periphery in the 12:00, 1:00, 4:30, 6:00, 7:30, and 11:00 o'clock positions as a result of the velocity gradients produced by outer surface curvature at the corners of the inlet duct 82, even though those corners are rounded. Vortices appear at the inner periphery in the 12:00 and 6:00 o'clock positions as a result of the velocity gradients produced by the curved centerbody 80. Absent the inlet guide vanes 50, 50.6, the inlet duct 82 delivers a non-uniform flow field to the entrance (face) of the fan, with a corresponding associated circumferentially and radially-distorted flow velocity (and associated pressure) pattern.

Figure 37:
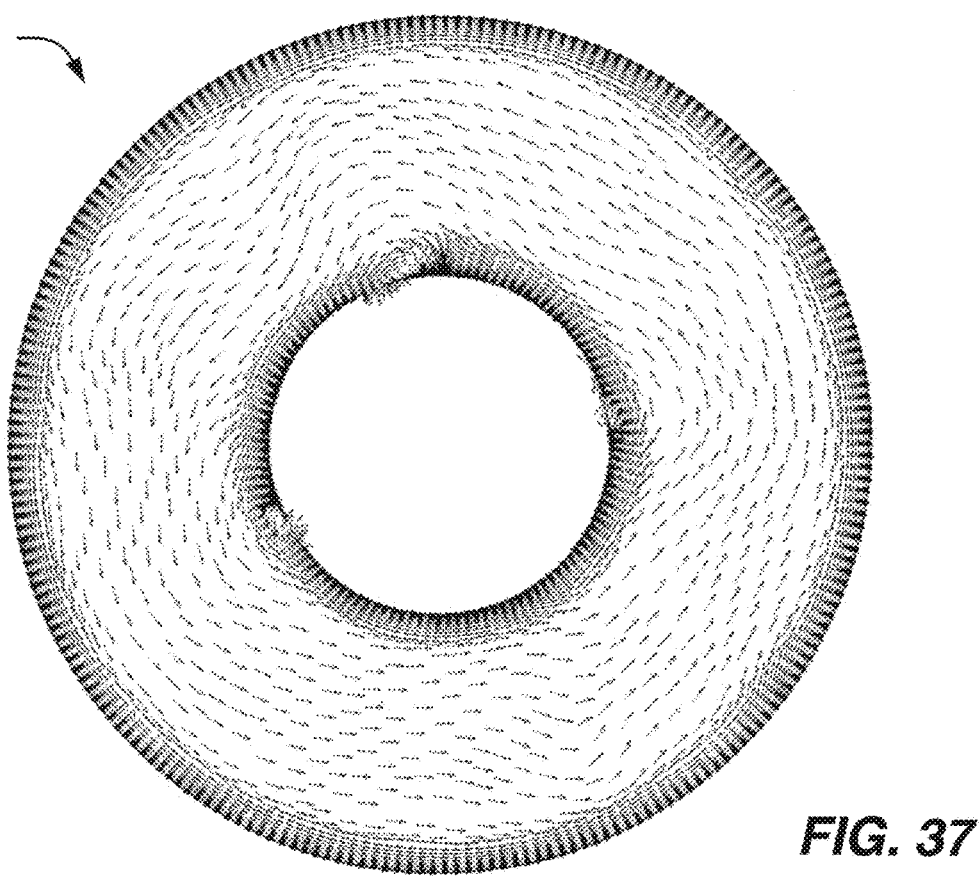
FIG. 37 illustrates a simulated transverse velocity field at the entrance of the associated gas turbine engine fan, resulting from the inlet duct of the fourth aspect of the associated gas-turbine-engine inlet system incorporating the sixth aspect, single-entry embodiment of an inlet-guide-vane assembly.

FIG. 37 illustrates a simulated transverse velocity field at the entrance of the associated gas-turbine-engine fan 78, resulting from the inlet duct 82 of the fourth aspect 10.4 of the associated gas-turbine-engine inlet system 10, 10.4 incorporating the sixth aspect 67.6, single-entry embodiment of the inlet-guide-vane assembly 67, 67.6. The transverse velocity components are illustrated in the fan face plane, viewed from upstream looking downstream along the axial direction. The dense concentration of velocity vectors near the inner and outer peripheries is due to the close spacing of grid points near the walls in the numerical flow (CFD) model applied to compute these results. This flow pattern presents a consistently tangential velocity component relative to the rotating fan blades, resulting from the presence of the vanes which accelerate the flow tangentially and reduce diffusion of the velocity as flow travels through the duct. Vortices appearing at the outer periphery are so small as to be nearly invisible. Vortices appear at the inner periphery in the 12:00, 3:00, and 8:00 o'clock positions as a result of vane pressure loading. Those vortices may be reduced in size and intensity with additional vanes and/or more optimally-shaped vanes. The inlet guide vanes 50, 50.6 in cooperation with the associated single-entry inlet duct 82 provide for a uniformly circumferential (flow rotation) component of velocity at the entrance (face) of the fan. The resulting relatively-more uniform flow velocity and associated cohesive rotational pattern provides for relatively-more efficient operation in cooperation with a corresponding associated fan design, relative to an inlet duct 82 without associated inlet guide vanes 50, 50.6.

Figure 38:
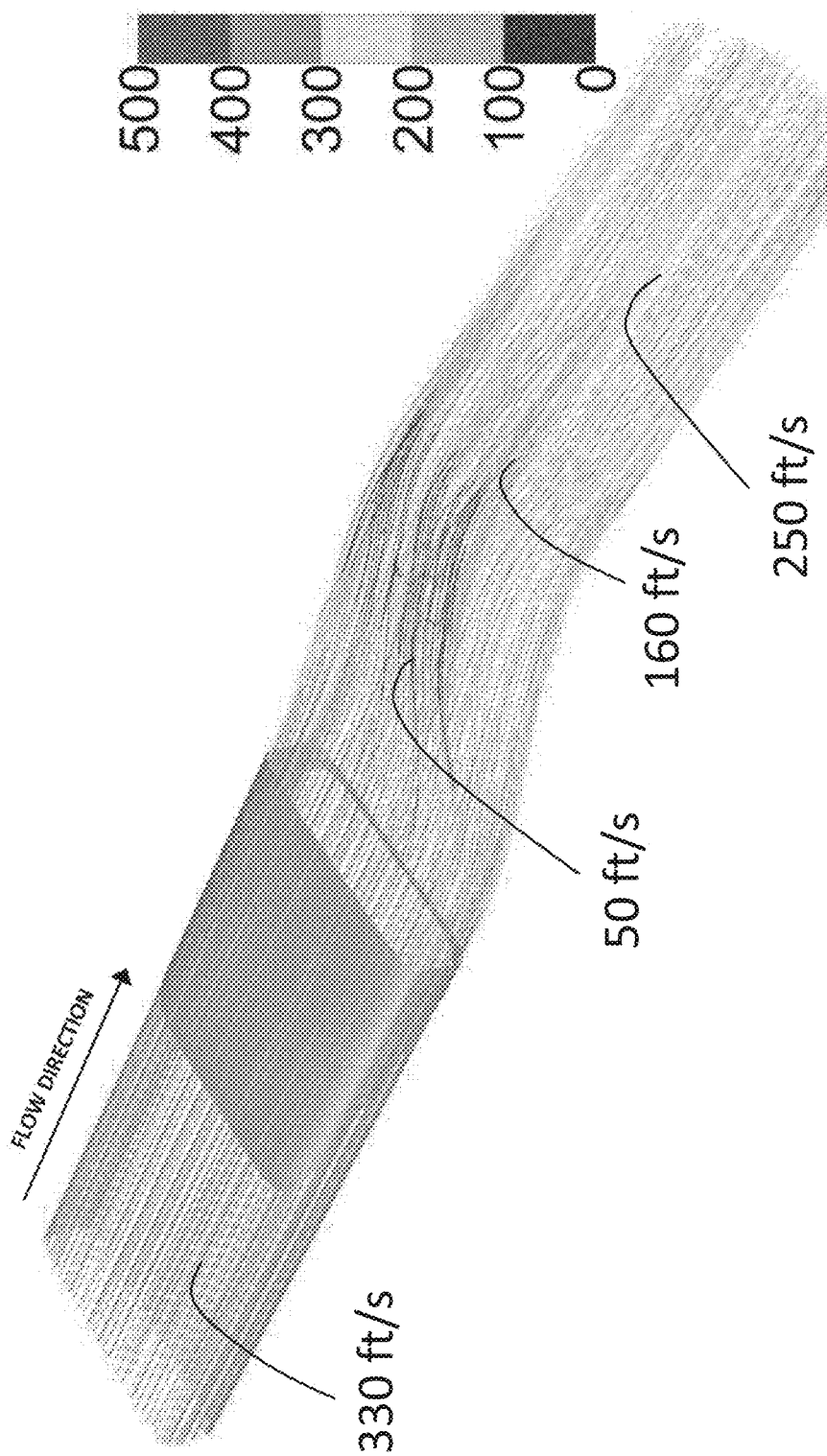
FIG. 38 illustrates a simulation of the velocity field associated with the inlet duct of the fourth aspect of the associated gas-turbine-engine inlet system, but without the associated inlet guide vanes, resulting in the transverse velocity field illustrated in FIG. 36, at the entrance of the associated gas turbine engine fan.

FIG. 38 illustrates a simulation of the velocity field associated with the inlet duct 82 of the fourth aspect 10.4 of the associated gas-turbine-engine inlet system 10, 10.4, but without the associated inlet guide vanes 50, 50.6, resulting in the transverse velocity field illustrated in FIG. 36, at the entrance of the associated gas-turbine-engine fan 78. Without inlet guide vanes 50, 50.6, there is a relatively-large reduction in flow velocity near the top of the duct of the typical intake system.

Figure 39:
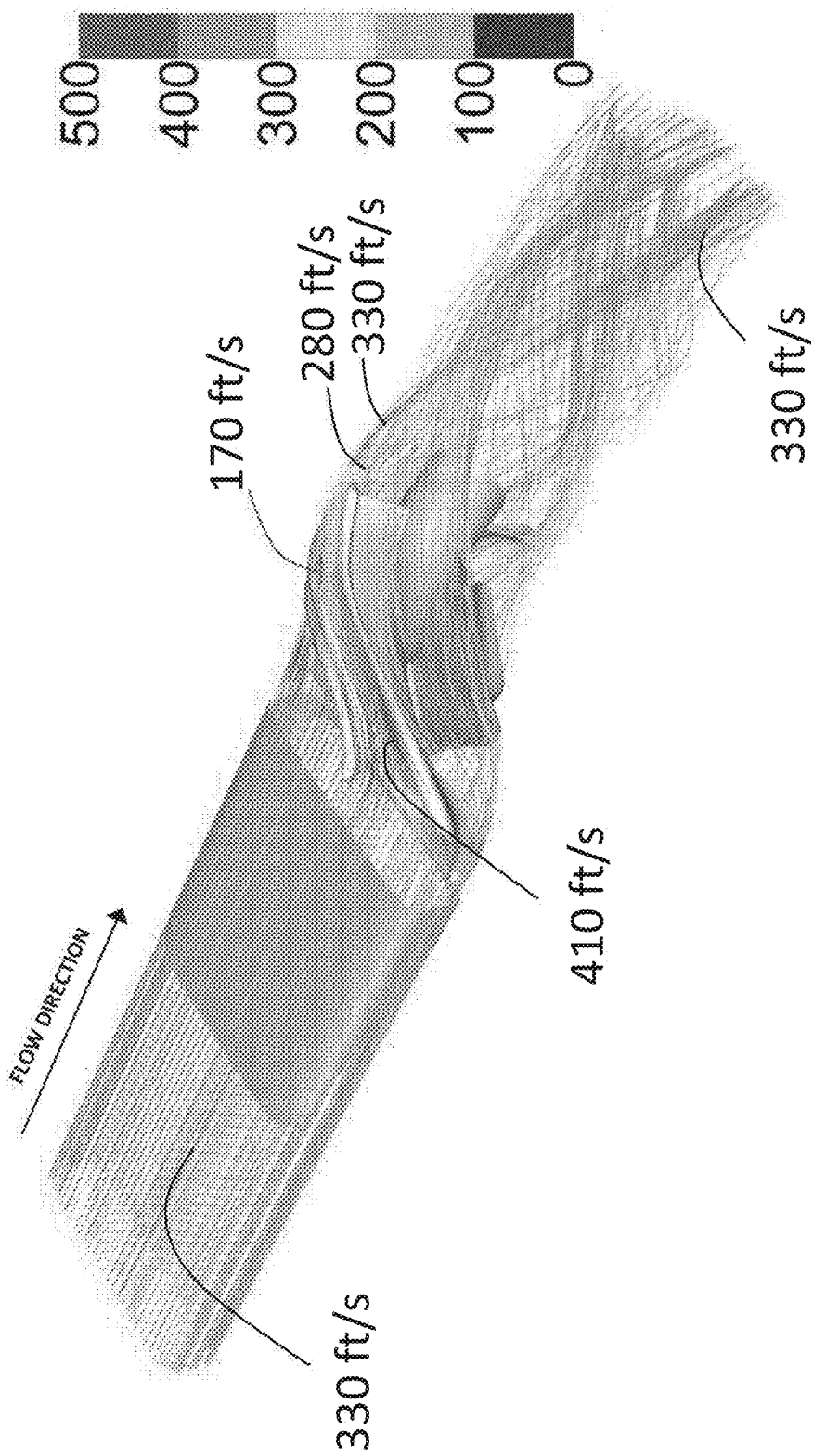
FIG. 39 illustrates a simulation of the velocity field associated with the inlet duct of the fourth aspect of the associated gas-turbine-engine inlet system incorporating the sixth aspect of an inlet-guide-vane assembly, which includes the associated inlet guide vanes, resulting in the transverse velocity field illustrated in FIG. 37 at the entrance of the associated gas turbine engine fan.
Figure 38:
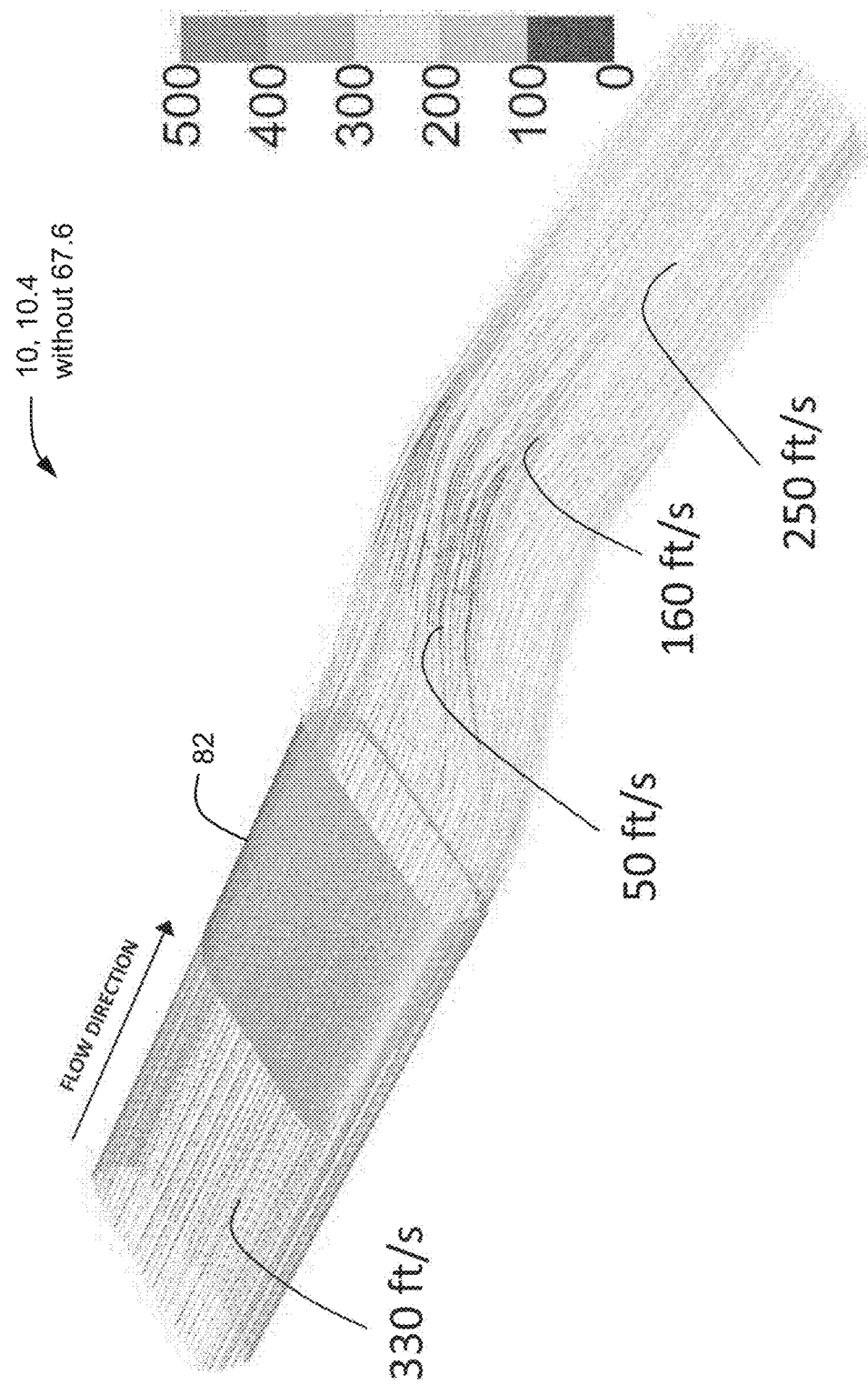
Figure 39:
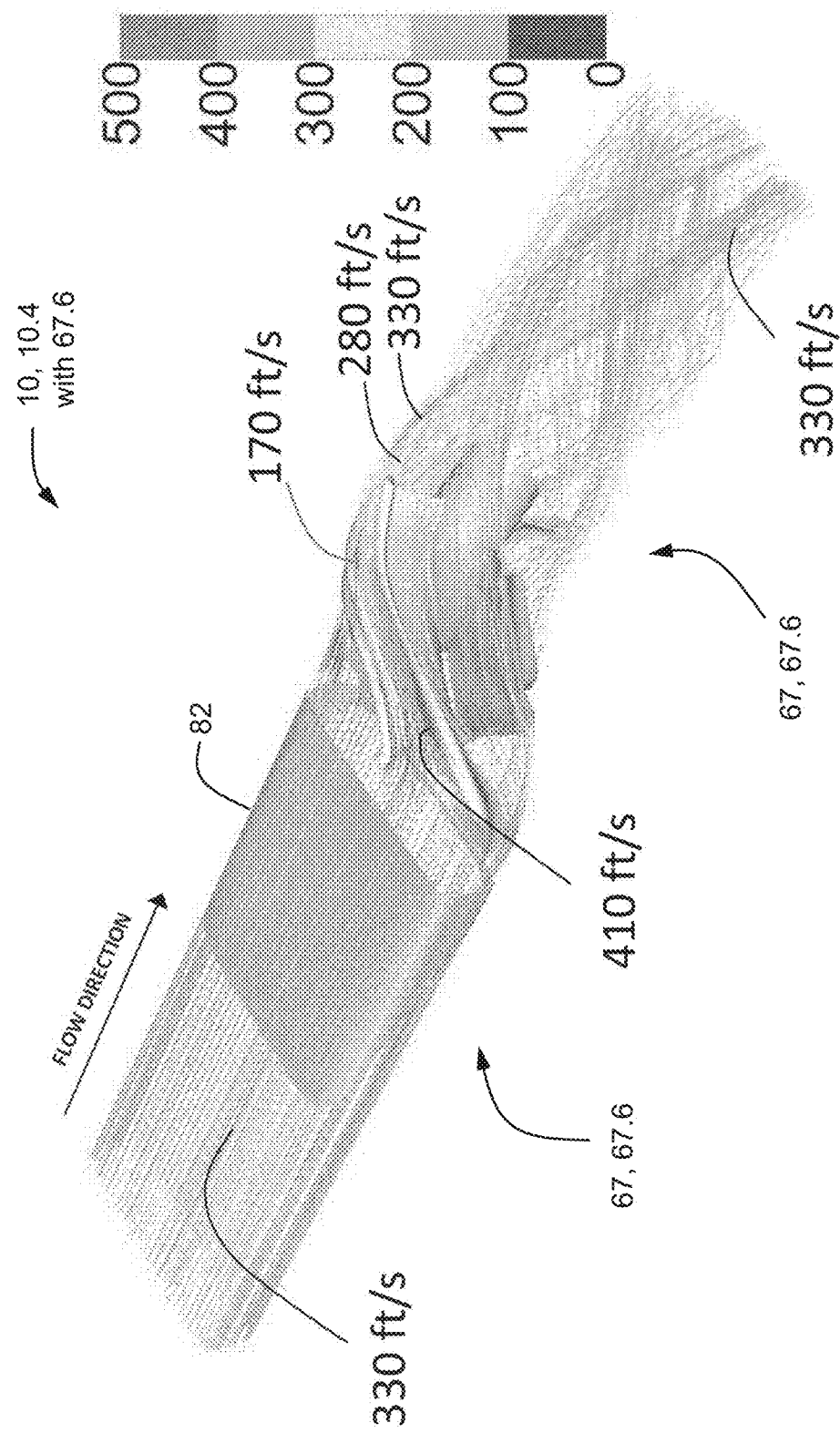

FIG. 39 illustrates a simulation of the velocity field associated with the inlet duct 82 of the fourth aspect 10.4 of the associated gas-turbine-engine inlet system 10, 10.4, which includes the associated inlet guide vanes 50, 50.6, resulting in the transverse velocity field illustrated in FIG. 37, at the entrance of the associated gas-turbine-engine fan 78. The inlet guide vanes 50, 50.6 provide for relatively-higher total flow velocities along the length of the inlet duct 82.

The gas-turbine-engine inlet system 10, 10.1 and associated inlet guide vanes 50, 50.1, 50.2, 50.3', 50.3", in cooperation with a co-designed profile of the compressor blades 60.1, 62.1 of the first 60 or first 60 and second 62, compressor rotors provides for generating velocity in a circumferential direction at a controlled rate using vanes in the annular, bifurcated, or N-furcated duct serving as a fan or compressor intake for the common case of substantially-decreasing mean radius and decelerating meridional velocity, so as to provide for reducing the length and volume of the inlet ducting of the gas-turbine-engine inlet system 10, 10.1, 10.2, 10.3, without sacrificing aerodynamic performance, and thereby provide for reducing the size and weight of the overall installation or thereby increase space available for payload, fuel, or other cargo. The inlet guide vanes 50 in the annular inlet duct 34 provide for a substantially shorter axial length than otherwise possible without the inlet guide vanes 50, while providing relatively-higher pressure recovery and relatively-lower pressure field distortion to the engine face that possible within a similar length, but without the inlet guide vanes 50. Diffusion of the meridional flow velocity is provided for by imparting a circumferential velocity distribution on the inlet air flow within the annular inlet duct 34.

The inclusion of airfoil inlet guide vanes 50, 50.1, 50.2, 50.3', 50.3" within the inlet duct 34' operating in cooperation with appropriately-designed downstream fan and/or compression turbomachinery, enable the inlet duct 34 to be substantially shorter in axial length than without the inlet guide vanes 50, 50.1, 50.2, 50.3', 50.3", while maintaining a relatively-high pressure recovery and a relatively-low pressure field distortion—that would otherwise be characteristic of an inlet with a conventional, albeit much larger, axial length, —as provided for by a) full-span airfoils that guide the incoming air through the intake passage (or passages) from entry to exit in such a way as to impart circumferential velocity components 30, thereby reducing or eliminating velocity deceleration (diffusion) that would ordinarily cause momentum loss, total pressure drop, and flow field velocity and pressure distortion due to boundary-layer growth and separation, thereby reducing deceleration of the overall flow velocity by adding circumferential velocity acceleration; in cooperation with b) an engine compression system having one or more of its initial fan and/or compressor stages designed to operate in cooperation with the flow field delivered by the intake ducting, as an integrated system, wherein the angle of the resultant flow velocity vectors exiting the intake duct airfoils is accommodated by one or more purposefully designed fan and/or compressor stages upon which the velocity vectors are incident, so as to provide for accepting the flow angle distributions and velocity gradients at the exit of the inlet duct 34.

The annular inlet duct 34 and inlet guide vanes 50, 50.1, 50.2, 50.3', 50.3" may be fabricated by various means, including additive manufacturing using either plastic or metal, metal casting, composite layup, or a combination thereof, for example, a cast housing with inserted composite vanes.

Accordingly, a general inlet duct in cooperation with associated guide vanes that together functions in accordance with the above aspects and embodiments of the associated annular inlet duct 34 in cooperation with associated inlet guide vanes 50, 50.1, 50.2, 50.3', 50.3" provides for one or more of the following aspects:

1) The generation of fluid rotation (i.e. circumferential velocity) within the duct, which can start at zero at the throat of the inlet, if necessary, when the incoming fluid has no rotation, but which occurs throughout the duct, for example, as a result of nonzero meridional blade angles over much of the surface of associated airfoil vanes;

2) A shortening of the duct length by 20 to 80 percent, or 40 to 65 percent, relative to a conventional design that does not incorporate the guide vanes;

3) A duct entrance with one or any number of furcations, OR axisymmetric;

4) The incorporation of partial-chord or "splitter" vanes may be added to optimize the aerodynamics of the duct assembly, wherein the splitters could be one splitter adjacent to a full vane or that arrangement plus additional mini splitters;

5) The incorporation of an annular splitter that effectively divides the duct into inner and outer passages, possibly in addition to circumferential passage divisions;

6) The use of a gas-turbine-engine inlet duct (also referred to as an intake) having a mean overall velocity diffusion greater than 10 percent from the entrance of the inlet duct to the face of the engine's turbomachinery (i.e. over the length of the inlet);

7) The use of guide vanes that fill a minimum of 60 percent of the meridional length of the duct, i.e. the length of the associated flowpath. The full vane could optionally be constructed of two or more segments like a tandem stator or a group of stator rows, for example, as would result from removing small slices from the full vanes. Even if the guide vane is segmented over the length thereof, with gaps between segments, the size of the gaps do not preclude the guide vanes from providing for converting a component of meridionally-directed flow of compressible gas within the duct, to a corresponding component of circumferentially directed flow of compressible gas, at each location along the length portion of said duct that contains the guide vanes;

8) The guide vanes consist of non-zero vane geometrical angles along the hub streamline and/or the mean streamline and/or the shroud streamline where the geometrical angle is defined and measured out of the meridional plane, so as to provide for substantial turning along the flowpath over one or more streamlines;

9) Generating fluid rotation in an azimuthal direction at one or more spanwise locations along the trailing edge of the guide vane, so as to provide for co- or counter-spin somewhere at the trailing edge of the vane;

10) The characteristics may or may not be symmetric from one vane to another vane, so as to also accommodate axisymmetric designs such as an annular inlet and it also allows highly specialized designs such as the single entry design in which each of the four vane's geometry is unique;

11) The mean meridional angle of the flowpath, with respect to the engine centerline, can be made steeper than the traditional vane free designs since diffusion is reduced but it is not necessary to have a meridional angle;

12) The duct with guide vanes can be utilized as an engine transition duct; or

13) Incorporation or utilization of state-of-the-art concepts such as minimizing noise using blade/vane sweep, flowpath lining, duct/guide vane trailing edge to fan leading edge spacing, reduction of blade dynamics problems, and design for manufacturing.

A method of guiding compressible gas 18 flowing in a duct 34, comprises receiving a meridionally-directed component 28 of a flow 18' of compressible gas 18 into an entrance 86 of the duct 34, wherein the duct 34 provides for directing the compressible gas 18 from the entrance 86 spanning a first range of radial locations to an exit 88 spanning a second range of radial locations, and at least one radial location within the second range of radial locations is radially inboard of the first range of radial locations; and guiding the flow 18' of the compressible gas 18 within the duct 34 with a plurality of guide vanes 50, 50.1, 50.2, 50.3', 50.3" therewithin, wherein the plurality of guide vanes 50, 50.1, 50.2, 50.3', 50.3" are located along a length portion 90 of the duct 34, the length portion 90 of the duct 34 commences along or upstream of an upstream-most meridionally-curved surface 44, 44.1, 44.2 of the duct 34, the length portion of the duct 34 terminates along or downstream of a downstream-most meridionally-curved surface 46, 46.1, 46.2 of the duct 34, and the operation of guiding the flow 18' of the compressible gas 18 within the duct 34 comprises converting a component of meridionally-directed flow 28 of the compressible gas 18 within the duct 34, to a corresponding component of circumferentially directed flow 30 of the compressible gas 18, at each location along the length portion 90 of the duct 34, responsive to a shape of the plurality of guide vanes 50, 50.1, 50.2, 50.3', 50.3". Furthermore, referring to FIGS. 1, 4 and 15, in accordance with one set of embodiments, the maximum radius of the second range of radial locations at the exit 88 of the duct 34 is radially inboard of the maximum radius of the first range of radial locations at the entrance 86 of the duct 34.

Referring to FIGS. 2A-2B, 3, 13A, 13B, 14, 19, 20A-20C, in accordance with one set of embodiments and in view of the inlet guide vanes 50 and associated length portion 90 collectively illustrated in FIGS. 1, 4 and 15, each of the inlet guide vanes 50 is continuous along a length portion 90 of the annular inlet duct 34 that commences along or upstream of an upstream-most meridionally-curved surface 44.1, 44.2 of the annular inlet duct 34, and that terminates along or downstream of a downstream-most meridionally-curved surface 46.1, 46.2 of the annular inlet duct 34.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of guiding compressible gas flowing in an annular duct, comprising:
   a. receiving a meridionally directed component of a flow of the compressible gas into an annular entrance of the annular duct, wherein said annular duct provides for directing said compressible gas from said annular entrance spanning a first range of radial locations to an annular exit spanning a second range of radial locations, and at least one radial location within said second range of radial locations is radially inboard of said first range of radial locations; and
   b. guiding said flow of said compressible gas within said annular duct with a plurality of guide to vanes therewithin, wherein said plurality of guide vanes are located along a length portion of said annular duct, said length portion of said annular duct commences along or upstream of an upstream-most meridionally-curved surface of said annular duct, said length portion of said annular duct terminates along or downstream of a downstream-most meridionally-curved surface of said annular duct, a direction of curvature of said upstream-most meridionally-curved surface is opposite to a direction of curvature of said downstream-most meridionally-curved surface, the operation of guiding said flow of said compressible gas within said annular duct comprises converting a component of meridionally-directed flow of said compressible gas within said annular duct to a corresponding component of circumferentially directed flow of said compressible gas at each location along said length portion of said annular duct responsive to a shape of said plurality of guide vanes, and within at least one span portion of said annular duct a magnitude of said circumferentially directed flow increases along said length portion of said annular duct from said annular entrance of said annular duct to said annular exit of said annular duct responsive to said plurality of guide vanes.

2. A method of guiding compressible gas flowing in an annular duct as recited in claim 1, wherein a maximum radius of said second range of radial locations is radially inboard of a maximum radius of said first range of radial locations.

3. A method of guiding compressible gas flowing in an annular duct as recited in claim 1, wherein said upstream-most meridionally-curved surface provides for directing said flow of said compressible gas in a direction having a radially-inwards component of velocity, and said downstream-most meridionally-curved surface provides for directing said flow of said compressible gas so as to reduce the associated radially-inwards component of velocity.

4. A method of guiding compressible gas flowing in an annular duct as recited in claim 1, wherein a flow area of said annular exit is greater than a flow area of said annular entrance.

5. A method of guiding compressible gas flowing in an annular duct as recited in claim 1, wherein a plurality of vanes selected from the group consisting of said plurality of vanes are continuous along said length portion of said annular duct.

6. A method of guiding compressible gas flowing in an annular duct as recited in claim 5, wherein each vane of said plurality of vanes is continuous along a said length portion of said annular duct.

7. A method of guiding compressible gas flowing in an annular duct as recited in claim 1, wherein at least two of said plurality of vanes are in cascade tandem along said length portion of said annular duct relative to one another.

8. A method of guiding compressible gas flowing in an annular duct as recited in claim 7, wherein relatively proximate portions of said at least two of said plurality of vanes that are in cascade tandem along said length portion of said annular duct relative to one another are azimuthally aligned with one another relative to an associated flow stream along said annular duct.

9. A method of guiding compressible gas flowing in an annular duct as recited in claim 7, wherein portions of said at least two of said plurality of vanes that are in cascade tandem along said length portion of said annular duct relative to one another are in nested cascade tandem with respect to one another.

10. A method of guiding compressible gas flowing in an annular duct as recited in claim 1, wherein some of said plurality of vanes are interleaved with respect to one another and are of different lengths with respect to one another.

11. A method of guiding compressible gas flowing in an annular duct as recited in claim 1, wherein said plurality of vanes are configured so that a direction of said component of circumferentially-directed flow proximate to a radially-outer-portion of each of said plurality of vanes is opposite to that of said component of circumferentially-directed flow proximate to a radially-inner-portion of each of said plurality of vanes.

12. A method of guiding compressible gas flowing in an annular duct as recited in claim 1, further comprising directing said compressible gas from said annular exit of said annular duct into an entrance of a fan or compressor of a gas turbine engine.

13. A method of guiding compressible gas flowing in an annular duct as recited in claim 12, wherein said compressible gas comprises air.

14. A method of guiding compressible gas flowing in an annular duct as recited in claim 12, wherein the operation of receiving said compressible gas into said annular duct comprises receiving said air from a scoop extending outwards from an external surface of an associated aeronautical vehicle into a stream of said air, and said aeronautical vehicle is powered by said gas turbine engine.

15. A method of guiding compressible gas flowing in an annular duct as recited in claim 12, wherein the operation of receiving said compressible gas into said annular duct comprises receiving said air from an opening through an external surface of an associated aeronautical vehicle that does not extend outwards therefrom into a stream of said air, and said aeronautical vehicle is powered by said gas turbine engine.

16. A method of guiding compressible gas flowing in an annular duct as recited in claim 12, wherein said annular exit is aligned with a corresponding annular bladed region of said fan or compressor of said gas turbine engine.

17. A method of guiding compressible gas flowing in an annular duct as recited in claim 12, wherein said gas turbine engine is located within an aircraft or missile.

18. A method of guiding compressible gas flowing in an annular duct as recited in claim 12, wherein said fan or compressor comprises a plurality of blades, and said plurality of blades are configured to cooperate with a flow field from said annular duct.

19. A method of guiding compressible gas flowing in an annular duct as recited in claim 18, wherein said plurality of vanes are configured so that a direction of said component of circumferentially-directed flow is uniform across an entire span of said annular duct, and said direction of said component of circumferentially-directed flow is the same as a direction of rotation of said fan or compressor during operation of said gas turbine engine.

20. A method of guiding compressible gas flowing in an annular duct as recited in claim 18, wherein said plurality of vanes are configured so that a direction of said component of circumferentially-directed flow proximate to a radially-outer-portion of each of said plurality of vanes is opposite to that of said component of circumferentially-directed flow proximate to a radially-inner-portion of each of said plurality of vanes.

21. A method of guiding compressible gas flowing in an annular duct as recited in claim 18, wherein said direction of said component of circumferentially-directed flow proximate to said radially-outer-portion of each of said plurality of vanes is the same as a direction of rotation of said fan or compressor during operation of said gas turbine engine.

* * * * *